United States Patent
Jung et al.

(10) Patent No.: US 9,062,992 B2
(45) Date of Patent: *Jun. 23, 2015

(54) USING MOTE-ASSOCIATED INDEXES

(75) Inventors: Edward K. Y. Jung, Bellevue, WA (US); Clarence T. Tegreene, Bellevue, WA (US)

(73) Assignee: TriPlay Inc., New York, NY (US)

( * ) Notice: Subject to any disclaimer, the term of this patent is extended or adjusted under 35 U.S.C. 154(b) by 1726 days.

This patent is subject to a terminal disclaimer.

(21) Appl. No.: 10/900,163

(22) Filed: Jul. 27, 2004

(65) Prior Publication Data

US 2006/0026132 A1    Feb. 2, 2006

(51) Int. Cl.
*G06F 17/30* (2006.01)
*G01D 21/00* (2006.01)
*H04W 28/14* (2009.01)
*H04W 84/18* (2009.01)

(52) U.S. Cl.
CPC .......... *G01D 21/00* (2013.01); *G06F 17/30312* (2013.01); *H04W 28/14* (2013.01); *H04W 84/18* (2013.01)

(58) Field of Classification Search
CPC .......... G06F 17/3012; G06F 17/30286; G01D 21/00; H04W 84/18; H04W 28/14
USPC .................................................. 707/999.003
See application file for complete search history.

(56) References Cited

U.S. PATENT DOCUMENTS

| | | | |
|---|---|---|---|
| 4,308,911 A * | 1/1982 | Mandl | 165/209 |
| 4,761,641 A | 8/1988 | Schreiber | |
| 5,159,631 A | 10/1992 | Quan et al. | |
| 5,321,396 A | 6/1994 | Lamming et al. | |
| 5,394,882 A | 3/1995 | Mawhinney | |
| 5,432,519 A | 7/1995 | Sezai | 342/149 |
| 5,539,665 A | 7/1996 | Lamming et al. | |
| 5,581,694 A | 12/1996 | Iverson et al. | 714/26 |
| 5,615,367 A | 3/1997 | Bennett et al. | 707/102 |
| 5,697,066 A | 12/1997 | Acampora | 455/54.1 |
| 5,796,951 A * | 8/1998 | Hamner et al. | 709/223 |
| 5,960,214 A * | 9/1999 | Sharpe et al. | 710/15 |
| 6,088,665 A * | 7/2000 | Burns et al. | 702/188 |
| 6,124,806 A | 9/2000 | Cunningham et al. | 340/870.02 |
| 6,131,119 A | 10/2000 | Fukui | 709/224 |
| 6,187,483 B1 | 2/2001 | Capodieci et al. | |
| 6,208,247 B1 | 3/2001 | Agre et al. | 340/539.19 |
| 6,229,486 B1 | 5/2001 | Krile | |
| 6,296,205 B1 | 10/2001 | Hanson et al. | 244/158 |
| 6,344,797 B1 | 2/2002 | Hosny | |
| 6,421,354 B1 | 7/2002 | Godlewski et al. | 370/466 |
| 6,504,829 B1 | 1/2003 | Young et al. | |
| 6,505,205 B1 | 1/2003 | Kothuri et al. | 707/100 |
| 6,510,403 B1 | 1/2003 | Ghaseminejad | |
| 6,618,745 B2 * | 9/2003 | Christensen et al. | 709/201 |
| 6,640,087 B2 | 10/2003 | Reed et al. | |
| 6,640,145 B2 | 10/2003 | Hoffberg et al. | 700/83 |
| 6,691,070 B1 * | 2/2004 | Williams et al. | 702/188 |
| 6,697,649 B1 | 2/2004 | Bennett et al. | |
| 6,704,742 B1 | 3/2004 | Huth et al. | 707/102 |

(Continued)

OTHER PUBLICATIONS

Dunne et al., "WISENET", Senior Design Project, Spring 2003, (May 2003), pp. 1-26. (Provided by Applicant).*

(Continued)

*Primary Examiner* — Phuong Thao Cao

(57) ABSTRACT

Systems and related methods utilizing one or more mote-related content indexes.

55 Claims, 44 Drawing Sheets

(56) References Cited

U.S. PATENT DOCUMENTS

| | | | |
|---|---|---|---|
| 6,708,239 B1 | 3/2004 | Ellerbrock et al. | |
| 6,735,630 B1 | 5/2004 | Gelvin et al. | |
| 6,778,844 B2 | 8/2004 | Hood, III | |
| 6,792,321 B2 | 9/2004 | Sepe, Jr. | 700/65 |
| 6,801,878 B1* | 10/2004 | Hintz et al. | 702/188 |
| 6,826,162 B2 | 11/2004 | Haines et al. | 370/332 |
| 6,856,247 B1* | 2/2005 | Wallace | 340/539.16 |
| 6,870,503 B2 | 3/2005 | Mohamadi | |
| 6,888,453 B2* | 5/2005 | Lutz et al. | 340/506 |
| 6,924,727 B2* | 8/2005 | Nagaoka et al. | 340/3.1 |
| 6,943,747 B2 | 9/2005 | Kwon et al. | 343/773 |
| 6,950,778 B2 | 9/2005 | Warner et al. | 702/182 |
| 6,999,957 B1 | 2/2006 | Zamir et al. | |
| 7,004,401 B2* | 2/2006 | Kallestad | 236/49.3 |
| 7,016,812 B2* | 3/2006 | Aritsuka et al. | 702/188 |
| 7,019,637 B1* | 3/2006 | Johnson et al. | 340/531 |
| 7,031,288 B2 | 4/2006 | Ogier | |
| 7,034,740 B2* | 4/2006 | Witten | 342/22 |
| 7,075,455 B2 | 7/2006 | Nishimura et al. | 340/870.28 |
| 7,103,511 B2 | 9/2006 | Petite | 702/57 |
| 7,165,109 B2 | 1/2007 | Chiloyan et al. | 709/227 |
| 7,167,859 B2 | 1/2007 | Shah et al. | 707/9 |
| 7,203,693 B2 | 4/2007 | Carlbom et al. | |
| 7,206,828 B1 | 4/2007 | Bourke-Dunphy et al. | |
| 7,266,532 B2* | 9/2007 | Sutton et al. | 706/12 |
| 7,446,801 B2 | 11/2008 | Iizuka | |
| 7,472,135 B2 | 12/2008 | Huuskonen | |
| 7,475,158 B2* | 1/2009 | Ferri et al. | 709/238 |
| 7,665,126 B2 | 2/2010 | Simon et al. | |
| 7,683,933 B2* | 3/2010 | Tanaka | 348/207.11 |
| 8,074,201 B2 | 12/2011 | Ghercioiu et al. | |
| 2001/0027495 A1 | 10/2001 | Campagnolo | |
| 2002/0027504 A1 | 3/2002 | Davis et al. | 340/540 |
| 2002/0036595 A1 | 3/2002 | Chiang et al. | 343/876 |
| 2002/0040639 A1 | 4/2002 | Duddleson et al. | 92/52 |
| 2002/0095501 A1 | 7/2002 | Chiloyan et al. | |
| 2002/0095568 A1 | 7/2002 | Norris et al. | |
| 2002/0123864 A1* | 9/2002 | Eryurek et al. | 702/188 |
| 2002/0161751 A1 | 10/2002 | Mulgund et al. | 707/3 |
| 2002/0165933 A1* | 11/2002 | Yu et al. | 709/217 |
| 2003/0014084 A1 | 1/2003 | VanHout | |
| 2003/0016128 A1 | 1/2003 | Lutz et al. | |
| 2003/0026268 A1 | 2/2003 | Navas | 370/400 |
| 2003/0033394 A1 | 2/2003 | Stine | |
| 2003/0058111 A1 | 3/2003 | Lee et al. | |
| 2003/0063585 A1* | 4/2003 | Younis et al. | 370/331 |
| 2003/0135495 A1 | 7/2003 | Vagnozzi | 707/3 |
| 2003/0151513 A1 | 8/2003 | Herrmann et al. | 340/573.1 |
| 2003/0172221 A1 | 9/2003 | McNeil | 710/305 |
| 2003/0222818 A1 | 12/2003 | Regnier et al. | 342/383 |
| 2003/0228857 A1 | 12/2003 | Maeki | 455/278.1 |
| 2003/0236600 A1* | 12/2003 | Silvester | 701/29 |
| 2003/0236866 A1* | 12/2003 | Light | 709/220 |
| 2004/0005889 A1 | 1/2004 | Nishimura et al. | 455/423 |
| 2004/0008140 A1 | 1/2004 | Sengupta et al. | 343/700 |
| 2004/0010492 A1 | 1/2004 | Zhao et al. | 707/3 |
| 2004/0017817 A1 | 1/2004 | Jameson et al. | |
| 2004/0071460 A1* | 4/2004 | Nishimura et al. | 396/310 |
| 2004/0075549 A1 | 4/2004 | Haller | |
| 2004/0078117 A1* | 4/2004 | Vanderah et al. | 700/301 |
| 2004/0090326 A1 | 5/2004 | Chin et al. | 340/539.22 |
| 2004/0105005 A1* | 6/2004 | Yamamoto et al. | 348/159 |
| 2004/0122849 A1 | 6/2004 | Nelson | 707/102 |
| 2004/0137915 A1* | 7/2004 | Diener et al. | 455/456.1 |
| 2004/0139110 A1* | 7/2004 | LaMarca et al. | 707/104.1 |
| 2004/0144849 A1* | 7/2004 | Ahmed | 236/1 E |
| 2004/0158627 A1 | 8/2004 | Thornton | |
| 2004/0177356 A1 | 9/2004 | Westendorf et al. | |
| 2004/0183679 A1* | 9/2004 | Paximadis et al. | 340/567 |
| 2004/0186826 A1 | 9/2004 | Choi et al. | |
| 2004/0218602 A1* | 11/2004 | Hrastar | 370/390 |
| 2004/0230638 A1 | 11/2004 | Balachandran et al. | |
| 2004/0240542 A1 | 12/2004 | Yeredor et al. | |
| 2004/0249563 A1* | 12/2004 | Otsuki et al. | 701/200 |
| 2004/0262410 A1 | 12/2004 | Hull | |
| 2004/0267729 A1 | 12/2004 | Swaminathan et al. | |
| 2005/0021724 A1* | 1/2005 | Kung et al. | 709/223 |
| 2005/0043907 A1* | 2/2005 | Eckel et al. | 702/62 |
| 2005/0062653 A1 | 3/2005 | Cetiner et al. | 343/701 |
| 2005/0085248 A1* | 4/2005 | Ballay et al. | 455/500 |
| 2005/0140964 A1 | 6/2005 | Eschenauer et al. | |
| 2005/0141706 A1 | 6/2005 | Regli et al. | 380/44 |
| 2005/0143133 A1* | 6/2005 | Bridgelall | 455/562.1 |
| 2005/0149500 A1* | 7/2005 | Marmaros et al. | 707/3 |
| 2005/0275532 A1 | 12/2005 | Ferri et al. | 340/539.26 |
| 2006/0018516 A1 | 1/2006 | Masoud et al. | |
| 2006/0053459 A1 | 3/2006 | Simerly et al. | |
| 2006/0092042 A1 | 5/2006 | Davis et al. | |
| 2006/0136627 A1 | 6/2006 | Maity et al. | 710/72 |
| 2006/0206235 A1 | 9/2006 | Shakes et al. | |
| 2006/0212570 A1 | 9/2006 | Aritsuka et al. | 709/224 |
| 2006/0224434 A1 | 10/2006 | Rumi et al. | 705/10 |
| 2007/0035410 A1 | 2/2007 | Cohen et al. | |
| 2007/0208841 A1 | 9/2007 | Barone et al. | |
| 2007/0214133 A1 | 9/2007 | Liberty et al. | |
| 2007/0254672 A1 | 11/2007 | Dacosta et al. | |
| 2007/0262863 A1 | 11/2007 | Aritsuka et al. | |
| 2008/0003948 A1 | 1/2008 | Mitran | |
| 2008/0100450 A1 | 5/2008 | Ayyagari et al. | |
| 2008/0129495 A1 | 6/2008 | Hitt | |
| 2008/0234581 A1* | 9/2008 | Paltieli et al. | 600/443 |
| 2009/0019447 A1 | 1/2009 | Hellerstein et al. | |
| 2009/0063187 A1 | 3/2009 | Johnson et al. | |
| 2009/0067586 A1* | 3/2009 | Fano et al. | 379/49 |
| 2009/0195401 A1 | 8/2009 | Maroney et al. | |
| 2010/0062780 A1 | 3/2010 | Jung et al. | |
| 2010/0168989 A1 | 7/2010 | Gao et al. | |
| 2010/0274753 A1 | 10/2010 | Liberty et al. | |
| 2012/0041941 A1* | 2/2012 | King et al. | 707/711 |

OTHER PUBLICATIONS

Madden et al., "The Design of an Acquisitional Query Processor for Sensor Networks", Sigmod 2003, pp. 1-12, accessed online at <http://db.cs.berkeley.edu/papers/sigmod03-acqp.pdf> on Jun. 27, 2008.*

Madden et al., "TinyDB: In-Network Qeuy Processing in TinyOS", Version 0.4, Sep. 2003, pp. 1-46, accessed online at <http://telegraph.cs.berkeley.edu/tinydb/tinydb.pdf> on Apr. 27, 2009.*

Greenstein et al., "DIFS: A Distributed Index for Features in Sensor Networks", 2003, pp. 1-11, accessed online at <http://lecs.cs.ucla.edu/~ben/papers/difs.pdf> on Mar. 17, 2010.*

Glaser, Steven D., "Some real-world applications of wireless sensor nodes", SPIE Symposium on Smart Structures & Materials/NDE 2004, San Diego, California, Mar. 14-18, 2004, 12 pages.*

Wong et al., "Search in Sensor Networks: Challenges, Techniques, and Applications", IEEE International Conference on Acoustics, Speech, and Signal Processing (ICASSP), May 2002, pp. IV-3752-IV-3755.*

Tan et al., "Power Efficient Data Gathering and Aggregation in Wireless Sensor Networks", ACM SIGMOD Record, vol. 32, Issue 4, Dec. 2003, pp. 66-71.*

Berkely Webs: Wireless Embedded Systems, "Building Sensor Networks with TinyOS", bearing a date of May 5, 2003 Mobisys Tutorial, San Francisco Powerpoint Presentation, Culler, David; Levis, Phil; Szewczyk, Rob; Polastre, Joe; pp. 1-41 located at http://webs.cs.berkeley.edu, printed on Apr. 15, 2004.

Berkeley Webs: Wireless Embedded Systems, "Publications", p. 1-3, located at http://webs.cs.berkeley.edu/publications.html, printed on Apr. 12, 2004.

Berkeley Webs: Wireless Embedded Systems, "Tiny OS a component-based OS for the networked sensor regime" pp. 1-2 located at http://webs.cs.berkeley.edu/, printed on Jan. 27, 2004.

Berkeley Webs: Wireless Embedded Systems, "Tiny OS a component-based OS for the networked sensor regime", "Publications/Presentations", pp. 1-3 located at http://www.tinyos.net/media.html, printed on Apr. 13, 2004.

Berkeley Webs: Wireless Embedded Systems, "Tiny OS a component-based OS for the networked sensor regime" pp. 1-9 located at http://webs.cs.berkeley.edu/tos/related.html, printed on Jan. 27, 2004.

(56) References Cited

OTHER PUBLICATIONS

Berkeley Webs: Wireless Embedded Systems, "Tiny OS Tutorial Index", pp. 1-2 located at http://webs.cs.berkeley.edu/tos/tinyos-1.x/doc/tutorial/index.html, printed on Apr. 15, 2004.
Berkeley Webs: Wireless Embedded Systems, "Tiny OS Tutorial Lesson 8: Data Logging Application", pp. 1-4 located at http://webs.cs.berkeley.edu/tos/tinyos-1.x/doc/tutorial/lesson8.html, printed on Apr. 15, 2004.
Buonadonna, Phillip; Hill, Jason; Culler, David; "Active Message Communication for Tiny Networked Sensors," pp. 1-11, printed on Mar. 8, 2004.
Center for the Built Environment, "XYZ on a Chip: Integrated Wireless Sensor Networks for the Control of the Indoor Environment in Buildings" pp. 1-2, located at http://www.cbe.berkeley.edu/research/briefs-wirelessxyz.htm, bearing a date of 2002, printed on Jan. 27, 2004.
Citris, "Brainy Buildings Conserve Energy" p. 1-3 located at http://www.citris.berkeley.edu/applications/energy/smartbuildings.html, printed on Jan. 27, 2004.
Citris, "The Real World as One Giant Database" pp. 1-3 located at http://www.citris.berkeley.edu/newsletter/2003_Newsletters/december_2003/feature.htm, bearing a date of 2003, printed on Apr. 9, 2004.
"Data Repository", University of California Berkeley, located at http://localization.millennium.berkeley.edu/data_repository.html, pp. 1 of 1, bearing a date of 2001, printed on Apr. 7, 2004.
Gay, David; Levis, Phil; Von Behren; Welsh, Matt; Brewer, Eric; and Culler, David, "The nesC Language: A Holistic Approach to Network Embedded Systems," pp. 1-11; Intel Research Berkeley, The Intel Corporation, Bearing a date of Nov. 2002.
Gelsinger, Pat; Intel.com, "Expanding Moore's Law with Convergance" pp. 1-4 located at http://www.intel.com/labs/features/em101031.htm, printed on Apr. 9, 2004.
Hill, Jason; Szewczyk, Robert; Woo, Alec; Hollar, Seth; Culler, David; Pister, Kristofer, "System Architecture Directions for Networked Sensors," ASPLOS 2000, Cambridge, Bearing a date of Nov. 2000, pp. 1-12.
Intel.Com, "New Computing Frontiers—The Wireless Vineyard" pp. 1-4 located at http://www.intel.com/labs/features/rs01031.htm, printed on Apr. 7, 2004.
Intel.Com, "Exploratory Research Deep Networking" pp. 1-10 located at http://www.intel.com/research/exploratory/heterogenerous.htm, printed on Mar. 25, 2004.
ISIS NEST: Institute for Software Integrated Systems; "NEST Home: Network Embedded Systems Technology", pp. 1-2, located at http://www.isis.vanderbilt.edu/projects.nest/index.html, printed on Apr. 14, 2004.
ISIS NEST: Institute for Software Integrated Systems; "Applications: Shooter Localizations", pp. 1-5, located at http://www.isis.vanderbilt/edu/projects.nest/applications.html, printed on Apr. 14, 2004.
ISIS NEST: Institute for Software Integrated Systems; "Middleware: Next Middleware Services", pp. 1 of 1, located at http://www.isis.vanderbilt.edu/projects.nest/middleware.html, printed on Apr. 14, 2004.
ISIS NEST Institute for Software Integrated Systems; "Tools: NEST Tools", pp. 1 of 1, located at http://www.isis.vanderbilt.edu/projects.nest/tools.html, printed on Apr. 14, 2004.
ISIS NEST: Institute for Software Integrated Systems; "Documents: NEST Documents", pp. 1-2, located at http://www.isis.vanderbilt.edu/projects.nest/documents.html, printed on Apr. 14, 2004.
ISIS NEST: Institute for Software Integrated Systems; "Download: NEST Download", pp. 1-2, located at http://www.isis.vanderbilt.edu/projects.nest/download.html, printed on Apr.14, 2004.
ISIS NEST: Institute for Software Integrated Systems; "People: The NEST Group", pp. 1 of 1, located at http://www.isis.vanderbilt.edu/projects.nest/people.html, printed on Apr. 14, 2004.
Johnson, R. Colin, "Companies test prototype wireless-sensor nets" EE Times, pp. 1-3, printable version of article located at http://www.eet.com/article/showArticle.jhtml?articleID=9900910, bearing a date of Jan. 29, 2003, printed on Jan. 27, 2004.
Kahn, Kevin C.; Culler, David E.; "Ad Hoc Sensor Networks a New Frontier For Computing Applications", Bearing a date of Apr. 2002, printed on Apr. 9, 2004, p. 1-4.
Kling, Ralph, "Intel® Research Mote" pp. 1-13, Powerpoint Presentation, located at http://webs.cs.berkeley.edu/retreat-1-03/slides/imote-nest-q103-03-dist.pdf , Intel Corporation Research, Santa Clara, CA, printed on Apr. 13, 2004.
Levis, Philip; Culler, David; "Maté: A Tiny Virtual Machine for Sensor Networks", pp. 1-11, printed on Apr. 12, 2004.
Levis, Philip; Patel, Neil; "Maté: Building Application-Specific Sensor Network Language Runtimes", Nov. 11, 2003, printed on Apr. 12, 2004, pp. 1-3.
Levis, Philip; Madden, Sam; Gay, David; Polastre, Joseph; Szewczyk, Robert; Woo, Alec; Brewer, Eric; Culler, David; "The Emergence of Networking Abstractions and Techniques in TinyOS" pp. 1-14, printed on Apr. 13, 2004.
Levis, Philip; Patel, Neil; Culler, David; Shenker, Scott; "Trickle: A Self-Regulating Algorithm for Code Propagation and Maintenance in Wireless Sensor Networks", printed on Apr. 13, 2004, pp. 1-14.
Levis, Philip, "Viral Code Propagation in Wireless Sensor Networks," EECS Department, University of California at Berkeley, printed on Mar. 8, 2004, pp. 1-7.
Liscano, Ramiro, "Service Discovery in Sensor Networks: An Overview" Powerpoint Presentation; pp. 1-51; School of Information Technology and Engineering, University of Ottawa, Ottawa, Canada, bearing a date of 2003, printed on Mar. 8, 2004.
"Localization Distributed Embedded Systems" UCLA Computer Science 213: Localization Systems Powerpoint Presentation, pp. 1-61, bearing a course name of: CS 213/Estrin/Winter 2003, bearing a speaker name of: Lewis Girod, bearing a date of Feb. 4, 2003, printed on Mar. 15, 2004.
"Localization.Millennium.Berkeley.Edu", University of California located at http://localization.millennium.berkeley.edu/introduction.html, pp. 1 of 1 bearing a date of 2001, printed on Apr. 7, 2004.
"Localization Standards", University of California Berkeley, located at http://localization.millennium.berkeley.edu/localization_standards.html, pp. 1 of 1, bearing a date of 2001, printed on Apr. 7, 2004.
Madden, Samuel, "Acquisitional Query Processing in TinyDB" Powerpoint Presentation, pp. 1-51; NEST Winter Retreat 2003, printed on Mar. 8, 2004.
Madden, Samuel, "Challenges in Sensor Network Query Processing" Powerpoint Presentation allegedly at the Jan. 15, 2002 NEST Retreat, printed on Mar. 8, 2004, pp. 1-56.
Madden, Samuel; Szewczyk, R.; Franklin, Michael; and Culler, David "Supporting Aggregate Queries Over Ad-Hoc Wireless Sensor Networks," pp. 1-10, printed on Mar. 8, 2004.
Madden, Samuel; Szewczyk, R.; Franklin, Michael; Culler, David "Supporting Aggregate Queries Over Ad-Hoc Wireless Sensor Networks" Powerpoint Presentation, pp. 1-47, $4^{th}$ IEEE Workshop on Mobile Computing, dated Jun. 21, 2002.
Madden, Samuel; Franklin, Michael J.; Hellerstein, Joseph; M., and Hong, Wei, "The Design of an Acquisitional Query Processor for Sensor Networks," pp. 1-14, SIGMOD, Bearing a date of Jun. 2003.
Maróti, Miklós; Völgyesi, Péter; Simon, Gyula; Karsai, Gábor; Lédeczi, Akos; "Distributed Middleware Services Composition and Synthesis Technology"; pp. 1-8, IEEE, bearing a date of 2002, printed on Apr. 14, 2004.
Pescovitz, David, "Robugs: Smart Dust Has Legs" pp. 1-2, http://www.coe.berkeley.edu/labnotes/0903/pister_print.html, bearing located at • a date of Sep. 2003, printed on Apr. 9, 2004.
Raghunathan, Vijay; Schurgers, Curt; Park, Sung; Srivastava, Mani B.; "Energy Aware Wireless Sensor Networks" pp. 1-17; Department of Electrical Engineering, University of California, Los Angeles; printed on Mar. 15, 2004.
Ryer, Alex; *Light Measurement Handbook*, http://www.intl-light.com/handbook; pp. 1-64, copyright 1997, printed on Mar. 8, 2004.
Savvides, Andreas; "Hardware", pp. 1-3, located at http://nesl.ee.ucle.edu/projects/ahlos/hardware.htm, Networks and Embedded Systems Jan. 18, 2003, printed on Lab, University of California, Los Angeles; bearing a date of Feb. 23, 2004.

(56) References Cited

OTHER PUBLICATIONS

Savvides, Andreas; "Localization Forum", pp. 1 of 1, located http://nesl.ee.ucla.edu/projects/ahlos/localization_forum.htm, Networks and Embedded Systems Lab, University of California, Los Angeles; bearing a date of Dec. 24, 2003, printed on Feb. 23, 2004.
Searchmobilecomputing.Com, "Ad-Hoc Network" pp. 1-3 located at http://searchmobilecomputing.techtarget.com/sDefinition/0,,sid40_gci213462,00.html, bearing a date of Apr. 11, 2003, printed on Mar. 8, 2004.
Searchnetworking.Com Definitions, "Jini" pp. 1-3 located at http://searchnetworking.techtarget.com/sDefinition/0,,sid7_gci212422,00.html, bearing a date of Apr. 10, 2003, printed on Mar. 8, 2004.
Spyropoulos, Akis; Raghavendra, C.S., "Energy Efficient Communications in Ad Hoc Networks Using Directional Antennas," Dept. of Electrical Engineering-Systems, University of Southern California, bearing a date of 2002, printed on Feb. 23, 2004, pp. 1-9.
"The Ad-Hoc Localization System (AHLoS)" Networks and Embedded Systems Lab, University of California, Los Angeles; located at http://nesl.ee.ucla.edu/projects/ahlos/Default.htm, pp. 1-4, printed on Feb. 23, 2004.
"Tiny DB a Declarative Database for Sensor Networks" pp. 1-2, located at http://telegraph.cs.berkeley.edu/tinydb/ printed on Apr. 9, 2004.
Tiny Sec: Link Layer Security for Tiny Devices, Calamari: A localization system for sensor networks: pp. 1-6, located at http://www.cs.berkeley.edu/~kamin/calamari/ printed on Apr. 12, 2004.
Viswanath, Kumar, "Adaptive, Integrated Multicast Routing for Group Communications in Ad-Hoc Networks" Powerpoint Presentation, pp. 1-12; Computer Engineering Department, University of California, Santa Cruz, printed on Mar. 8, 2004.
Woo, Alec; Tong, Terence; and Culler, David, "Taming the Underlying Challenges of Reliable Multihop Routing in Sensor Networks," pp. 1-14, SenSys '03, Bearing a date of Nov. 5-7, 2003, Los Angeles, California, USA.
Zhao, Feng; Guibas, Leonudas J.; *Wireless Sensor Networks: An Information Processing Approach*. San Francisco: Morgan Kaufmann Publishers-Elsevier Inc., bearing a copyright date of 2004.
Adler, Robert et al.; "Demo Abstract: Intel Mote 2: An Advanced Platform for Demanding Sensor Network Applications"; Intel Corporation; bearing dates of Nov. 2-4, 2005; p. 298; (plus cover sheet).
Dutta, Prabal K. et al.; "System Software Techniques for Low-Power Operation in Wireless Sensor Networks"; Computer Science Division, University of California, Berkeley; bearing a date of 2005; pp. 924-931; (plus cover sheet).
Krause, Andreas et al.; "Near-optimal Sensor Placements: Maximizing Information while Minimizing Communications Cost"; bearing dates Apr. 19-21, 2006; pp. 2-10; (plus cover sheets).
Lu, Jie et al.; "User Modeling for Full-Text Federated Search in Peer-to-Peer Networks"; Language Technologies Institute, Carnegie Mellon University; bearing dates of Aug. 6-11, 2006; pp. 332-39; (plus cover sheet).
Nachman, Lama et al.; "The Intel ® Mote Platform: A Bluetooth*-Based Sensor Network for Industrial Monitoring"; Corporate Technology Group, Intel Corporation; bearing a date of 2005; pp. 1-6; (plus cover sheet).
PCT International Search Report; International App. No. PCT/US05/11202; Sep. 27, 2006.
Razeeb, Kafil M. et al.; "A Hybrid Network of Autonomous Sensor Nodes"; NMRC, University College Cork; bearing dates of Nov. 8-10, 2004; pp. 69-70; (plus cover sheet).
Sharifzadeh, Mehdi et al.; "Supporting Spatial Aggregation in Sensor Network Databases*"; Computer Science Department, University of Southern California; bearing dates of Nov. 12-13, 2004; pp. 166-175; (plus cover sheet).
U.S. Appl. No. 10/909,200, filed Mar. 2, 2006, Jung et al.
U.S. Appl. No. 10/903,692, filed Feb. 2, 2006, Jiang et al.
U.S. Appl. No. 10/903,652, filed Feb. 2, 2006, Jung et al.
PCT International Search Report; International App. No. PCT/US05/10054; Dec. 1, 2006.
PCT International Search Report; International App. No. PCT/US05/11203; Feb. 9, 2007.
Lu, Jie; Callan, Jamie; "Content-Based Retrieval in Hybrid Peer-To-Peer Networks"; CIKM'03; bearing dates of Nov. 3-8, 2003; ACM.
Culler, David; Estrin, Deborah; Srivastava, Mani; "Overview of Sensor Networks"; Computer; Aug. 2004; pp. 41-49; vol. 37; No. 8; IEEE Computer Society.
Culler, David; Mulder, Hans; "Smart Sensors to Network the World"; Scientific American; located at: http://www.intel.com/research/exploratory/smartnetworks.htm; pp. 1-10; printed on Jun. 26, 2007; Intel Corporation.
Fall, Kevin; "A Delay-Tolerant Network Architecture for Challenged Internets"; Intel Research, Berkeley; Bearing a date of Feb. 26, 2003; pp. 1-14.
Govindan, Ramesh et al.; "Tenet: An Architecture for Tiered Embedded Networks"; pp. 1-8, No Date.
Stathopoulos, Thanos et al.; "Mote Herding for Tiered Wireless Sensor Networks"; Center for Embedded Networked Sensing; pp. 1-14, No Date.
Lu, Ji et al.; "Content-Based Retreival in Hybrid Peer-toPeer Networks"; Conference on Information and knowledge Management; Nov. 3-8, 2003.
Madden, Samuel et al.; "The Design of an Acquisitional Query Processor For Sensor Netowrks"; SIGMOD; located at http://db/cs/berkeley.edu/papers/sigmod03-acqp.pdf; printed on Jul. 19, 2007.
Madden, Samuel et al; "TAG: A Tiny AGgregation Servcie for Ad-Hoc Sensor Sensor Netowrks"; OSDI, located at http://www.cs.berkeley.edu/~franklin/Papers/madden_tag.pdf; printed on Aug. 9, 2007.
Woo, Alec et al.; "A Transmission Control Scheme for Media Access in Sensor Networks"; ACM Mobicom; located at http://ww.cs.berkeley.edu/~awoo/awoo_mobicom.pdf; printed on Aug. 13, 2007.
PCT International Search Report; International App. No. PCT/US05/09479; Mar. 22, 2005.
PCT International Search Report; International App. No. PCT/US05/09640; Mar. 22, 2005.
PCT International Search Report; International App. No. PCT/US05/10843; Mar. 29, 2005.
PCT International Search Report; International App. No. PCT/US05/09641; Sep. 13, 2007.
PCT International Search Report; International App. No. PCT/US05/09703; Sep. 28, 2007.
PCT International Search Report; International App. No. PCT/US05/10254; Oct. 17, 2007.
PCT International Search Report; International App. No. PCT/US05/10250; Oct. 18, 2007.
PCT International Search Report; International App. No. PCT/US05/10253; Oct. 23, 2007.
PCT International Search Report; International App. No. PCT/US05/10249; Oct. 24, 2007.
PCT International Search Report; International App. No. PCT/US05/10251; Oct. 25, 2007.
PCT International Search Report; International App. No. PCT/US05/10059; Oct. 26, 2007.
PCT International Search Report; International App. No. PCT/US05/10842; Nov. 7, 2007.
PCT International Search Report; International App. no. PCT/US05/11207; Nov. 13, 2007.
Culler, David, et al., "Building Sensor Networks with TinyOS", University of California, Berkeley, Inter Research Berkeley, May 5, 2003, pp. 1-41.
Patnode, David, et al., "Wisenet", Senior Design Project, Spring 2003, (May 2003), pp. 1-26, cover page, and abstract.
U.S. Appl. No. 11/728,719, Tegreene, Clarence T.
U.S. Appl. No. 11/731,734, Tegreene, Clarence T.
U.S. Appl. No. 11/986,993, Tegreene, Clarence T.
U.S. Appl. No. 11/998,847, Tegreene, Clarence T.
U.S. Appl. No. 11/998,879, Tegreene, Clarence T.
U.S. Appl. No. 11/999,094, Jung et al.
Kaminsky et al.; "Decentralized User Authentication in a Global File System"; ACM; bearing a date of Dec. 2003; pp. 60-73; vol. 37, Issue 5, Bolton Landing, New York.

(56) References Cited

OTHER PUBLICATIONS

PCT International Search Report; International App. No. PCT/US05/10954; pp. 1-4; Feb. 26, 2008.
U.S. Appl. No. 10/900,147, Jung et al.
U.S. Appl. No. 10/882,119, Jung et al.
U.S. Appl. No. 10/877,109, Jung et al.
U.S. Appl. No. 10/877,099, Jung et al.
U.S. Appl. No. 10/850,914, Jung et al.
U.S. Appl. No. 10/844,614, Jung et al.
U.S. Appl. No. 10/844,613, Jung et al.
U.S. Appl. No. 10/844,612, Jung et al.
U.S. Appl. No. 10/844,564, Jung et al.
U.S. Appl. No. 10/843,987, Jung et al.
U.S. Appl. No. 10/816,375, Jung et al.
U.S. Appl. No. 10/816,364, Jung et al.
U.S. Appl. No. 10/816,358, Jung et al.
U.S. Appl. No. 10/816,102, Jung et al.
U.S. Appl. No. 10/816,082, Jung et al.
Li, Xin; Kim, Young Jin; Govindan, Ramesh; Hong, Wei; "Multi-dimensional Range Queries in Sensor Networks"; bearing dates of Nov. 5-7, 2003; pp. 63-75; ACM; located at http://www.cens.ucla.edu/sensys03/proceedings/p63-li.pdf.
Patnode, et al.; "Wisenet—TinyOS Based Wireless Network of Sensors", IEEE, bearing a date of Nov. 6, 2003; pp. 1-6; http://ieeexplore.ieee.org/.
PCT International Search Report; International App. No. PCT/US05/10054; pp. 1-3; dated Dec. 1, 2006.
PCT International Search Report; International App. No. PCT/US05/10843; pp. 1-3; dated Jul. 3, 2007.
PCT International Search Report; International App No. PCT/US05/09640; pp. 1-2; dated Jul. 9, 2007.
PCT International Search Report; International App. No. PCT/US05/09479; pp. 1-3; dated Jul. 17, 2007.
PCT International Search Report; International App No. PCT/US05/10053; pp. 1-3; dated Aug. 10, 2007.
PCT International Search Report; International App. No. PCT/US05/10955; pp. 1-2; Jun. 23, 2008.
PCT International Search Report; International App. No. PCT/US05/10953; pp. 1-3; Jun. 17, 2008.
U.S. Appl. No. 12/454,634, Jung et al.
U.S. Appl. No. 12/454,171, Jung et al.
Warneke, Brett et al.; "Ultra-Low Power Communication Logic Circuits for Distributed Sensor Networks"; EECS 241; bearing a date of Spring 1998; pp. 1-7; UC Berkeley.
Fornaro et al.; "Tiny Sensor-Based Computers Could Help Track Wildlife"; News Release; bearing a date of Nov. 6, 2003; pp. 1-2; located at http://www.ncsu.edu/news/press releases/03_11/321.pdf
Zhu, Yingwu et al.; "A Super-Peer Based Lookup in Structured Peer-to-Peer Systems"; Bearing a date of 2003; 6 pages.
Hong et al.; "TinySchema: Managing Attributes, Commands and Events in TinyOS"; bearing a date of Sep. 2003; printed on Dec. 13, 2012; pp. 1-9; Version 1.1.
Stathopoulos et al. "A Remote Code Update Mechanism for Wireless Sensor Networks"; CENS Technical Report # 30; bearing a date of Nov. 2003; pp. 1-16.

* cited by examiner

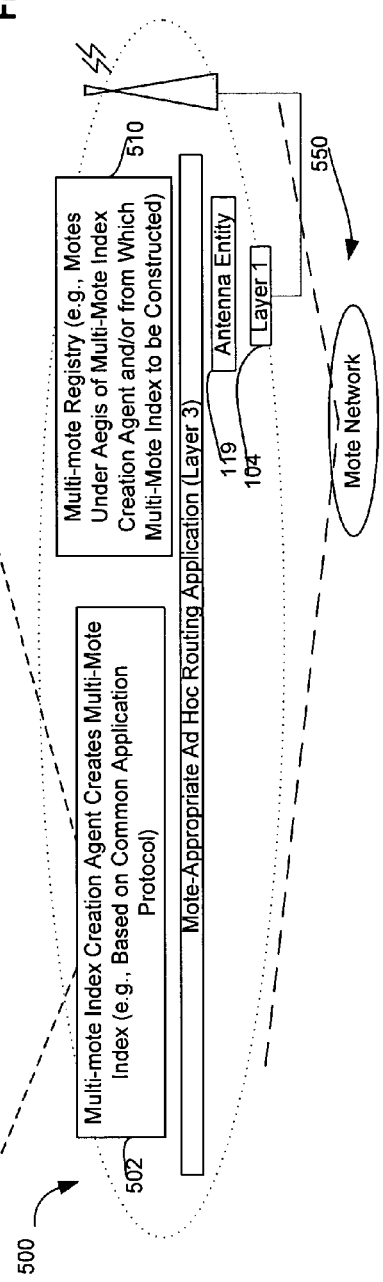

MULTI-MOTE INDEX ENTRY FOR MOTE ADDRESS 1A CONTENT INDEXES

MOTE 1A: SENSING INDEX

| | | Query Command Format | Output Format |
|---|---|---|---|
| Light Device | Light Device Information Available | Query Command Format | Output Format |
| Electrical/ Magnetic Device | Electrical/ Magnetic Device Information Available | Query Command Format | Output Format |
| Inertial Device | Inertial Device Information Available | Query Command Format | Output Format |
| Antenna | Antenna Information Available | Query Command Format | Output Format |

MOTE 1A: CONTROL INDEX

| | | Control Command Format | Feedback Format |
|---|---|---|---|
| Light Sensor | Light Device Commands Available | Control Command Format | Feedback Format |
| Electrical/ Magnetic Device | Electrical/ Magnetic Device Commands Available | Control Command Format | Feedback Format |
| Inertial Device | Inertial Device Commands Available | Control Command Format | Feedback Format |
| Antenna | Antenna Commands Available | Control Command Format | Feedback Format |

MULTI-MOTE INDEX ENTRY FOR MOTE ADDRESS 3A CONTENT INDEXES

MOTE 3A: SENSING INDEX

| | | Query Command Format | Output Format |
|---|---|---|---|
| Pressure Device | Pressure Device Information Available | Query Command Format | Output Format |
| Temp. Device | Temp. Device Information Available | Query Command Format | Output Format |
| Volume Device | Volume Device Information Available | Query Command Format | Output Format |
| Antenna | Antenna Information Available | Query Command Format | Output Format |

MOTE 3A: CONTROL INDEX

| | | Control Command Format | Feedback Format |
|---|---|---|---|
| Pressure Device | Pressure Device Commands Available | Control Command Format | Feedback Format |
| Temp. Device | Temp. Device Commands Available | Control Command Format | Feedback Format |
| Volume Device | Volume Device Commands Available | Control Command Format | Feedback Format |
| Antenna | Antenna Commands Available | Control Command Format | Feedback Format |

| 5A | 5B |
|---|---|

Key To Fig. 5

FIG. 6B

| MULTI-MOTE CONTENT INDEX ENTRY FOR MOTE ADDRESS 1A CONTENT INDEXES | | | | | MULTI-MOTE CONTENT INDEX ENTRY FOR MOTE ADDRESS 3A CONTENT INDEXES | | | |
|---|---|---|---|---|---|---|---|---|
| MOTE 1A: SENSING INDEX | | | | | MOTE 3A: SENSING INDEX | | | |
| Light Device | Light Device Information Available | Query Command Format | Output Format | | Pressure Device | Pressure Device Information Available | Query Command Format | Output Format |
| Electrical/ Magnetic Device | Electrical/ Magnetic Device Information Available | Query Command Format | Output Format | | Temp. Device | Temp. Device Information Available | Query Command Format | Output Format |
| Inertial Device | Inertial Device Information Available | Query Command Format | Output Format | | Volume Device | Volume Device Information Available | Query Command Format | Output Format |
| Antenna | Antenna Information Available | Query Command Format | Output Format | | Antenna | Antenna Information Available | Query Command Format | Output Format |
| MOTE 1A: CONTROL INDEX | | | | | MOTE 3A: CONTROL INDEX | | | |
| Light Sensor | Light Device Commands Available | Control Command Format | Feedback Format | | Pressure Device | Pressure Device Commands Available | Control Command Format | Feedback Format |
| Electrical/ Magnetic Device | Electrical/ Magnetic Device Commands Available | Control Command Format | Feedback Format | | Temp. Device | Temp. Device Commands Available | Control Command Format | Feedback Format |
| Inertial Device | Inertial Device Commands Available | Control Command Format | Feedback Format | | Volume Device | Volume Device Commands Available | Control Command Format | Feedback Format |
| Antenna | Antenna Commands Available | Control Command Format | Feedback Format | | Antenna | Antenna Commands Available | Control Command Format | Feedback Format |

Key To Fig. 6

| 6A | 6B |
|---|---|

FIG. 11A

Federated Mote Index for First-Administered Set of Motes and Second-Administered Set of Motes

AGGREGATION OF CONTENT INDEXES FOR MOTE ADDRESSES 1A AND 2A OF FIRST-ADMINISTERED SET OF MOTES

| | MOTE 1A OF FIRST-ADMINISTERED SET OF MOTES: SENSING INDEX | | |
|---|---|---|---|
| Light Device | Light Device Information Available | Query Command Format | Output Format |
| Electrical/ Magnetic Device | Electrical/ Magnetic Device Information Available | Query Command Format | Output Format |
| Inertial Device | Inertial Device Information Available | Query Command Format | Output Format |
| Antenna | Antenna Information Available | Query Command Format | Output Format |

| | MOTE 2A OF FIRST-ADMINISTERED SET OF MOTES: CONTROL INDEX | | |
|---|---|---|---|
| Light Sensor | Light Device Commands Available | Control Command Format | Feedback Format |
| Electrical/ Magnetic Device | Electrical/ Magnetic Device Commands Available | Control Command Format | Feedback Format |
| Inertial Device | Inertial Device Commands Available | Control Command Format | Feedback Format |
| Antenna | Antenna Commands Available | Control Command Format | Feedback Format |

AGGREGATION OF CONTENT INDEXES FOR MOTE ADDRESSES 3A AND 4A OF SECOND-ADMINISTERED SET OF MOTES

| | MOTE 3A OF SECOND-ADMINISTERED SET OF MOTES: SENSING INDEX | | |
|---|---|---|---|
| Pressure Device | Pressure Device Information Available | Query Command Format | Output Format |
| Temp. Device | Temp. Device Information Available | Query Command Format | Output Format |
| Volume Device | Volume Device Information Available | Query Command Format | Output Format |
| Antenna | Antenna Information Available | Query Command Format | Output Format |

| | MOTE 4A OF SECOND-ADMINISTERED SET OF MOTES: CONTROL INDEX | | |
|---|---|---|---|
| Pressure Device | Pressure Device Commands Available | Control Command Format | Feedback Format |
| Temp. Device | Temp. Device Commands Available | Control Command Format | Feedback Format |
| Volume Device | Volume Device Commands Available | Control Command Format | Feedback Format |
| Antenna | Antenna Commands Available | Control Command Format | Feedback Format |

Key To Fig. 11

| 11A | 11B |

FIG. 11B

Key To Fig. 11

| 11A | 11B |

916

MOTE 2A OF FIRST-ADMINISTERED SET OF MOTES: ROUTING/SPATIAL INDEX

| Mote-Network Address 2A | Comm. Link Quality of Service: Good | Absolute Coordinates: Long Lat. (e.g., GPS) | Relative Coordinates (e.g., 2-d or 3-d relative to mote 1A location) |
| Mote-Network Address 3A | Comm. Link Quality of Service: Fair | Absolute Coordinates: Long Lat. (e.g., GPS) | Relative Coordinates (e.g., 2-d or 3-d relative to mote 1A location) |
| Mote-Network Address 5A | Comm. Link Quality of Service: Poor | Absolute Coordinates: Long Lat. (e.g., GPS) | Relative Coordinates (e.g., 2-d or 3-d relative to mote 1A location) |

MOTE 4A OF SECOND-ADMINISTERED SET OF MOTES: ROUTING/SPATIAL INDEX

| Mote-Network Address 1A | Comm. Link Quality of Service: Good | Absolute Coordinates: Long Lat. (e.g., GPS) | Relative Coordinates (e.g., 2-d or 3-d relative to mote 1A location) |
| Mote-Network Address 2A | Comm. Link Quality of Service: Fair | Absolute Coordinates: Long Lat. (e.g., GPS) | Relative Coordinates (e.g., 2-d or 3-d relative to mote 1A location) |
| Mote-Network Address 5A | Comm. Link Quality of Service: Poor | Absolute Coordinates: Long Lat. (e.g., GPS) | Relative Coordinates (e.g., 2-d or 3-d relative to mote 1A location) |
| Mote-Network Address 6A | Comm. Link Quality of Service: Fair | Absolute Coordinates: Long Lat. (e.g., GPS) | Relative Coordinates (e.g., 2-d or 3-d relative to mote 1A location) |

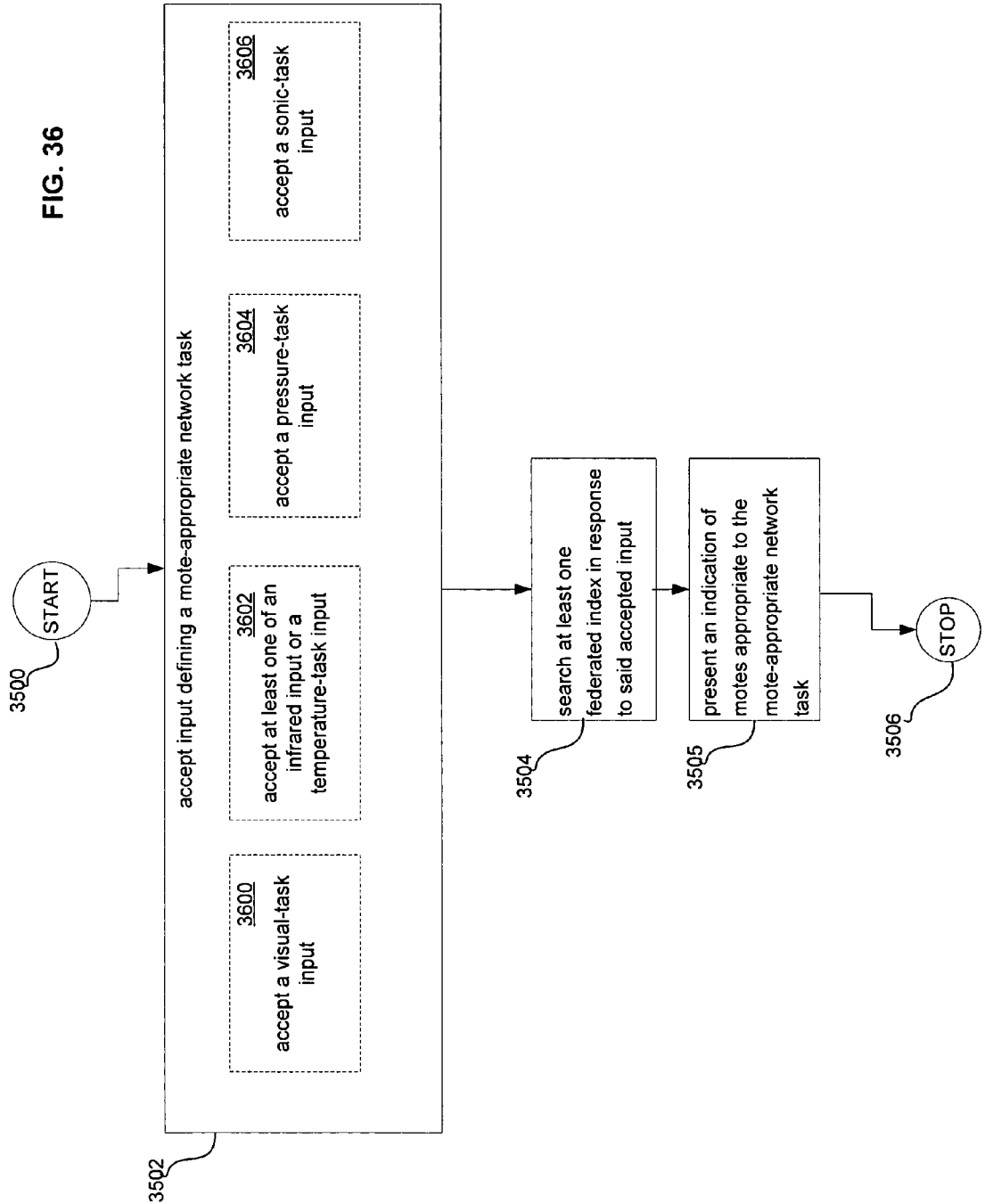

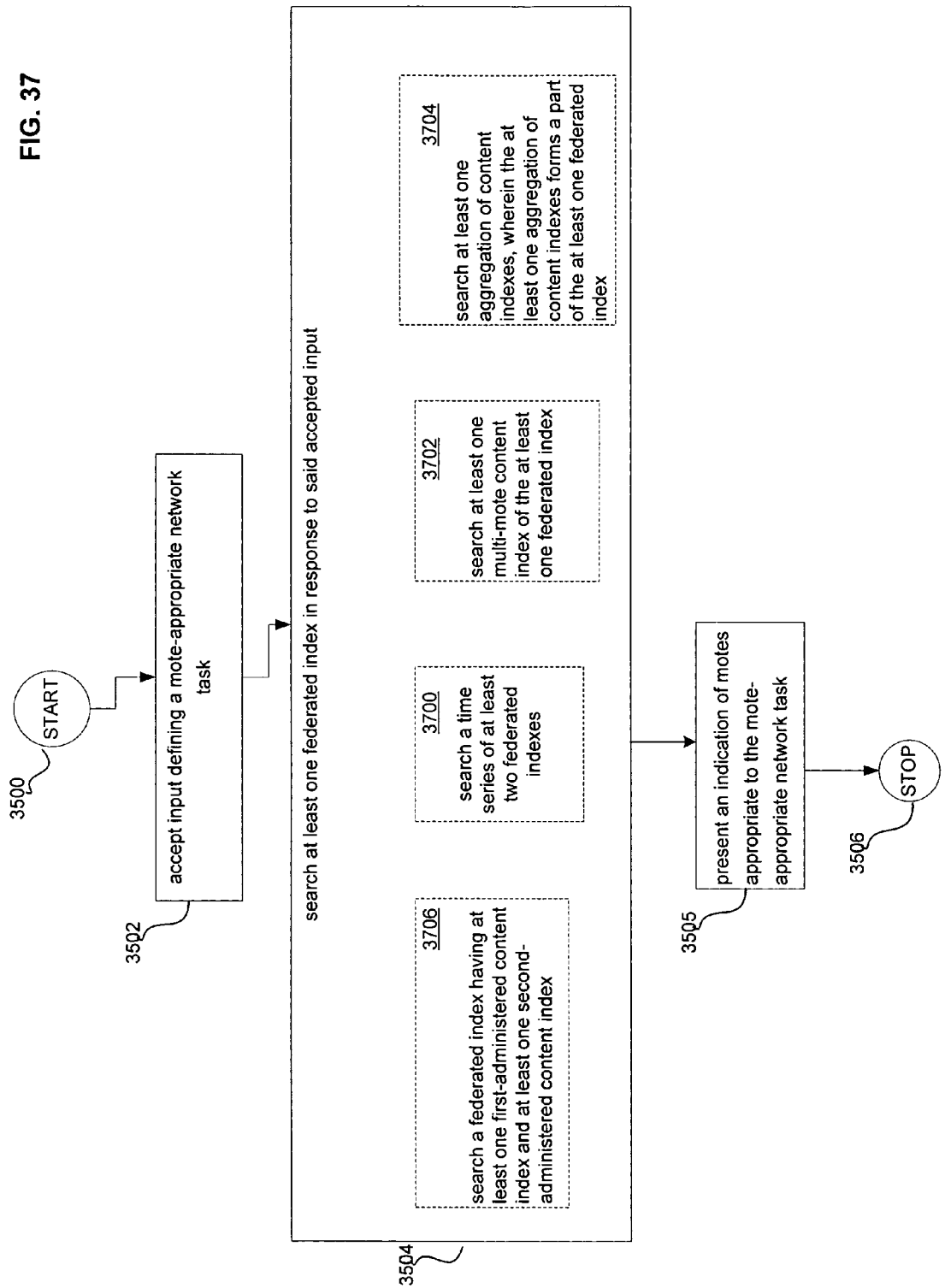

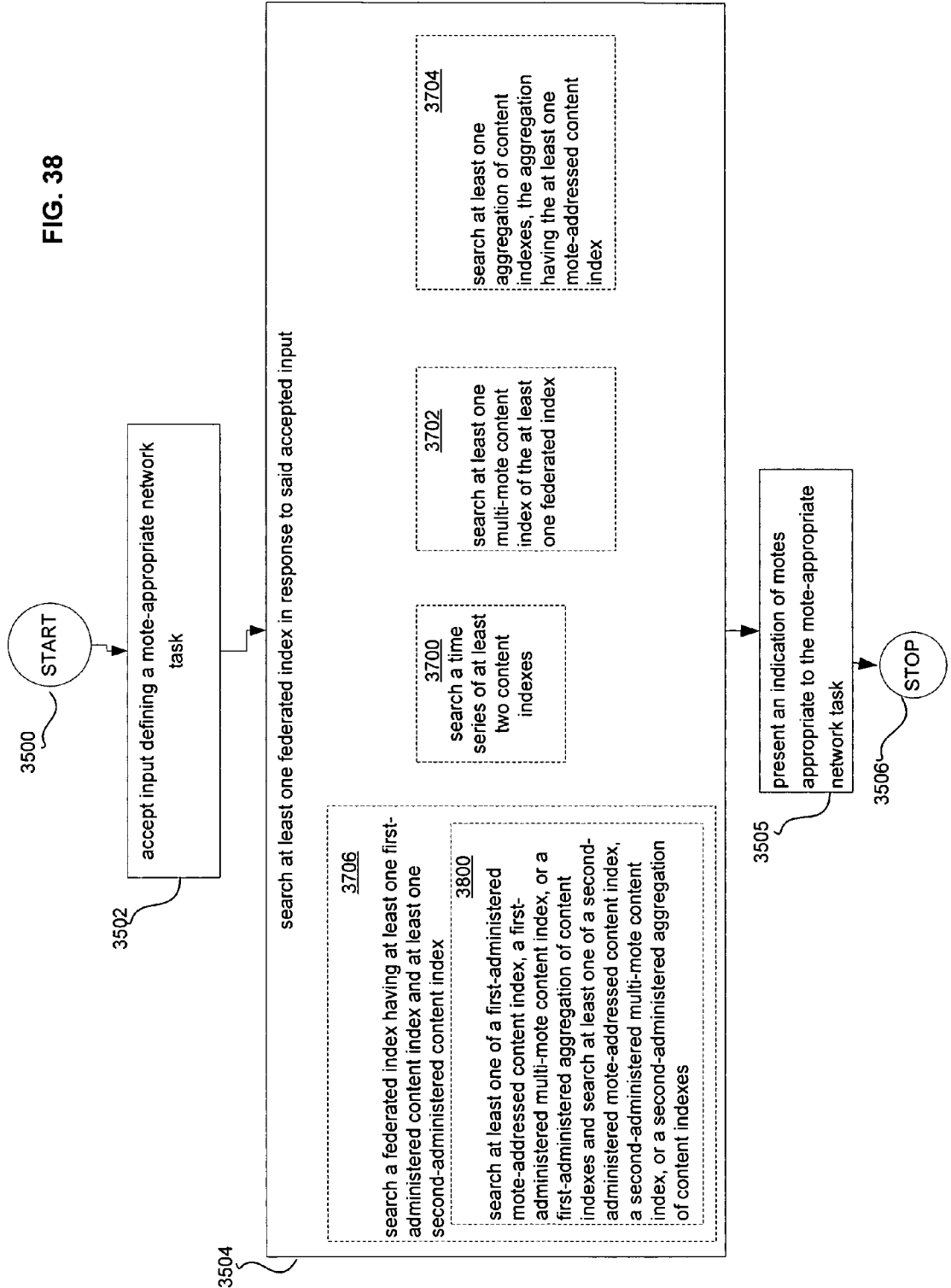

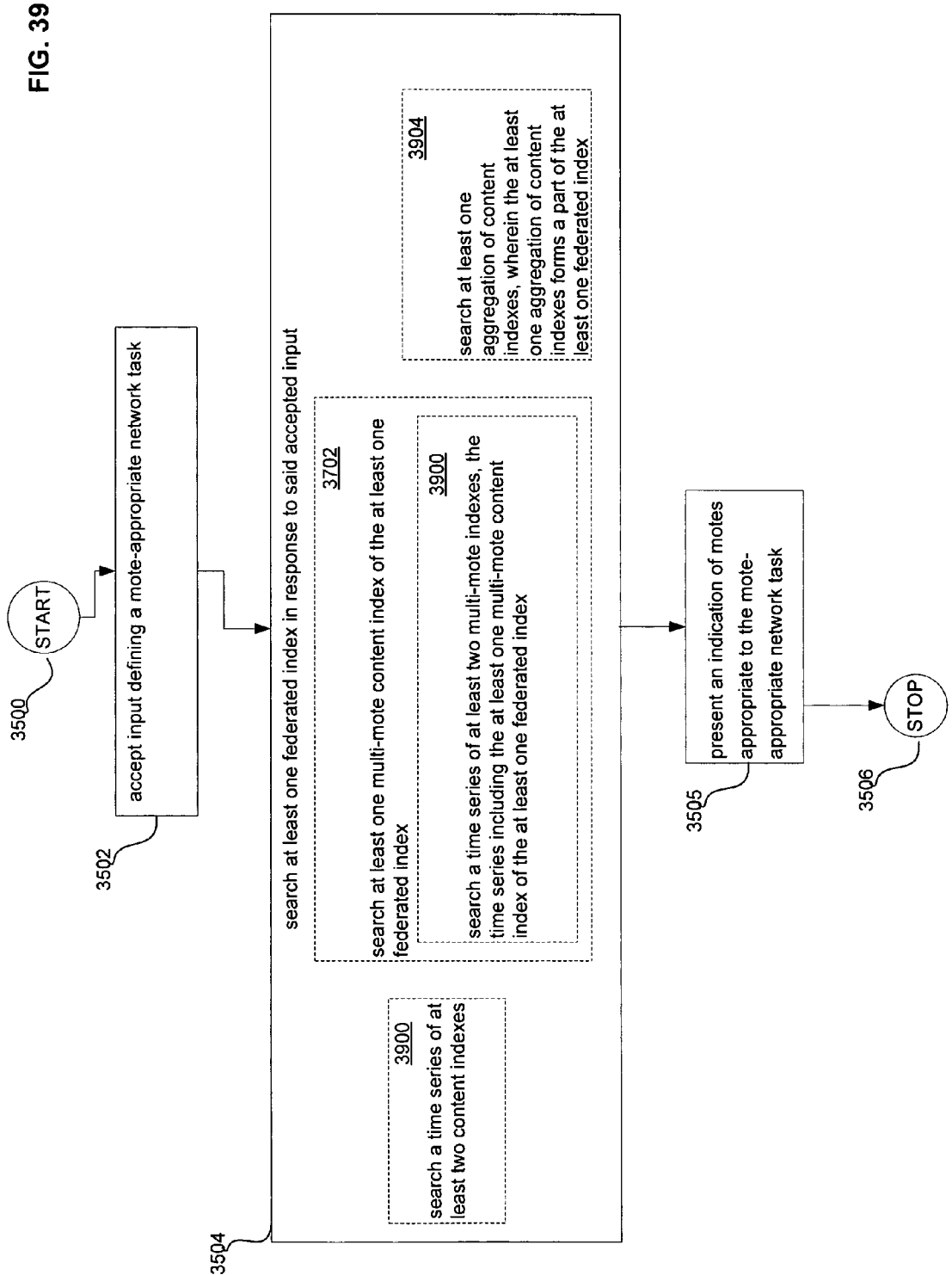

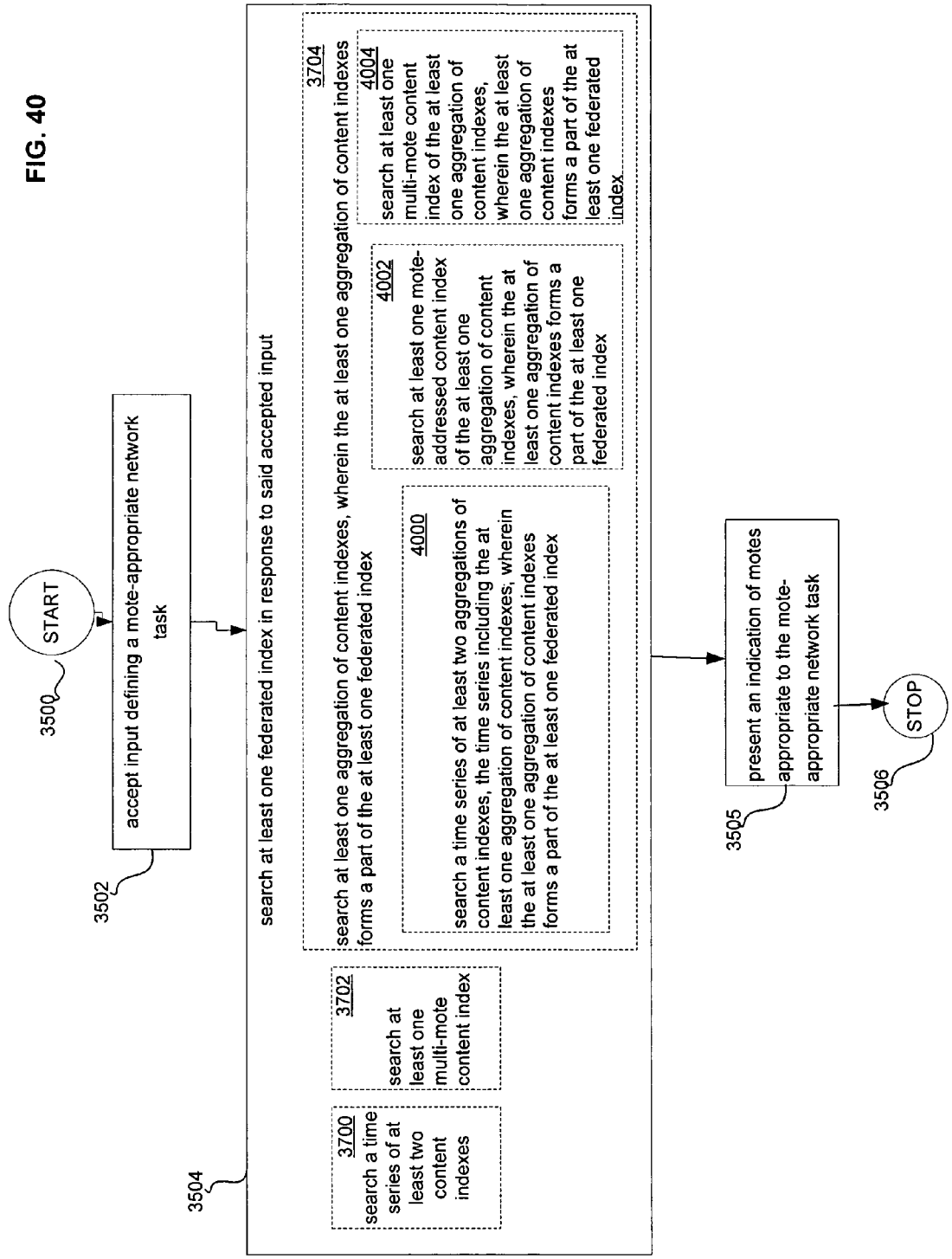

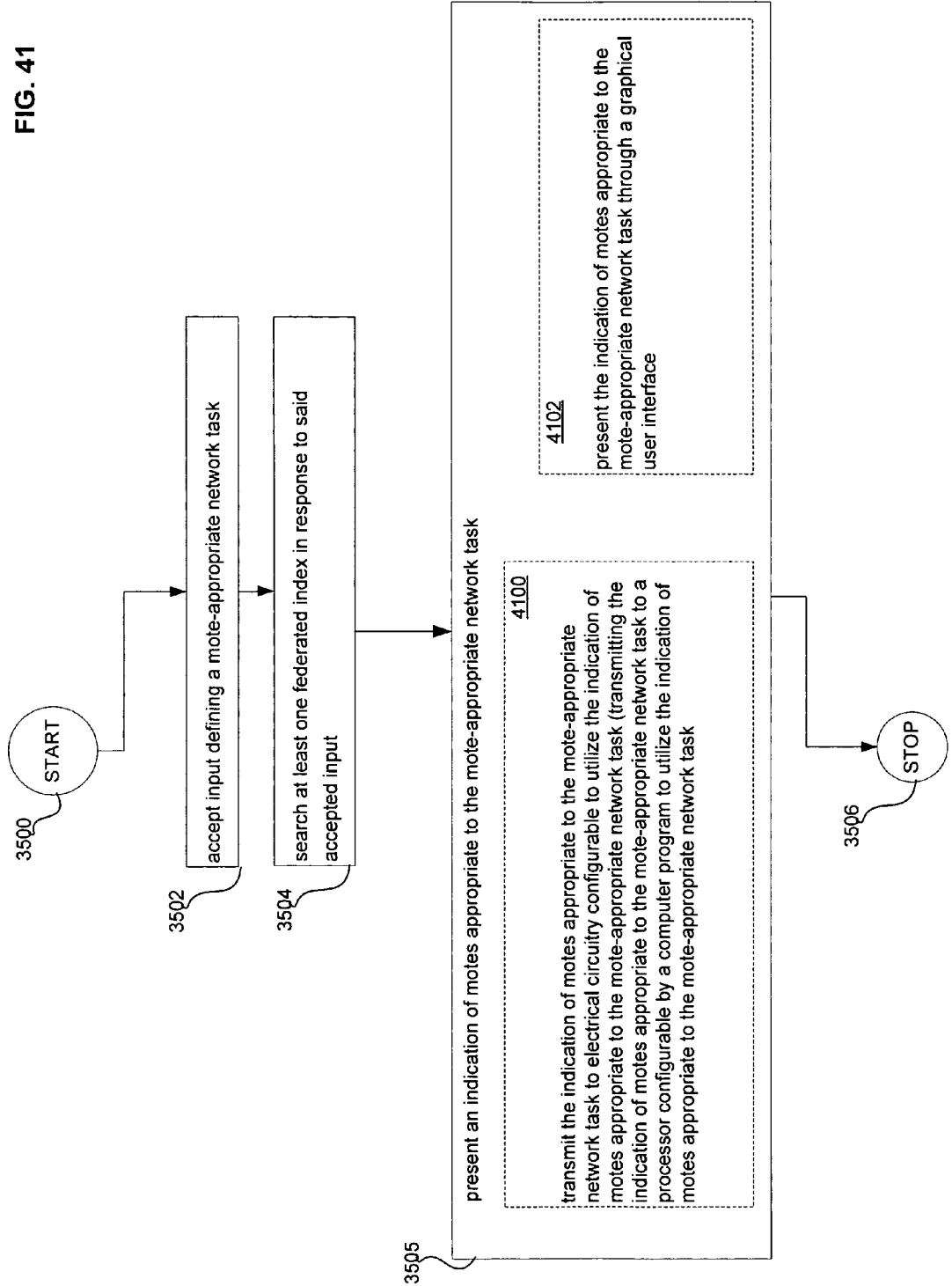

USING MOTE-ASSOCIATED INDEXES

CROSS-REFERENCE TO RELATED APPLICATIONS

The present application is related to, claims the earliest available effective filing date(s) from the following listed application(s) (the "Related Applications") (e.g., claims earliest available priority dates for other than provisional patent applications or claims benefits under 35 USC §119(e) for provisional patent applications), and incorporates by reference in its entirety all subject matter of the following listed application(s) to the extent such subject matter is not inconsistent herewith; the present application also claims the earliest available effective filing date(s) from, and also incorporates by reference in its entirety all subject matter of any and all parent, grandparent, great-grandparent, etc. applications of the "Related Application(s).

1. U.S. patent application Ser. No. 10/844,613 entitled MOTE-ASSOCIATED LOG CREATION, naming Edward K. Y. Jung and Clarence T. Tegreene as inventors, filed 12 May 2004.
2. U.S. patent application Ser. No. 10/844,564 entitled TRANSMISSION OF MOTE-ASSOCIATED LOG DATA, naming Edward K. Y. Jung and Clarence T. Tegreene as inventors, filed 12 May 2004.
3. U.S. patent application Ser. No. 10/844,612 entitled AGGREGATING MOTE-ASSOCIATED LOG DATA, naming Edward K. Y. Jung and Clarence T. Tegreene as inventors, filed 12 May 2004.
4. U.S. patent application Ser. No. 10/844,614 entitled TRANSMISSION OF AGGREGATED MOTE-ASSOCIATED LOG DATA, naming Edward K. Y. Jung and Clarence T. Tegreene as inventors, filed 12 May 2004.
5. U.S. patent application Ser. No. 10/843,987 entitled FEDERATING MOTE-ASSOCIATED LOG DATA, naming Edward K. Y. Jung and Clarence T. Tegreene as inventors, filed 12 May 2004.
6. U.S. patent application Ser. No. 10/816,375 entitled MOTE-ASSOCIATED INDEX CREATION, naming Edward K. Y. Jung and Clarence T. Tegreene as inventors, filed 31 Mar. 2004.
7. U.S. patent application Ser. No. 10/816,082 entitled TRANSMISSION OF MOTE-ASSOCIATED INDEX DATA, naming Edward K. Y. Jung and Clarence T. Tegreene as inventors, filed 31 Mar. 2004.
8. U.S. patent application Ser. No. 10/816,358 entitled AGGREGATING MOTE-ASSOCIATED INDEX DATA, naming Edward K. Y. Jung and Clarence T. Tegreene as inventors, filed 31 Mar. 2004.
9. U.S. patent application Ser. No. 10/816,102 entitled TRANSMISSION OF AGGREGATED MOTE-ASSOCIATED INDEX DATA, naming Edward K. Y. Jung and Clarence T. Tegreene as inventors, filed 31 Mar. 2004.
10. U.S. patent application Ser. No. 10/816,364 entitled FEDERATING MOTE-ASSOCIATED INDEX DATA, naming Edward K. Y. Jung and Clarence T. Tegreene as inventors, filed 31 Mar. 2004.
11. U.S. patent application Ser. No. 10/813,967 entitled MOTE NETWORKS HAVING DIRECTIONAL ANTENNAS, naming Clarence T. Tegreene as inventor, filed 31 Mar. 2004, now issued as U.S. Pat. No. 7,366,544.
12. U.S. patent application Ser. No. 10/814,454 entitled MOTE NETWORKS USING DIRECTIONAL ANTENNA TECHNIQUES, naming Clarence T. Tegreene as inventor, filed 31 Mar. 2004, now issued as U.S. Pat. No. 7,317,898.
13. U.S. patent application Ser. No. 10/850,914 entitled USING MOTE-ASSOCIATED LOGS, naming Edward K. Y. Jung and Clarence T. Tegreene as inventors, filed 21 May 2004.
14. U.S. patent application Ser. No. 10/877,109 entitled USING FEDERATED MOTE-ASSOCIATED LOGS, naming Edward K. Y. Jung and Clarence T. Tegreene as inventors, filed 25 Jun. 2004.
15. U.S. patent application Ser. No. 10/877,099 entitled FREQUENCY REUSE TECHNIQUES IN MOTE-APPROPRIATE NETWORKS, naming Edward K. Y. Jung and Clarence T. Tegreene as inventors, filed 25 Jun. 2004.
16. U.S. patent application Ser. No. 10/882,119 entitled MOTE-APPROPRIATE NETWORK POWER REDUCTION TECHNIQUES, naming Edward K. Y. Jung and Clarence T. Tegreene as inventors, filed 30 Jun. 2004.
17. U.S. patent application Ser. No. 10/900,147 entitled USING FEDERATED MOTE-ASSOCIATED INDEXES, naming Edward K. Y. Jung and Clarence T. Tegreene as inventors, filed contemporaneously herewith.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present application relates, in general, to motes.

SUMMARY

In one aspect, a method includes but is not limited to: accepting input defining a mote-appropriate network task; searching at least one mote-addressed content index in response to said accepted input; and presenting an indication of motes appropriate to the mote-appropriate network task. In addition to the foregoing, other method aspects are described in the claims, drawings, and/or text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a method includes but is not limited to: loading at least one mote-addressed content index to a computer system external to a mote-appropriate network; accepting input defining a task of the mote-appropriate network; and searching the loaded at least one mote-addressed content index in response to said input. In addition to the foregoing, other method aspects are described in the claims, drawings, and/or text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a method includes but is not limited to: loading at least one multi-mote content index to a computer system external to a mote-appropriate network; accepting input defining a task of the mote-appropriate network; and searching the loaded at least one multi-mote content index, in response to said input. In addition to the foregoing, other method aspects are described in the claims, drawings, and/or text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a method includes but is not limited to: loading at least one aggregation of content indexes to a computer system external to a mote-appropriate network; accepting input defining a task of the mote-appropriate network; and searching the loaded at least one aggregation of content indexes, in response to said input. In addition to the foregoing, other method aspects are described in the claims, drawings, and/or text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In addition to the foregoing, various other method and/or system aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined by the claims, will become apparent in the detailed description set forth herein.

BRIEF DESCRIPTION OF THE FIGURES

FIG. 5 depicts an exploded view of mote 500 forming a part of mote-appropriate network 550 that may serve as a context for introducing one or more processes and/or devices described herein.

FIG. 11 shows an exemplary exploded view of federated index 916.

FIG. 36 illustrates a high-level logic flowchart depicting several alternate implementations of the high-level logic flowchart of FIG. 35.

FIG. 37 illustrates a high-level logic flowchart depicting several alternate implementations of the high-level logic flowchart of FIG. 35.

FIG. 38 shows a high-level logic flowchart depicting several alternate implementations of the high-level logic flowchart of FIG. 37.

FIG. 39 shows a high-level logic flowchart depicting several alternate implementations of the high-level logic flowchart of FIG. 37.

FIG. 40 shows a high-level logic flowchart depicting several alternate implementations of the high-level logic flowchart of FIG. 37.

FIG. 41 illustrates a high-level logic flowchart depicting several alternate implementations of the high-level logic flowchart of FIG. 35.

The use of the same symbols in different drawings typically indicates similar or identical items.

DETAILED DESCRIPTION

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

I. Mote-Associated Index Creation

A. Structure(s) and/or System(s)

Figure 1:
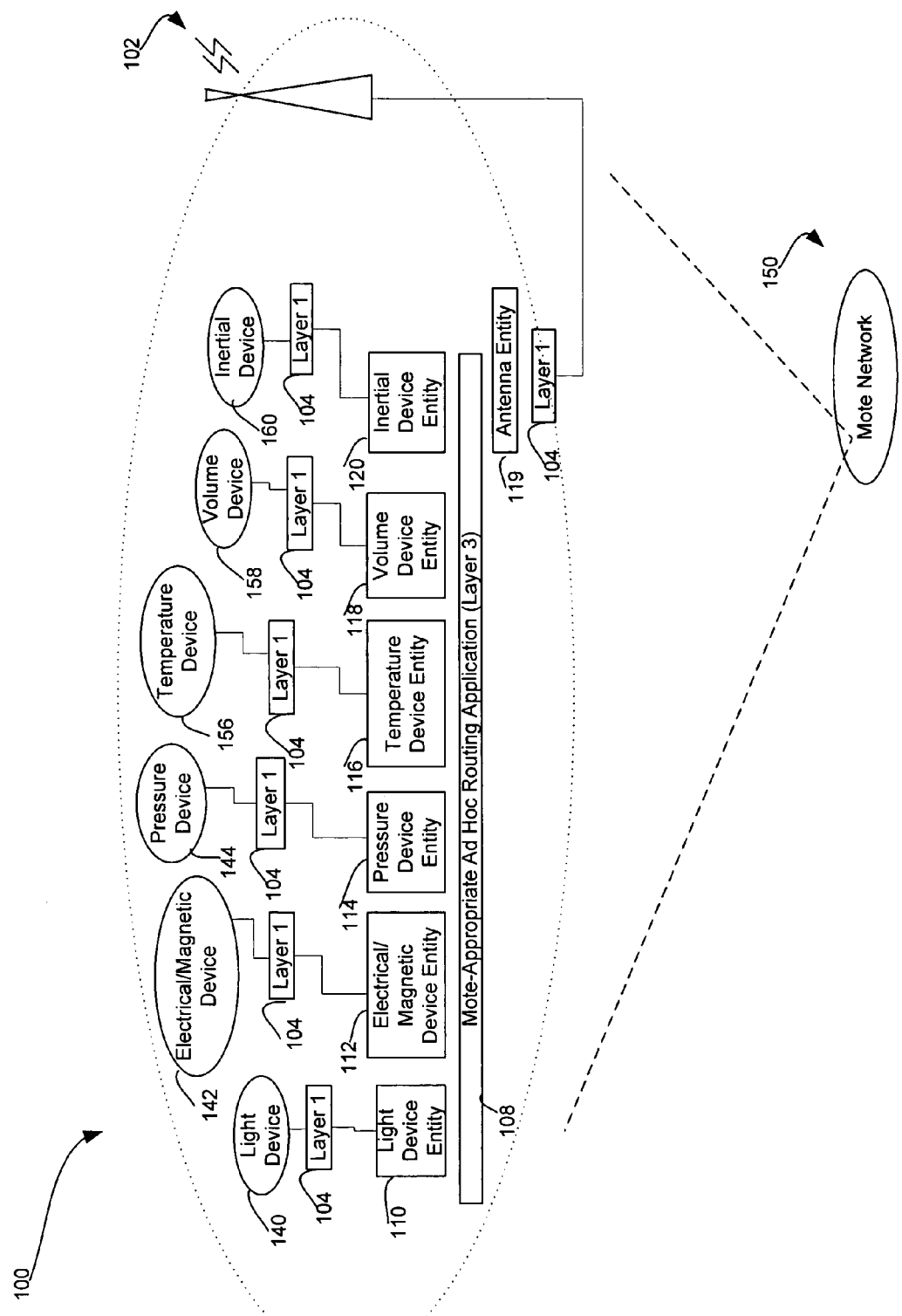
FIG. 1 shows an example of mote 100 of mote-appropriate network 150 that may serve as a context of one or more processes and/or devices described herein.

With reference now to FIG. 1, shown is an example of mote 100 of mote-appropriate network 150 that may serve as a context for introducing one or more processes and/or devices described herein. A mote is typically composed of sensors, actuators, computational entities, and/or communications entities formulated, in most cases at least in part, from a substrate. As used herein, the term "mote" typically means a semi-autonomous computing, communication, and/or sensing device as described in the mote literature (e.g., Intel Corporation's mote literature), as well as equivalents recognized by those having skill in the art (e.g., Intel Corporation's smart dust projects). Mote 100 depicts a specific example of a more general mote. Mote 100 is illustrated as having antenna 102, physical layer 104, antenna entity 119, network layer 108 (shown for sake of example as a mote-appropriate ad hoc routing application), light device entity 110, electrical/magnetic device entity 112, pressure device entity 114, temperature device entity 116, volume device entity 118, and inertial device entity 120. Light device entity 110, electrical/magnetic device entity 112, pressure device entity 114, temperature device entity 116, volume device entity 118, antenna entity 119, and inertial device entity 120 are depicted to respectively couple through physical layers 104 with light device 140, electrical/magnetic device 142, pressure device 144, temperature device 156, volume device 158, antenna 102, and inertial device 160. Those skilled in the art will appreciate that the herein described entities and/or devices are illustrative, and that other entities and/or devices consistent with the teachings herein may be substituted and/or added.

Those skilled in the art will appreciate that herein the term "device," as used in the context of devices comprising or coupled to a mote, is intended to represent but is not limited to transmitting devices and/or receiving devices dependent on context. For instance, in some exemplary contexts light device 140 is implemented using one or more light transmitters (e.g., coherent light transmission devices or non-coherent light transmission devices) and/or one or more light receivers (e.g., coherent light reception devices or non-coherent light reception devices) and/or one or more supporting devices (e.g., optical filters, hardware, firmware, and/or software). In some exemplary implementations, electrical/magnetic device 142 is implemented using one or more electrical/magnetic transmitters (e.g., electrical/magnetic transmission devices) and/or one or more electrical/magnetic receivers (e.g., electrical/magnetic reception devices) and/or one or more supporting devices (e.g., electrical/magnetic filters, supporting hardware, firmware, and/or software). In some exemplary implementations, pressure device 144 is implemented using one or more pressure transmitters (e.g., pressure transmission devices) and/or one or more pressure receivers (e.g., pressure reception devices) and/or one or more supporting devices (e.g., supporting hardware, firmware, and/or software). In some exemplary implementations, temperature device 156 is implemented using one or more temperature transmitters (e.g., temperature transmission devices) and/or one or more temperature receivers (e.g., temperature reception devices) and/or one or more supporting devices (e.g., supporting hardware, firmware, and/or software). In some exemplary implementations, volume device 158 is implemented using one or more volume transmitters (e.g., gas/liquid transmission devices) and/or one or more volume receivers (e.g., gas/liquid reception devices) and/or one or more supporting devices (e.g., supporting hardware, firmware, and/or software). In some exemplary implementations, inertial device 160 is implemented using one or more inertial transmitters (e.g., inertial force transmission devices) and/or one or more inertial receivers (e.g., inertial force reception devices) and/or one or more supporting devices (e.g., supporting hardware, firmware, and/or software). Those skilled in the art will recognize that although a quasi-stack architecture is utilized herein for clarity of presentation, other architectures may be substituted in light of the teachings herein. In addition, although not expressly shown, those having skill in the art will appreciate that entities and/or functions associated with concepts underlying Open System Interconnection (OSI) layer 2 (data link layers) and OSI layers 4-6 (transport-presentation layers) may be present and active to allow/provide communications consistent with the teachings herein. Those having skill in the art will appreciate that these entities and/or functions are not expressly shown/described herein for sake of clarity.

Figure 2:
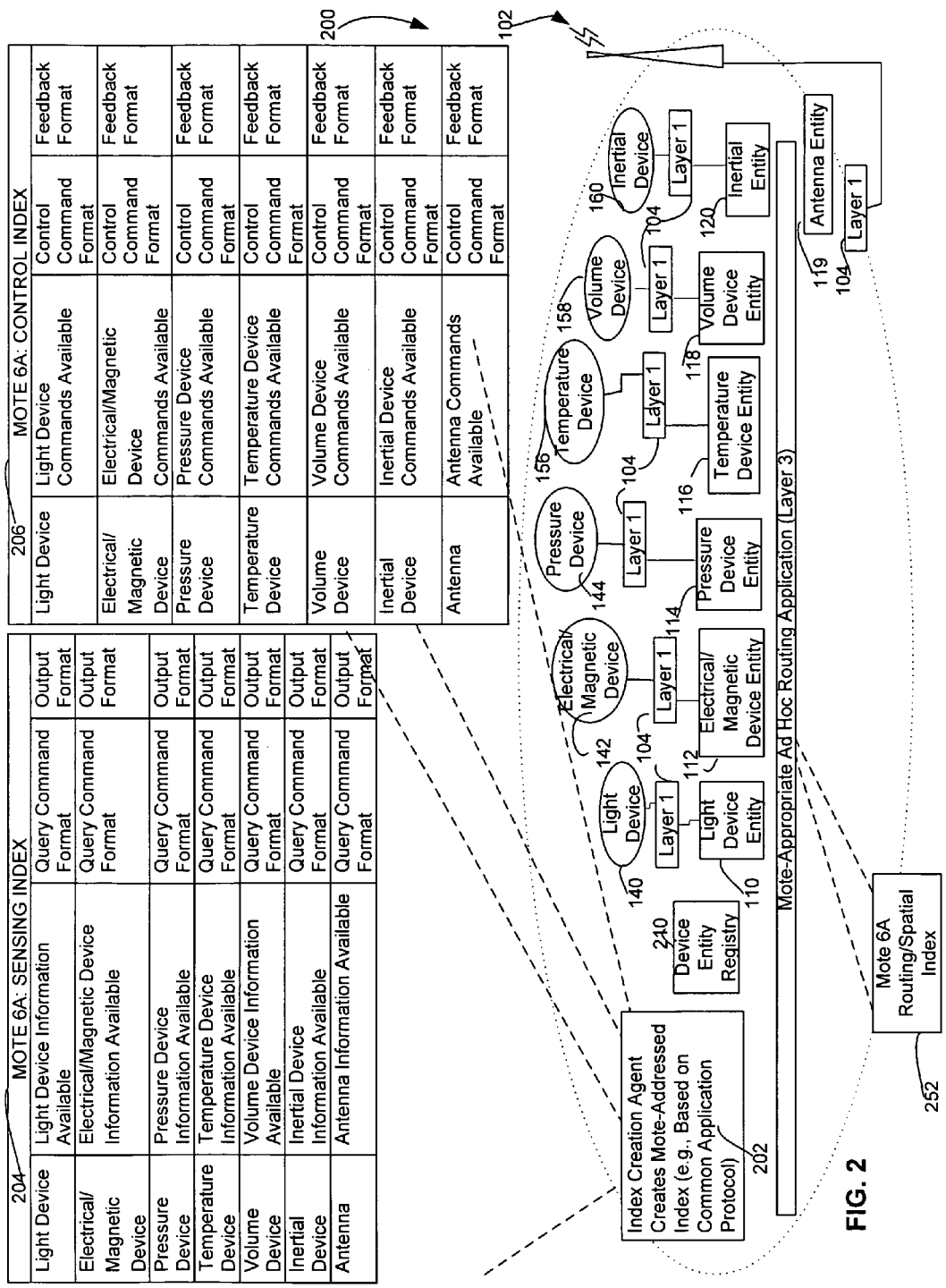
FIG. 2 depicts an exploded view of mote 200 that forms a part of a mote-appropriate network (e.g., as shown in FIGS. 4, 7, 8, 9, and/or 10).

Referring now to FIG. 2, depicted is an exploded view of mote 200 that forms a part of a mote-appropriate network (e.g., as shown in FIGS. 4, 7, 8, 9, and/or 10). Mote 200 is illustrated as similar to mote 100 (FIG. 1), but with the addition of index creation agent 202, mote-addressed sensing index 204, mote-addressed control index 206, and mote-addressed routing/spatial index 252. Specific instances of mote-addressed control and/or mote-addressed sensing indexes are shown in FIG. 2. For an example of what one implementation of a mote-addressed routing/spatial index might contain, see the mote-addressed routing/spatial indexes shown internal to multi-mote content index 504 of FIG. 5. As shown in FIG. 5, in some implementations a mote-addressed routing/spatial index will contain a listing of mote addresses directly accessible from a mote (e.g., via direct radio transmission/reception from/by antenna 102), an assessment of qualities of data communications service on the data communication links to such directly accessible motes, and/or a listing of relative and/or absolute spatial coordinates of such directly accessible motes.

In one implementation, index creation agent 202 is a computer program—resident in mote 200—that executes on a processor of mote 200 and that constructs and/or stores mote-addressed sensing index 204, mote-addressed control index 206, and/or mote-addressed routing/spatial index 252 in memory of mote 200. In some implementations, index creation agent 202 is pre-installed on mote 200 prior to mote 200 being added to a mote-appropriate network, while in other implementations index creation agent 202 crawls and/or is transmitted to mote 200 from another location (e.g., an index creation agent at another mote or another networked computer (not shown) clones itself and sends that clone to mote 200). In yet other implementations, index creation agent 202 is installed at a proxy (not shown) for mote 200.

The inventors point out that in some applications the systems and/or processes transfer their instructions in a piecewise fashion over time, such as is done in the mote-appropriate Mate' virtual machine of the related art. The inventors also point out that in some applications motes are low-power and/or low bandwidth devices, and thus in some implementations the system(s) and process(es) described herein allow many minutes (e.g., hours, days, or even weeks) for herein described agents and/or processes to migrate to and establish themselves at various nodes. The same may also hold true for transmission of information among nodes in that in some implementations such transmission may be done over the course of hours, days, or even weeks depending upon bandwidth, power, and/or other constraints. In other implementations, the migrations and/or transmissions are accomplished more rapidly, and in some cases may be accomplished as rapidly as possible.

B. Process(es) and/or Scheme(s)

Mote 200 of FIG. 2 can serve as a context in which one or more processes and/or devices may be illustrated. In one exemplary process, once index creation agent 202 has become active at mote 200, index creation agent 202 communicates with device entity registry 210 to receive device identifiers indicative of device entities present at mote 200 (e.g., light device entity 110, electrical/magnetic device entity 112, pressure device entity 114, etc.). In some implementations, device entities of mote 200 register their presences with device entity registry 210, while in other implementations the operating system of mote 200 registers the device entities when the operating system installs the device entities and/or their associated drivers (if any). In some implementations, once index creation agent 202 becomes aware of what device entities are present, index creation agent 202 communicates with the device entities (e.g., light device entity 110, electrical/magnetic entity 112, pressure entity 114, etc.) to find out what sensing functions are present and/or available at their various respectively associated devices (e.g., light device 140, electrical/magnetic device 142, pressure device 144, etc.), the formats used to query their various respectively associated devices, and the format in which the information will be rendered by their various respectively associated devices; index creation agent 202 also queries the device entities to find out what control functions are present at their various respectively associated devices, the formats used to cause their various respectively associated devices to execute their respective control functions, and the formats in which their various respectively associated devices will render feedback about control command execution. In some implementations, index creation agent 202 also communicates with routing/spatial index 252 to find out the mote-network address of mote 200 (e.g., mote-network address 6A) as well as other spatial information (e.g., mote-network addresses and/or spatial locations of the motes that can be reached directly by wireless link from mote 200; spatial locations may be absolute and/or relative to some marker, such as mote 200 itself). In some implementations, index creation agent 202 communicates with the device entities using a common application protocol which specifies standard interfaces that allow index creation agent 202 to garner the necessary information without knowing the internal workings and/or architectures of each specific device entity. In other implementations, such a common application protocol is not used.

In various implementations, contemporaneous with and/or subsequent to index creation agent 202 communicating with the device entities, index creation unit 202 creates one or more mote-addressed content indexes which in some implementations are associated with the mote-network address of the mote at which index creation unit 202 resides. The inventors point out that examples of the term "index," and/or phrases containing the term "index," exist in the text (e.g., independent claims, dependent claims, detailed description, and/or summary) and/or drawings forming the present application and that such term and/or phrases may have scopes different from like terms and/or phrases used in other contexts. Mote 200 is depicted for sake of illustration as having a mote-address of 6A. Accordingly, specific examples of more general mote-addressed content indexes are shown in FIG. 2 as mote 6A-addressed sensing index 204 and mote 6A-addressed control index 206, which respectively list the sensing and control capabilities in association with device-identifiers associated with devices present and/or available at mote 200; in addition, shown as yet another specific example of more general mote-addressed content indexes is mote 6A-addressed routing/spatial index 252 which typically contains a listing of mote-network addresses of those motes directly accessible from mote 200 and such directly accessible motes' spatial orientations relative to mote 200 and/or some other common spatial reference location (e.g., GPS). In some implementations, index creation unit 202 creates one or more extensible mote-addressed content indexes (e.g., creating the one or more extensible indexes in response to a type of content being indexed). In addition, those having skill in the art will appreciate that while direct mote addressing is shown and described herein for sake of clarity (e.g., mote-appropriate network addresses), the mote addressing described herein may also entail indirect addressing, dependent upon context. Examples of indirect addressing include approaches where a mote-address encodes an address of an agent that in turn produces the address of the mote (analogous to the Domain Name System in the Internet), or where the mote-address directly or indirectly encodes a route to a mote (analogous to explicit or implicit routable addresses.). Those having skill in the art will appreciate that adapting the teachings herein to indirect addressing may be done with a reasonable amount of experimentation, and that such adaptation is not expressly set forth herein for sake of clarity.

As noted herein, a content index may have a device identifier which in various implementations may include an implicit and/or explicit indicator used to reference the specific device at that mote. Those having skill in the art will appreciate that ways in which such may be achieved include the use of a structured name. Those having skill in the art will appreciate that in some implementations mote-local devices may also have global addresses, which may be substituted or allowed to "stand in" for mote addresses.

II. Transmission of Mote-Associated Index Data

A. Structure(s) and/or System(s)

Figure 3:
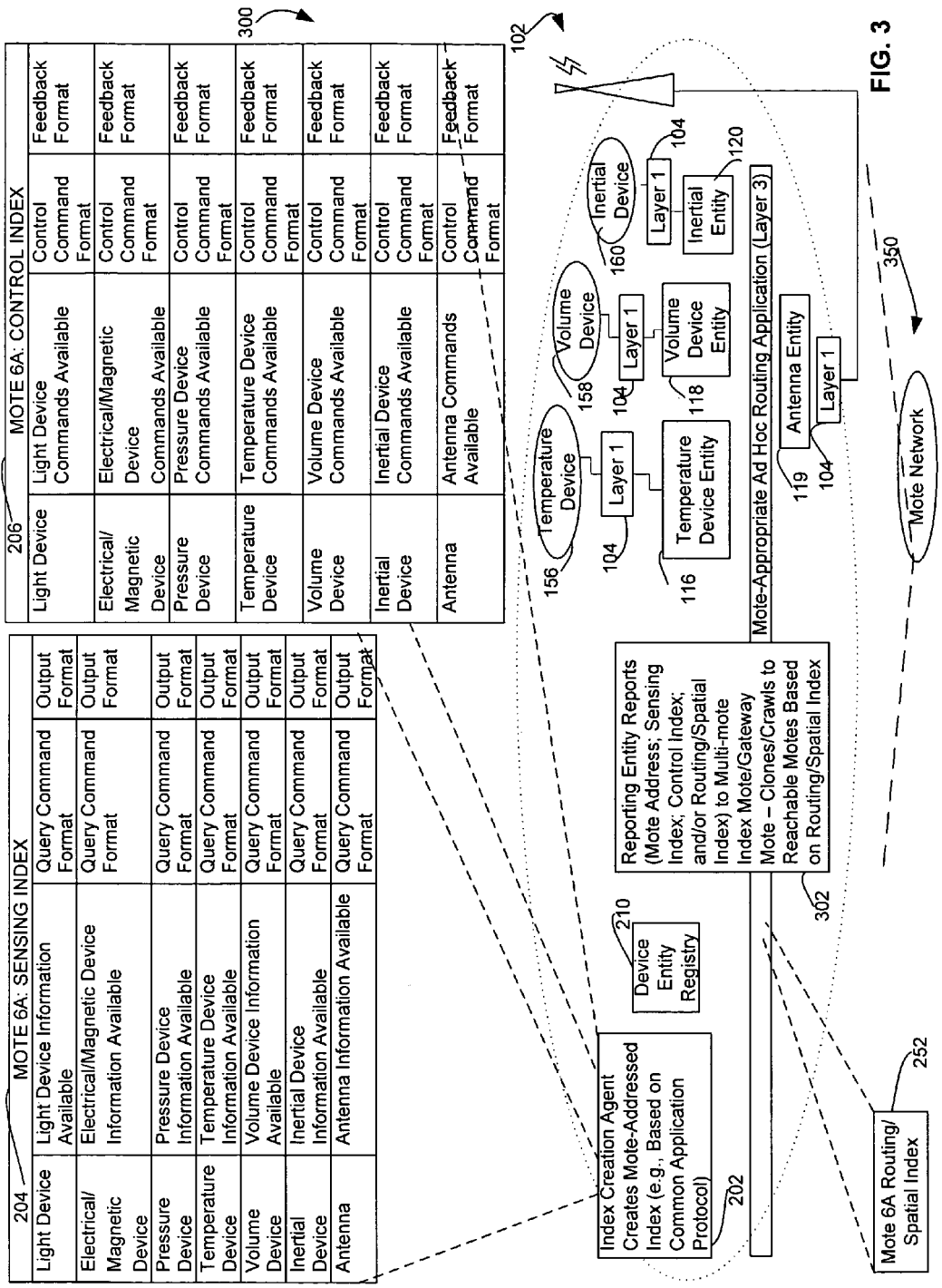
FIG. 3 depicts an exploded view of mote 300 forming a part of mote-appropriate network 350 that may serve as a context for introducing one or more processes and/or devices described herein.

With reference now to FIG. 3, depicted is an exploded view of mote 300 forming a part of mote-appropriate network 350 that may serve as a context for introducing one or more processes and/or devices described herein. Mote 300 is illustrated as similar to mote 200 (FIG. 2), but with the addition of reporting entity 302. In some implementations, reporting entity 302 is a computer program—resident in mote 300—that executes on a processor of mote 300 and that transmits all or a part of mote-addressed sensing index 204, mote-addressed control index 206, and/or mote-addressed routing/spatial index 252 to another entity (e.g., through antenna 102 to a multi-mote index creation agent such as shown/described in relation to FIG. 5 or through a mote-network to a designated gateway such as shown/described in relation to FIGS. 7, 9, and/or 10). In some implementations, reporting entity 302 is pre-installed on mote 300 prior to mote 300 being added to a mote-appropriate network, while in other implementations reporting entity 302 crawls and/or is transmitted to mote 300 from another location (e.g., a reporting entity at another mote or another networked computer (not shown) clones itself and sends that clone to mote 300). The inventors point out that in some applications the crawling and/or transmissions described herein are performed in a piecewise fashion over time, such as is done in the mote-appropriate Mate' virtual machine of the related art. The inventors also point out that in some applications motes are low-power and/or low bandwidth devices, and thus in some implementations the crawling and/or transmissions described herein allow many minutes (e.g., hours, days, or even weeks) for herein described agents and/or processes to migrate to and establish themselves at various nodes. The same may also hold true for transmission of information among nodes in that in some implementations such transmission may be done over the course of hours, days, or even weeks depending upon bandwidth, power, and/or other constraints. In other implementations, the migrations and/or transmissions are accomplished more rapidly, and in some cases may be accomplished as rapidly as possible.

B. Process(es) and/or Scheme(s)

Mote 300 of FIG. 3 can serve as a context in which one or more processes and/or devices may be illustrated. In one exemplary process, reporting entity 302 transmits at least a part of a content index to another entity either resident within or outside of mote network 350 (e.g., through antenna 102 to a multi-mote index creation agent such as shown/described in relation to FIG. 5 or through a mote-network to a designated gateway-proximate mote as shown/described in relation to FIGS. 7, 9 and 10). In some implementations, reporting entity 302 transmits in response to a received schedule (e.g., received from multi-mote index creation agent 502 of FIG. 5 or federated index creation agent 914 of FIG. 9 or 10). In some implementations, reporting entity 302 transmits in response to a derived schedule. In another specific implementation, the schedule is derived in response to one or more optimized queries. In some implementations, the schedule is derived in response to one or more stored queries (e.g., previously received or generated queries).

Figure 9:
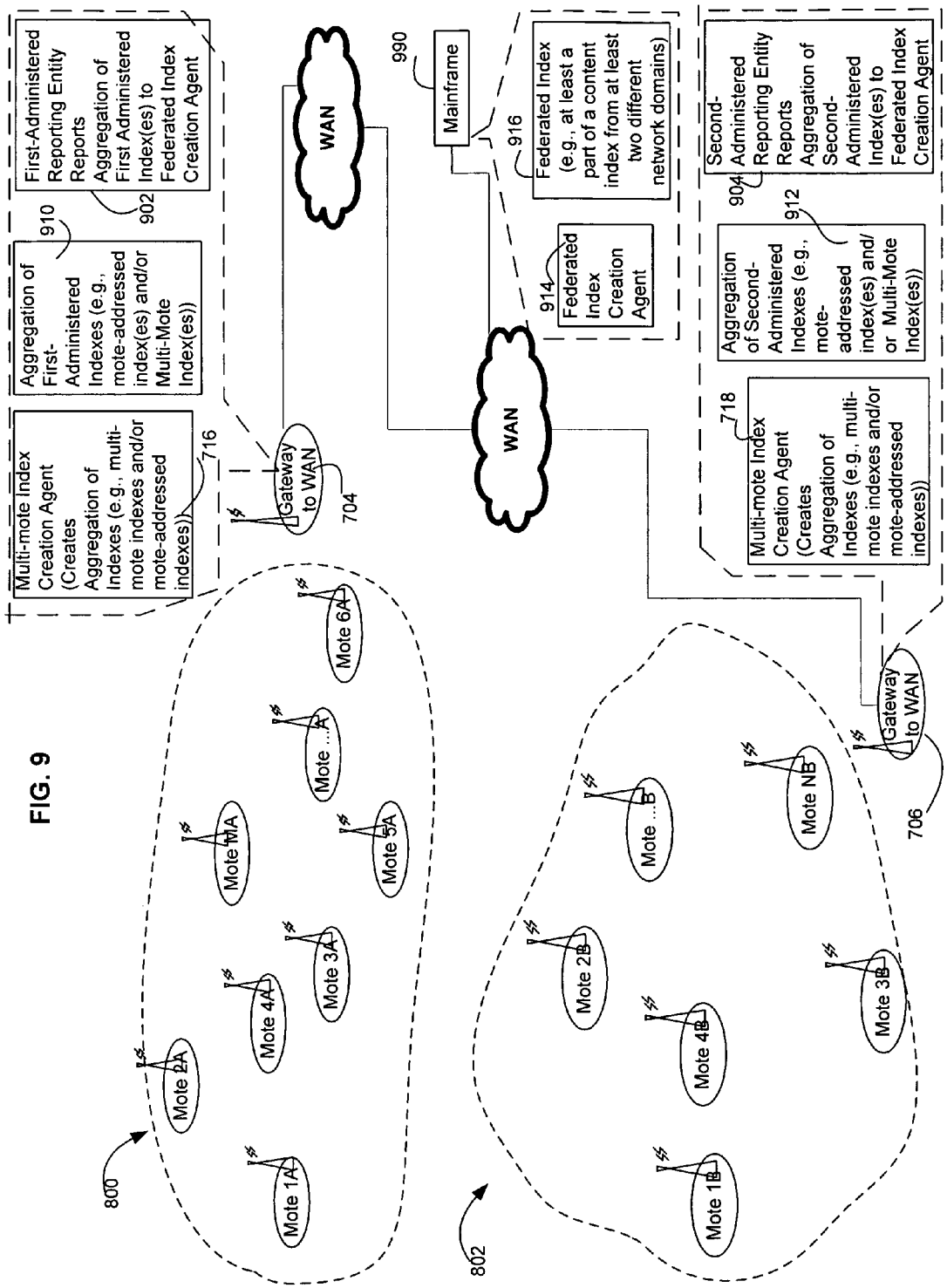
FIG. 9 shows a high-level diagram of first-administered set 800 of motes and second-administered set 802 of motes modified in accordance with teachings of the subject matter described herein.
Figure 10:
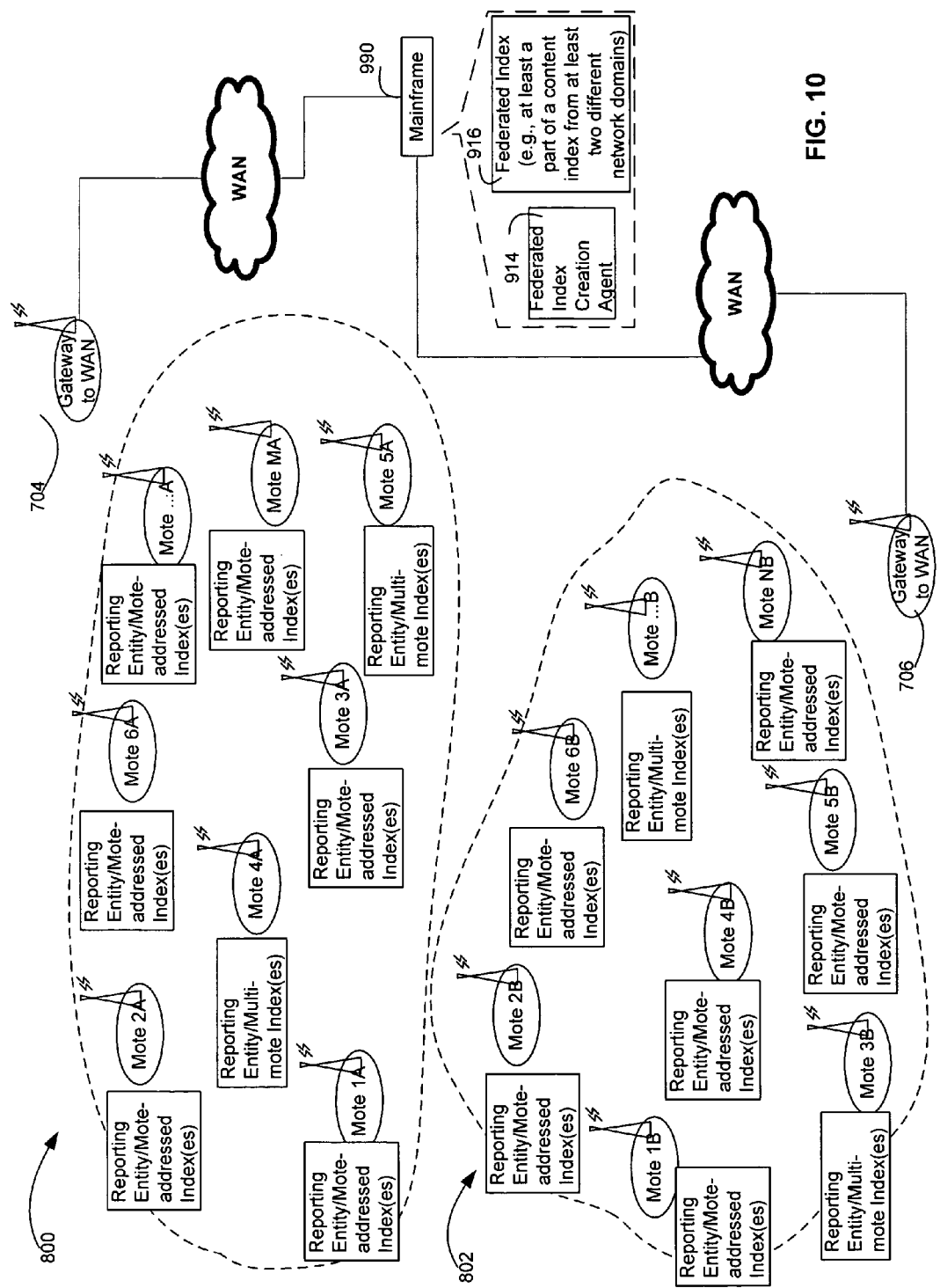
FIG. 10 shows the high-level diagram of FIG. 9, modified to show first-administered set 800 of motes and second-administered set 802 of motes wherein each mote is illustrated as having index(es) (e.g., mote-addressed and/or multi-mote) and an associated reporting entity.

In some implementations, reporting entity 302 transmits in response to a received query (e.g., received from multi-mote index creation agent of FIG. 5 or federated index creation agent of FIG. 9 or 10). In various implementations, reporting entity 302 transmits using either or both public key and private key encryption techniques. In various other implementations, reporting entity 302 decodes previously encrypted data, using either or both public key and private key encryption techniques, prior to the transmitting.

Figure 4:
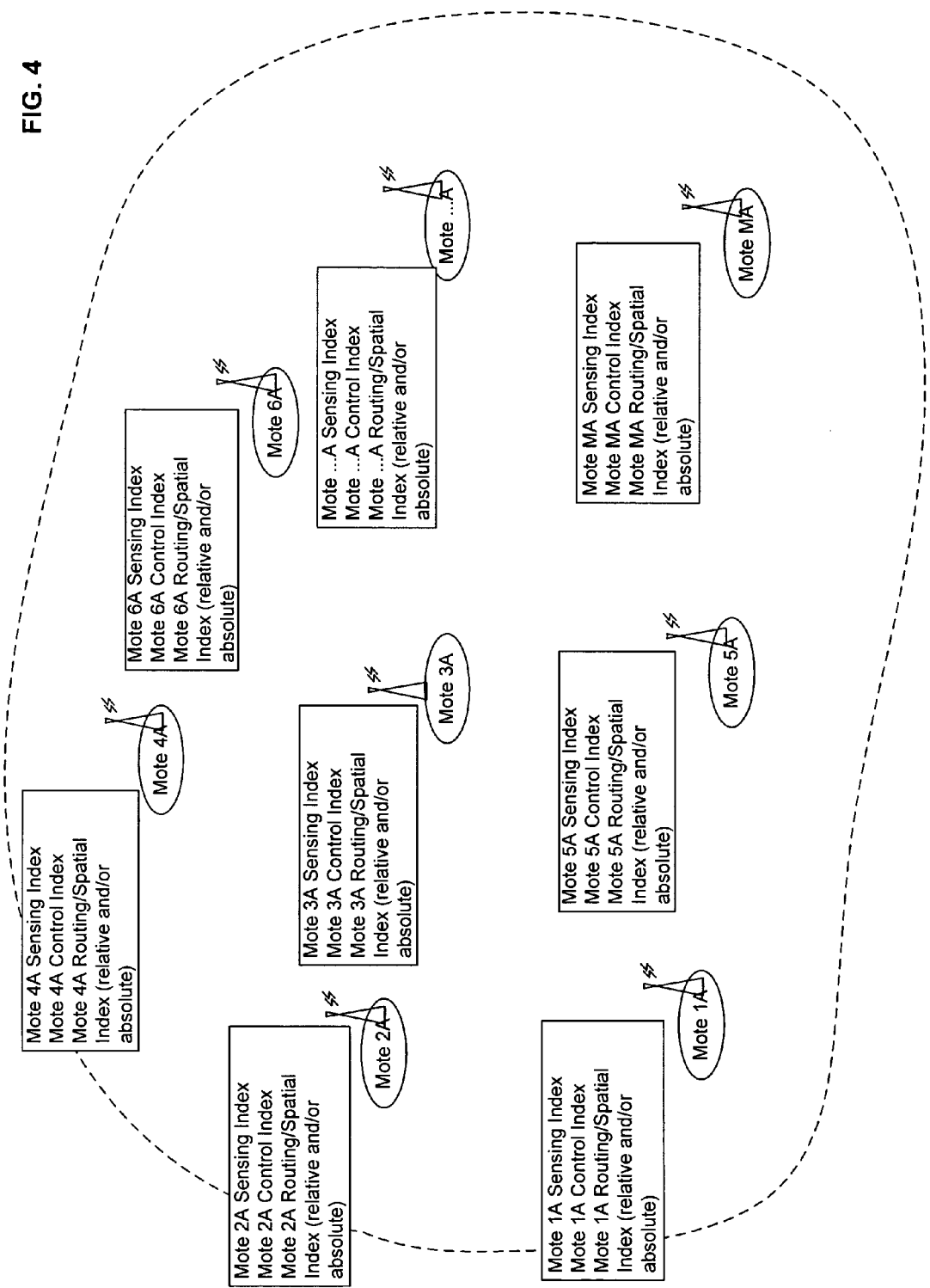
FIG. 4 shows a high-level diagram of a network having a first set of motes addressed 1A through MA (M is an integer greater than 1; A is the letter A and in some instances is used herein to help distinguish differently administered networks as in FIGS. 8, 9, and 10), which may form a context for illustrating one or more processes and/or devices described herein.

Referring now to FIG. 4, shown is a high-level diagram of a network having a first set of motes addressed 1A through MA (M is an integer greater than 1; A is the letter A and in some instances is used herein to help distinguish differently administered networks as in FIGS. 8, 9, and 10), which may form a context for illustrating one or more processes and/or devices described herein. Each mote is shown as having a mote-addressed content index that includes a sensing index, a control index, and/or a routing/spatial index respectively associated with the sensing functions at each such mote, and/or control functions at each such mote, and/or the spatial locations (relative and/or absolute) of motes that can be reached by direct transmission from each such mote. In some implementations, the motes' various indexes are created and/or function in fashions similar to indexes shown and described elsewhere herein (e.g., in relation to FIG. 3). In addition, although not explicitly shown, one or more of the motes of FIG. 4 may include index creation agents and/or reporting entities that are created and/or function in ways analogous to the creation and/or functioning of index creation agents and/or reporting entities as shown and described elsewhere herein (e.g., in relation to FIGS. 2 and/or 3). In some implementations, the reporting entities at each mote transmit all or a part of their mote-addressed content indexes (e.g., mote-addressed sensing indexes, mote-addressed control indexes, and/or mote-addressed routing/spatial indexes) to one or more entities (e.g., multi-mote index creation agent 502 such as shown/described in relation to FIG. 5 or multi-mote index creation agent 716 such as shown/described in relation to FIGS. 7, 9 and 10). In some implementations, such transmissions are done in response to a schedule, and in other implementations such transmissions are done in response to queries from the one or more entities. Such transmissions may be in response to received schedules, in response to schedules derived at least in part from optimized queries, in response to schedules derived at least in part from received queries, and/or in response to received queries such as described here and/or elsewhere herein.

III. Aggregating Mote-Associated Index Data

A. Structure(s) and/or System(s)

With reference now to FIG. 5, depicted is an exploded view of mote 500 forming a part of mote-appropriate network 550 that may serve as a context for introducing one or more processes and/or devices described herein. Mote 500 is illustrated as similar to mote 300 (FIG. 3), but with the addition of multi-mote index creation agent 502, multi-mote content index 504, and multi-mote registry 510 (e.g., a registry of motes under the aegis of multi-mote index creation agent 502 and/or from which multi-mote content index 504 is to be constructed). Multi-mote content index 504 typically contains at least a part of content indexes from at least two differently-addressed motes. As an example of the foregoing, multi-mote content index 504 is shown containing sensing mote-addressed indexes, mote-addressed control indexes, and mote-addressed routing/spatial indexes for two differently addressed motes: a mote having mote-network address of 1A and a mote having a mote-network address of 3A. In some implementations, the sensing indexes, control indexes, and/or routing/spatial indexes function more or less analogously to mote-addressed sensing index 204, mote-addressed control index 206, and/or mote-addressed routing/spatial index 252 of mote 200 (e.g., as shown and described in relation to FIG. 2). In some implementations, multi-mote index creation agent 502 is a computer program—resident in mote 500—that executes on a processor of mote 500 and that constructs and stores multi-mote content index 504 in memory of mote 500. In some implementations, multi-mote index creation agent 502 is pre-installed on mote 500 prior to mote 500 being added to a mote-appropriate network, while in other implementations multi-mote index creation agent 502 crawls and/or is transmitted to mote 500 from another location (e.g., a multi-mote index creation agent at another mote or another networked computer (not shown) clones itself and sends that clone to mote 500). The inventors point out that in some applications the crawling and/or transmissions described herein are performed in a piecewise fashion over time, such as is done in the mote-appropriate Mate' virtual machine of the related art. The inventors also point out that in some applications motes are low-power and/or low bandwidth devices, and thus in some implementations the crawling and/or transmissions described herein allow many minutes (e.g., hours, days, or even weeks) for herein described agents and/or processes to migrate to and establish themselves at various nodes. The same may also hold true for transmission of information among nodes in that in some implementations such transmission may be done over the course of hours, days, or even weeks depending upon bandwidth, power, and/or other constraints. In other implementations, the migrations and/or transmissions are accomplished more rapidly, and in some cases may be accomplished as rapidly as possible.

B. Process(es) and/or Scheme(s)

Mote 500 of FIG. 5 can serve as a context in which one or more processes and/or devices may be illustrated. In one exemplary process, once multi-mote index creation agent 502 has become active at mote 500, multi-mote index creation agent 502 obtains a listing of motes from which multi-mote content index 504 is to be constructed (e.g., a listing of motes making up a part of mote network 550). In some implementations, multi-mote index creation agent 502 obtains the listing of motes from which multi-mote content index 504 is to be constructed by communicating with multi-mote registry 510 to learn what mote-network addresses multi-mote index creation agent 502 is to consult to create multi-mote content index 504. In some implementations, various index creation agents at various respective motes (e.g., the index creation agents at the motes of FIG. 4) register their mote addresses with multi-mote registry 510, while in other implementations an administrator (e.g., either at or remote from mote 500) registers the mote-addresses in multi-mote registry 510. In some implementations, a system administrator places various motes under the aegis of particular multi-mote index creation agents based on single or combined criteria such as spatial locations, bandwidths, qualities of service of data communication links, and/or contents of data captured at various particular nodes. In other implementations, multi-mote index creation agent 502 is pre-loaded with knowledge of the listing of motes from which multi-mote content index 504 is to be constructed. In yet other implementations, the listing of motes from which multi-mote content index 504 is to be constructed is obtained from various motes that inform multi-mote index creation agent 502 that such various motes are to be included in the listing. Those having skill in the art will appreciate that other mechanisms for obtaining the listing, consistent with the teachings herein, may be substituted.

In some implementations, once multi-mote index creation agent 502 becomes aware of the mote-addresses for which it (multi-mote index creation agent 502) is responsible, multi-mote index creation agent 502 communicates with the various respective reporting entities at the various motes for which multi-mote index creation agent 502 is responsible and receives all or part of various respective mote-addressed content indexes (e.g., at least a part of one or more sensing indexes, one or more control indexes, and/or one or more routing/spatial indexes such as shown and described elsewhere). Thereafter, multi-mote index creation agent 502 uses the various reported mote-addressed content indexes to construct and/or save multi-mote content index 504 by aggregating at least a part of mote-addressed content indexes from two separately addressed and/or actually separate motes. For example, multi-mote content index 504 is shown as an aggregate of sensing, control, and routing/spatial indexes for motes having mote-network addresses of 1A and 3A, although typically multi-mote content indexes will index more than just two motes.

In some implementations, multi-mote index creation agent 502 receives all or part of various respective mote-addressed content indexes from various respective reporting entities at various motes which transmit in response to a schedule (e.g., once every 18 minutes). In some implementations, the schedule may be received, pre-stored, and/or derived (e.g., such as shown/described in relation to other transmissions described elsewhere herein). In addition, while the present application describes multi-mote index creation agent 502 receiving all or part of various respective mote-addressed content indexes from the various respective reporting entities at the various motes (e.g., mote 1A and/or mote 3A), those having ordinary skill in the art will appreciate that in other implementations multi-mote index creation agent 502 receives all or part of such indexes from one or more motes representing the first set of motes.

In various implementations discussed herein, multi-mote index creation agent 502 receives mote-addressed content indexes transmitted by reporting entities of various motes from which multi-mote index creation agent 502 creates multi-mote content index 504. In other implementations, multi-mote index creation agent 502 receives one or more previously-created multi-mote content indexes transmitted by multi-mote reporting entities at various motes from which multi-mote index creation agent 502 creates multi-mote content index 504. That is, in some implementations, multi-mote index creation agent 502 creates multi-mote content index 504, at least in part, from a previously generated aggregate of mote-addressed content indexes (e.g., from a previously generated multi-mote content index). In some implementations, such received multi-mote content indexes have been created by other multi-mote index creation agents resident at other motes throughout a mote network (e.g., a mote network such as shown in FIG. 4). Subsequent to receiving such previously created multi-mote content indexes, multi-mote index creation agent 502 then aggregates the multi-mote content indexes to form another multi-mote content index. In yet other implementations, multi-mote index creation agent 502 aggregates both mote-addressed content indexes and multi-mote content indexes respectively received from various reporting entities to create a multi-mote content index. The inventors point out that in some applications motes are low-power and/or low bandwidth devices, and thus in some implementations the systems and processes described herein allow many minutes (e.g., hours, days, or even weeks) for herein described agents and processes to migrate to and establish themselves at various nodes (e.g., by transferring their instructions in a piecewise fashion over time). The same may also hold true for transmission of information among nodes.

IV. Transmission of Aggregated Mote-Associated Index Data

A. Structure(s), and/or System(s)

Figure 6A:
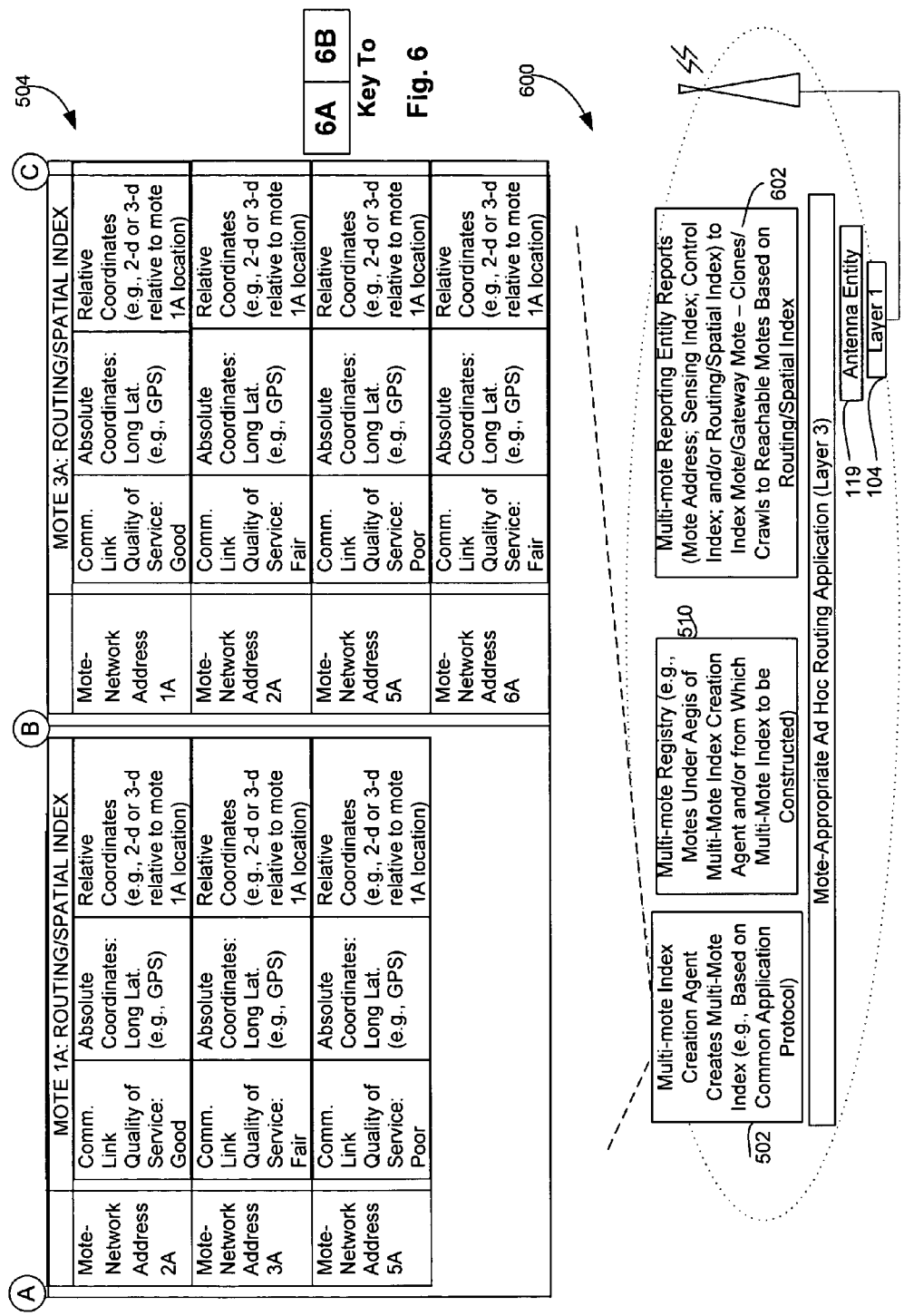
FIG. 6 depicts an exploded view of mote 600 forming a part of mote-appropriate network 550 (FIG. 5) that may serve as a context for introducing one or more processes and/or devices described herein.

With reference now to FIG. 6, depicted is an exploded view of mote 600 forming a part of mote-appropriate network 550 (FIG. 5) that may serve as a context for introducing one or more processes and/or devices described herein. Mote 600 is illustrated as similar to mote 500 (FIG. 5), but with the addition of multi-mote reporting entity 602. In some implementations, multi-mote reporting entity 602 is a computer program—resident in mote 600—that executes on a processor of mote 600. In some implementations, multi-mote reporting entity 602 is a computer program that is pre-installed on mote 600 prior to mote 600 being added to a mote-appropriate network, while in other implementations multi-mote reporting entity 602 is a computer program that crawls and/or is transmitted to mote 600 from another location (e.g., a reporting entity at another mote or another networked computer (not shown) clones itself and sends that clone to mote 600). The inventors point out that in some applications the crawling and/or transmissions described herein are performed in a piecewise fashion over time, such as is done in the mote-appropriate Mate' virtual machine of the related art. The inventors also point out that in some applications motes are low-power and/or low bandwidth devices, and thus in some implementations the crawling and/or transmissions described herein allow many minutes (e.g., hours, days, or even weeks) for herein described agents and/or processes to migrate to and establish themselves at various nodes. The same may also hold true for transmission of information among nodes in that in some implementations such transmission may be done over the course of hours, days, or even weeks depending upon bandwidth, power, and/or other constraints. In other implementations, the migrations and/or transmissions are accomplished more rapidly, and in some cases may be accomplished as rapidly as possible.

Figure 7:
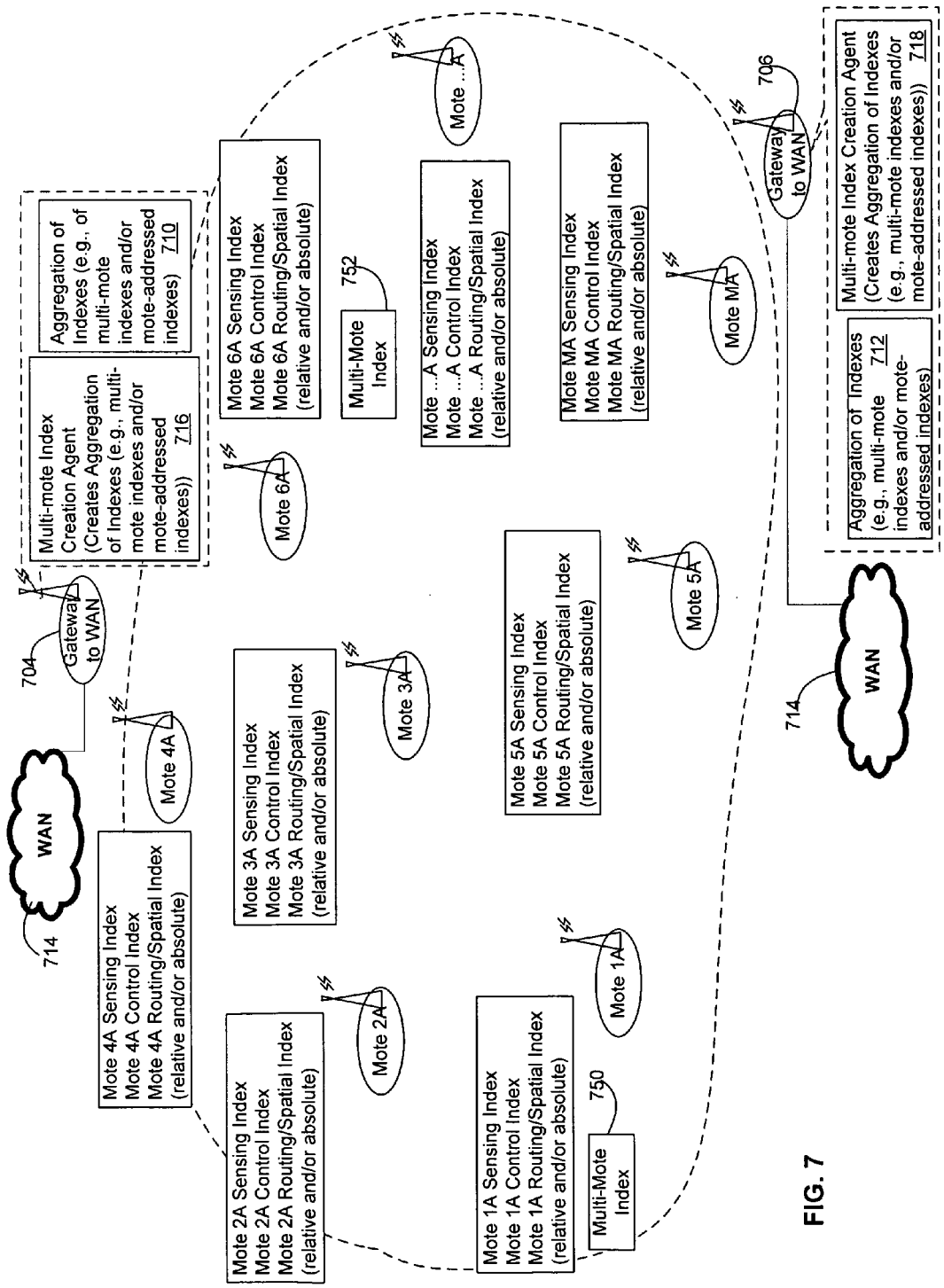
FIG. 7 shows a high-level diagram of an exploded view of a mote-appropriate network that depicts a first set of motes addressed 1A through MA (M is an integer greater than 1; A is the letter A and in some instances is used herein to help distinguish differently administered networks as in FIGS. 8, 9, and 10), which may form an environment for process(es) and/or device(s) described herein.

Referring now to FIG. 7, shown is a high-level diagram of an exploded view of a mote-appropriate network that depicts a first set of motes addressed 1A through MA (M is an integer greater than 1; A is the letter A and in some instances is used herein to help distinguish differently administered networks as in FIGS. 8, 9, and 10), which may form an environment for process(es) and/or device(s) described herein. Each mote is shown as having a mote-addressed content index that includes a sensing index, a control index, and/or a routing/spatial index respectively associated with the sensing functions of devices at each such mote, and/or control functions of devices at each such mote, and/or the spatial locations (relative and/or absolute) of motes that can be reached by direct transmission from each such mote. In some implementations, the motes' various indexes are created and/or function in fashions similar to mote-addressed indexes shown and described herein (e.g., in relation to FIGS. 2, 3, and/or FIG. 4). In some implementations, the motes' various indexes are created and/or function in fashions similar to multi-mote content indexes shown and described herein. For example, mote 1A (i.e., mote having mote-network address 1A) and mote 6A (i.e., mote having mote-network address 6A) are shown having multi-mote content indexes 750 and 752 respectively. The multi-mote content indexes are created and/or function in ways analogous to those shown and/or described elsewhere herein.

Mote 4A and mote MA are shown in FIG. 7 as proximate to gateways 704, 706 onto WAN 714 (e.g., the Internet). Multi-mote index creation agents 716, 718 are depicted as executing on the more powerful computational systems of gateways 704, 706 (e.g., mini and/or mainframe computer systems) to create aggregations 710, 712 of indexes. Those having ordinary skill in the art will appreciate that aggregations 710, 712 of indexes may be composed of multi-mote content indexes and/or individual mote-addressed content indexes. Those having ordinary skill in the art will appreciate that aggregations of multi-mote content indexes in themselves may be considered aggregates of one or more individual mote-addressed content indexes and thus types of multi-mote content indexes. Those having ordinary skill in the art will appreciate that multi-mote content indexes in themselves may be considered aggregates of one or more individual mote-addressed content indexes and thus types of aggregations of content indexes.

Although not expressly shown, those having ordinary skill in the art will appreciate that some or all of the motes shown in FIG. 7 typically have reporting entities that function analogously to other reporting entities described herein (e.g., multi-mote reporting entity 602 and/or reporting entity 302). In some implementations, such reporting entities are computer programs that execute on processors of the motes wherein such reporting entities are resident and that transmit all or a part of indexes at their motes (e.g., mote-addressed indexes and/or multi-mote content indexes) to other entities (e.g., multi-mote index creation agents at designated mote addresses and/or designated gateway-proximate motes). In some implementations, reporting entities are pre-installed on motes prior to such motes' insertion to a mote-appropriate network, while in other implementations such reporting entities crawl and/or are transmitted to their respective motes from other locations (e.g., a reporting entity at another mote or another networked computer (not shown) clones itself and sends that clone to another mote). In addition, in some implementations one or more of the reporting entities is given access to the content indexes of the motes and thereafter use such access to report on the content of the motes. The multi-mote content indexes and/or mote-addressed content indexes may be as shown and/or described both here and elsewhere herein, and such elsewhere described material is typically not repeated here for sake of clarity In some implementations, various reporting entities at various motes transmit in response to a schedule (e.g., once every 24 hours). In one specific example implementation, a reporting entity transmits in response to a received schedule (e.g., received from multi-mote index creation agent 502 of FIG. 5 and/or federated index creation agent 914 of FIGS. 9 and/or 10). In another specific example implementation, a reporting entity transmits in response to a derived schedule. In another specific implementation, the schedule is derived in response to one or more optimized queries. In yet other implementations, the schedule is derived in response to one or more stored queries (e.g., previously received or generated queries).

In other implementations, the reporting entities transmit in response to received queries (e.g., received from multi-mote index creation agents or federated index creation agents). In various implementations, the reporting entities transmit using either or both public key and private key encryption techniques. In various other implementations, the reporting entities decode previously encrypted data, using either or both public key and private key encryption techniques, prior to the transmitting.

B. Process(es) and/or Scheme(s)

With reference now again to FIG. 5, FIG. 6, and FIG. 7, the depicted views may serve as a context for introducing one or more processes and/or devices described herein. Some exemplary processes include the operation of transmitting at least a part of an aggregate of one or more mote-addressed content indexes of a first set of motes. In one instance, multi-mote reporting entity 602 transmits at least a part of multi-mote content index 504 to another entity (e.g., another multi-mote index creation agent at a designated mote address, or a designated gateway-proximate mote or a federated index creation agent such as shown and/or described in relation to FIGS. 7, 9, and/or 10). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of transmitting at least a part of one or more multi-mote content indexes of the first set of motes. In one instance, multi-mote reporting entity 602 transmits at least a part of at least one of a mote-addressed sensing index or a mote-addressed control index of multi-mote content index 504 to another entity (e.g., another multi-mote index creation agent at a designated mote address, or a designated gateway-proximate mote or a federated index creation agent such as shown and/or described in relation to FIGS. 7, 9, and/or 10). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of transmitting at least a part of a mote-addressed routing/spatial index. In one instance, multi-mote reporting entity 602 transmits at least a part of a mote-addressed routing/spatial index of multi-mote content index 504 to another entity (e.g., another multi-mote index creation agent at a designated mote address, or a designated gateway-proximate mote or a federated index creation agent such as shown and/or described in relation to FIGS. 7, 9, and/or 10). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of effecting the transmitting with a reporting entity. In one instance, multi-mote reporting entity 602 is a logical process at mote 600 that transmits a part of an aggregate of one or more mote-addressed content indexes (e.g., multi-mote indexes and/or aggregations of other indexes such as mote-addressed and multi-mote indexes). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of obtaining access to the one or more mote-addressed content indexes of the first set of motes. In one instance, multi-mote reporting entity 602 is granted the access by an entity such as a system administrator. Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of effecting the transmitting in response to a schedule. In one instance, multi-mote reporting entity 602 transmits at least a part of multi-mote content index 504 in response to a schedule (e.g., once every 24 hours). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of receiving the schedule. In one instance, multi-mote reporting entity 602 transmits at least a part of multi-mote content index 504 in response to a received schedule (e.g., received from multi-mote index creation agent 718 and/or a federated index creation agent 914 of FIGS. 7, 9, and/or 10). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of deriving the schedule. In one instance, multi-mote reporting entity 602 transmits at least a part of multi-mote content index 504 in response to a derived schedule (e.g., derived in response to an optimized query and/or one or more stored queries). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of effecting the transmitting in response to a query. In one instance, multimote reporting entity 602 transmits at least a part of multimote content index 504 in response to a received query (e.g., received from a multi-mote index creation agent or a federated index creation agent). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of encrypting utilizing at least one of a private or a public key. In one instance, multi-mote reporting entity 602 transmits at least a part of multi-mote content index 504 using either or both public key and private key encryption techniques. Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content indexes of a first set of motes includes but is not limited to the operation of decoding at least a part of one or more mote-addressed content indexes utilizing at least one of a public key or a private key. In one instance, multi-mote reporting entity 602 decodes previously encrypted data, using either or both public key and private key encryption techniques, prior to the transmitting of at least a part of multi-mote content index 504. Those skilled in the art will appreciate that the foregoing specific exemplary processes are representative of more general processes taught elsewhere herein, such as in the claims filed herewith and/or elsewhere in the present application.

V. Federating Mote-Associated Index Data

A. Structure(s) and/or System(s)

Figure 8:
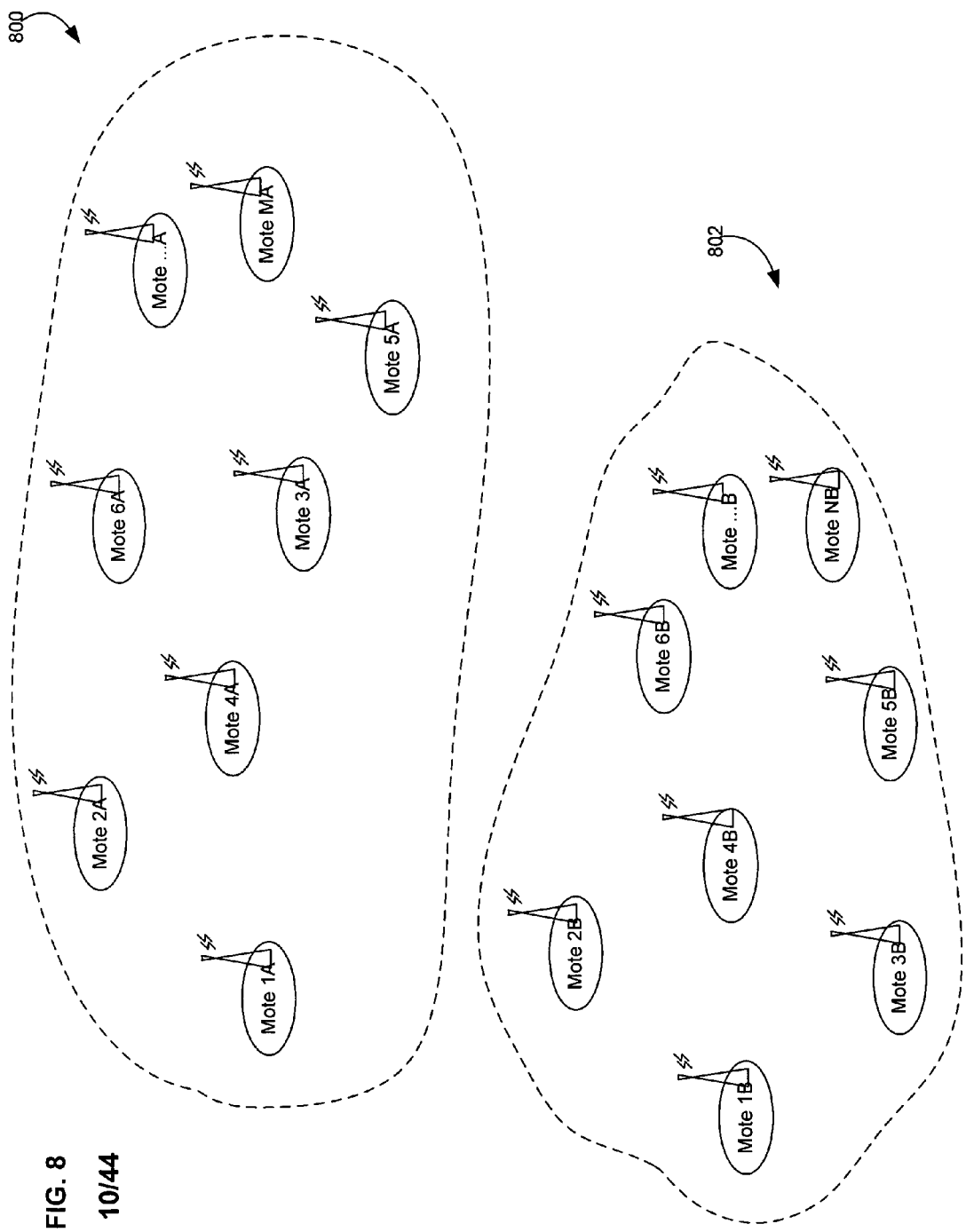
FIG. 8 shows a high-level diagram of first-administered set 800 of motes addressed 1A through MA, and second-administered set 802 of motes addressed 1B through NB (M and N are integers greater than 1; A and B are letters used herein to help distinguish differently administered networks as in FIGS. 8, 9, and 10) that may form an environment for process (es) and/or device(s) described herein.

Referring now to FIG. 8, shown is a high-level diagram of first-administered set 800 of motes addressed 1A through MA, and second-administered set 802 of motes addressed 1B through NB (M and N are integers greater than 1; A and B are letters used herein to help distinguish differently administered networks as in FIGS. 8, 9, and 10) that may form an environment for process(es) and/or device(s) described herein. In some implementations, first-administered set 800 of motes constitutes all or part of a network under a first administrator and second-administered set 802 of motes constitutes all or part of a network under a second administrator, where the first and/or second administrators tend not to have any significant knowledge of the internal operations of networks they don't administer. Examples in which this may be the case are where first-administered set 800 and second-administered set 802 are owned by different business entities, and where first-administered set 800 and second-administered set 802 have been constructed for two separate purposes (e.g., one set to monitor crops and the other set to monitor building systems, and thus the systems were not designed to interact with each other). In some implementations, first-administered set 800 of motes constitutes all or part of a network under a first administrator and second-administered set 802 of motes constitutes all or part of a network under a second administrator, where either or both of the first administrator and the second administrator has some knowledge of the networks they don't administer, but the networks are administered separately for any of a variety of reasons such as security, current employment, permissions, job function distinction, organizational affiliation, workload management, physical location, network disconnection, bandwidth or connectivity differences, etc. In some implementations, first-administered set 800 of motes constitutes all or part of a network under a first transient administration and second-administered set 802 of motes constitutes all or part of a network under a second transient administration, where either or both the first and second transient administrations are those such as might exist when a network partitions or a signal is lost.

The inventors have noticed that in some instances it could be advantageous for one or more systems to use resources from first-administered set 800 of motes and second-administered set 802 of motes. The inventors have devised one or more processes and/or devices that allow systems to use resources in such a fashion.

With reference now to FIG. 9, shown is a high-level diagram of first-administered set 800 of motes and second-administered set 802 of motes modified in accordance with teachings of subject matter described herein. Shown respectively proximate to first-administered set 800 of motes and second-administered set 802 of motes are gateways 704, 706 onto WAN 714. Gateways 704, 706 are respectively shown as having resident within them multi-mote index creation agents 716, 718 and aggregations 910, 912 of first-administered set 800 of motes and second-administered set 802 of motes. The gateways, multi-mote index creation agents, and aggregations are created and/or function substantially analogously to the gateways, index creation agents, and aggregations of indexes described elsewhere herein (e.g., in relation to FIGS. 6 and/or 7), and are not explicitly described here for sake of clarity. For example, aggregation 910 of first-administered indexes and aggregation 912 of second-administered indexes can be composed of either or both mote-addressed and/or multi-mote content indexes and in themselves can be considered instances of multi-mote content indexes. Furthermore, although not expressly shown in FIG. 9 for sake of clarity, it is to be understood that in general most motes will have one or more index creation agents (e.g., multi-mote or other type), indexes (e.g., multi-mote or other type), and/or reporting entities (e.g., multi-mote or other type) resident within or proximate to them (see, e.g., FIG. 10). In some implementations, the functioning and/or creation of such indexes, agents, and/or entities is under the control of federated index creation agent 914. In some implementations, federated index creation agent 914, on an as-needed basis, disperses and/or activates various index creation agents and/or their associated reporting entities (e.g., as shown and described in relation to FIGS. 2, 3, and/or 4), and/or various multi-mote index creation agents and/or their associated reporting entities (e.g., as shown and described in relation to FIGS. 5, 6, and/or 7) throughout first-administered set 800 of motes and second-administered set 802 of motes. In some implementations, such dispersals and/or activations are done on an as-needed basis, while in other implementations such dispersals and activations are pre-programmed. In yet other implementations, the agents, indexes, and/or entities are pre-programmed.

Further shown in FIG. 9 are federated index creation agent 914 and federated index 916 resident within mainframe computer system 990, which in some implementations are dispersed, created, and/or activated in fashions similar to other index creation agents and indexes described herein. In some implementations, federated index creation agent 914 generates federated index 916 by obtaining at least a part of one or more indexes (e.g., multi-mote or mote-addressed indexes) from both first-administered set 800 of motes and second-administered set 802 of motes. In some implementations, federated index 916 typically includes at least a part of a content index from two differently-administered mote networks, such as first-administered set 800 of motes and second-administered set 802 of motes In some implementations, federated index 916 has one or more entries denoting one or more respective administrative domains of one or more content index entries (e.g., see federated index 916 of FIG. 11). In other implementations, federated index 916 has access information to one or more content indexes for an administered content index (e.g., in some implementations, this is actually in lieu of a content index). In other implementations, federated index 916 has information pertaining to a currency of at least one entry of an administered content index. In other implementations, federated index 916 has information pertaining to an expiration of at least one entry of an administered content index. In other implementations, federated index 916 has metadata pertaining to an administrative domain, wherein the metadata includes at least one of an ownership indicator, an access right indicator, an index refresh indicator, or a predefined policy indicator. In other implementations, federated index 916 has an administrative domain-specific query string generated for or supplied by an administrative domain to produce an updated content index for that domain.

Continuing to refer to FIG. 9, aggregation 910 of first-administered index and aggregation 912 of second-administered index (e.g., instances of multi-mote content indexes) are shown as respectively interfacing with first-administered reporting entity 902 and second-administered reporting entity 904. First-administered reporting entity 902 and/or second-administered reporting entity 904 typically are dispersed, created, and/or activated in fashions analogous to the dispersal, creation, and/or activation of other reporting entities as described elsewhere herein (e.g., in relation to FIGS. 3 and/or 6), and hence such dispersals, creations, and/or activations are not explicitly described here for sake of clarity.

In some implementations, first-administered reporting entity 902 and/or second-administered reporting entity 904 transmit all/part of their respective multi-mote content indexes to federated index creation agent 914, from which federated index creation agent creates federated index 916. First-administered reporting entity 902 and/or second-administered reporting entity 904 transmit in manners analogous to reporting entities discussed elsewhere herein. For example, transmitting in response to schedules received, schedules derived, and/or queries received from federated index creation agent 914, and/or transmitting using either or both public key and private key encryption techniques and/or decoding previously encrypted data, using either or both public key and private key encryption techniques, prior to the transmitting.

In the discussion of FIG. 9, federated index creation agent 914 was described as obtaining portions of aggregations of first-administered and second-administered network indexes from which federated index 916 was constructed. In other implementations, federated index creation agent 914 obtains portions of first-administered and second-administered network indexes from various reporting entities dispersed throughout the first-administered and second-administered mote networks 802, 804 (e.g., multi-mote or other type reporting entities such as those described in relation to FIGS. 3, 6 and/or elsewhere herein). Such reporting entities and indexes are implicit in FIG. 9 (e.g., since the multi-mote creation agents 716, 718 would typically interact with such reporting entities to obtain indexes under the purview of such entities), but are explicitly shown and described in relation to FIG. 10. In other implementations, the various reporting entities dispersed throughout the networks report directly to federated index creation agent 914. One example of such implementations is shown and described in relation to FIG. 10.

Referring now to FIG. 10, shown is the high-level diagram of FIG. 9, modified to show first-administered set 800 of motes and second-administered set 802 of motes wherein each mote is illustrated as having index(es) (e.g., mote-addressed and/or multi-mote) and an associated reporting entity. The reporting entities may be of substantially any type described herein (e.g., multi-mote or other type) and the indexes may also be of substantially any type described herein (e.g., multi-mote or mote-addressed content indexes).

In some implementations, various reporting entities dispersed throughout first-administered set 800 of motes and second-administered set 802 of motes transmit all/part of their respective indexes (multi-mote or otherwise) to federated index creation agent 914, from which federated index creation agent creates federated index 916. The various reporting entities transmit in manners analogous to reporting entities discussed elsewhere herein. For example, transmitting in response to schedules received, schedules derived, and/or queries received from federated index creation agent 914, and/or transmitting using either or both public key and private key encryption techniques and/or decoding previously encrypted data, using either or both public key and private key encryption techniques, prior to the transmitting.

With reference now to FIG. 11, shown is an exemplary exploded view of federated index 916. Federated index 916 is shown to contain aggregations of content indexes drawn from first-administered set 800 of motes and second-administered set 802 of motes. Shown is that federated index 916 contains aggregated sensing, control, and routing/spatial indexes for motes addressed 1A and 2A under the administration of a first network administrator. Depicted is that federated index 916 contains aggregated sensing, control, and routing/spatial indexes for motes addressed 3A and 4A under the administration of a second network administrator. Although aggregations for only two administered networks are shown, those having ordinary skill in the art will appreciate that in some implementations the number of administered networks indexed could be several. In addition, although each individual administrator-specific aggregation is shown containing entries for only three motes, those having skill in the art will appreciate that in most implementations the number of motes in the aggregations will run to the hundreds, thousands, and/or higher.

B. Process(es) and/or Scheme(s)

With reference now again to FIG. 7, FIG. 8, FIG. 9, FIG. 10, and/or FIG. 11, the depicted views may serve as a context for introducing one or more processes and/or devices described herein. Some exemplary processes include the operations of obtaining at least a part of a first-administered content index from a first set of motes; obtaining at least a part of a second-administered content index from a second set of motes; and creating a federated index from at least a part of the first-administered content index and at least a part of the second-administered content index. Other more general exemplary processes of the foregoing specific exemplary processes are taught at least in the claims and/or elsewhere in the present application.

In some specific exemplary processes, the operation of obtaining at least a part of a first-administered content index from a first set of motes includes but is not limited to the operation of receiving at least a part of one or more multi-mote content indexes of the first set of motes. For example, federated index creation agent 914 receiving at least a part of the multi-mote content index of mote 6A (e.g., such as shown and described in relation to FIGS. 7, 8, 9, 10, and/or 11).

In some specific exemplary processes, the operation of receiving at least a part of one or more multi-mote content indexes of the first set of motes includes but is not limited to the operation of receiving at least a part of at least one of a mote-addressed sensing index or a mote-addressed control index from at least one aggregation of one or more first-administered indexes. For example, federated index creation agent 914 receiving at least a part of aggregation of first-administered index(es) 910 as transmitted by first-administered reporting entity 902 for first-administered set 800 of motes (e.g., as shown and/or described in relation to FIGS. 7, 8, 9, 10 and/or 11).

In some specific exemplary processes, the operation of receiving at least a part of one or more multi-mote content indexes of the first set of motes includes but is not limited to the operation of receiving at least a part of a mote-addressed routing/spatial index from at least one aggregation of one or more first-administered indexes. For example, federated index creation agent 914 receiving at least a part of aggregation of first-administered index(es) 910 as transmitted by first-administered reporting entity 902 for first-administered set 800 of motes (e.g., as shown and/or described in relation to FIGS. 7, 8, 9, 10 and/or 11).

In some specific exemplary processes, the operation of receiving at least a part of one or more multi-mote content indexes of the first set of motes includes but is not limited to the operation of receiving at least a part of at least one of a mote-addressed sensing index or a mote-addressed control index from a multi-mote reporting entity at a mote of the first set of motes. For example, federated index creation agent 914 receiving at least a part of one or more multi-mote content indexes of first-administered set 800 of motes from one or more multi-mote content indexes' associated multi-mote reporting entities (e.g., such as shown and/or described in relation to the multi-mote content indexes and/or associated reporting entities of first-administered set 800 of motes of FIGS. 7, 8, 9, 10 and/or 11).

In some specific exemplary processes, the operation of receiving at least a part of one or more multi-mote content indexes of the first set of motes includes but is not limited to the operation of receiving at least a part of a mote-addressed routing/spatial index from a multi-mote reporting entity at a mote of the first set of motes. For example, federated index creation agent 914 receiving at least a part of a mote-addressed routing/spatial index from a multi-mote reporting entity at a mote of the first-administered set 800 of motes (e.g., such as shown and/or described in relation to the multi-mote content index of mote 6A of FIGS. 7, 8, 9, 10 and/or 11).

In some specific exemplary processes, the operation of obtaining at least a part of a first-administered content index from a first set of motes includes but is not limited to the operation of receiving at least a part of at least one of a mote-addressed sensing index or a mote-addressed control index from a reporting entity at a mote of the first set of motes. For example, federated index creation agent 914 receiving at least a part of a mote-addressed sensing index or a mote-addressed control index from one or more associated reporting entities at the motes of first-administered set 800 of motes (e.g., such as shown and/or described in relation the mote-addressed content indexes of motes 3A and/or 5A of FIGS. 7, 8, 9, 10 and/or 11).

In some specific exemplary processes, the operation of obtaining at least a part of a first-administered content index from a first set of motes includes but is not limited to the operation of receiving at least a part of a mote-addressed routing/spatial index from a reporting entity at a mote of the first set of motes. For example, federated index creation agent 914 receiving at least a part of a mote-addressed routing/spatial index from one or more associated reporting entities at the motes of first-administered set 800 of motes (e.g., such as shown and/or described in relation to the mote-addressed content indexes of motes 3A and/or 5A of FIGS. 7, 8, 9, 10 and/or 11).

In some specific exemplary processes, the operation of obtaining at least a part of a second-administered content index from a second set of motes includes but is not limited to the operation of receiving at least a part of one or more multi-mote content indexes of the second set of motes. For example, federated index creation agent 914 receiving at least a part of the multi-mote content index associated with a mote of second-administered set 802 of motes (e.g., such as shown and/or described in relation to FIGS. 7, 8, 9, 10, and/or 11).

In some specific exemplary processes, the operation of receiving at least a part of one or more multi-mote content indexes of the second set of motes includes but is not limited to the operation of receiving at least a part of at least one of a mote-addressed sensing index or a mote-addressed control index from at least one aggregation of one or more second-administered indexes. For example, federated index creation agent 914 receiving at least a part of aggregation of second-administered index(es) 912 as transmitted by second-administered reporting entity 904 for second-administered set 802 of motes (e.g., as shown and/or described in relation to FIGS. 7, 8, 9, 10 and/or 11).

In some specific exemplary processes, the operation of receiving at least a part of one or more multi-mote content indexes of the second set of motes includes but is not limited to the operation of receiving at least a part of a mote-addressed routing/spatial index from at least one aggregation of one or more second-administered indexes. For example, federated index creation agent 914 receiving at least a part of aggregation of second-administered index(es) 912 transmitted by second-administered reporting entity 904 for second-administered set 802 of motes (e.g., as shown and described in relation to FIGS. 7, 8, 9, 10 and/or 11).

In some specific exemplary processes, the operation of receiving at least a part of one or more multi-mote content indexes of the second set of motes includes but is not limited to the operation of receiving at least a part of at least one of a mote-addressed sensing index or a mote-addressed control index from a multi-mote reporting entity at a mote of the second set of motes. For example, federated index creation agent 914 receiving at least a part of one or more multi-mote content indexes of second-administered set 802 of motes from one or more multi-mote content indexes' associated multi-mote reporting entities (e.g., such as shown and described in relation to the multi-mote content indexes and/or reporting entities of second-administered set 802 of motes of FIGS. 7, 8, 9, 10 and/or 11).

In some specific exemplary processes, the operation of receiving at least a part of one or more multi-mote content indexes of the second set of motes includes but is not limited to the operation of receiving at least a part of a mote-addressed routing/spatial index from a multi-mote reporting entity at a mote of the second set of motes. For example, federated index creation agent 914 receiving at least a part of a mote-addressed routing/spatial index from a multi-mote reporting entity at a mote of the second-administered set 802 of motes from an associated multi-mote reporting entity (e.g., such as shown and described in relation to the multi-mote content indexes and/or reporting entities of second-administered set 802 of motes of FIGS. 7, 8, 9, 10 and/or 11).

In some specific exemplary processes, the operation of obtaining at least a part of a second-administered content index from a second set of motes includes but is not limited to the operation of receiving at least a part of at least one of a mote-addressed sensing index or a mote-addressed control index from a reporting entity at a mote of the second set of motes. For example, federated index creation agent 914 receiving at least a part of a mote-addressed sensing index or a mote-addressed control index from one or more associated reporting entities at the motes of second-administered set 802 of motes (e.g., such as shown and described in relation the mote-addressed content indexes and associated reporting entities of second-administered set 802 of motes of FIGS. 7, 8, 9, 10 and/or 11).

In some specific exemplary processes, the operation of obtaining at least a part of a second-administered content index from a second set of motes includes but is not limited to the operation of receiving at least a part of a mote-addressed routing/spatial index from a reporting entity at a mote of the second set of motes. For example, federated index creation agent 914 receiving at least a part of a mote-addressed routing/spatial index from one or more associated reporting entities at the motes of second-administered set 802 of motes (e.g., such as shown and described in relation the mote-addressed content indexes of second-administered set 802 of motes of FIGS. 7, 8, 9, 10, and/or 11).

In some specific exemplary processes, the operation of creating a federated index from at least a part of the first-administered content index and at least a part of the second-administered content index includes the operation of federated index creation agent 914 generating federated index 916 in response to one or more indexes (e.g., multi-mote and/or mote-addressed indexes) obtained from both the first-administered set 800 of motes and the second-administered set 802 of motes. In some implementations, federated index creation agent 914 creates federated index 916 to include at least a part of a content index from two differently-administered mote networks, such as first administered set 800 of motes and second administered set 802 of motes (see., e.g., federated index 916 of FIG. 11). In some implementations, federated index creation agent 914 creates federated index 916 to include one or more entries denoting one or more respective administrative domains of one or more content index entries (e.g., see federated index 916 of FIG. 11). In other implementations, federated index creation agent 914 creates federated index 916 to include access information to one or more content indexes for an administered content index (e.g., in some implementations, this is actually in lieu of a content index). In other implementations, federated index creation agent 914 creates federated index 916 to include information pertaining to a currency of at least one entry of an administered content index. In other implementations, federated index creation agent 914 creates federated index 916 to include information pertaining to an expiration of at least one entry of an administered content index. In other implementations, federated index creation agent 914 creates federated index 916 to include metadata pertaining to an administrative domain, wherein the metadata includes at least one of an ownership indicator, an access right indicator, an index refresh indicator, or a predefined policy indicator. In other implementations, federated index creation agent 914 creates federated index 916 to include an administrative domain-specific query string generated for or supplied by an administrative domain to produce an updated content index for that domain.

In some specific exemplary processes, the operation of creating a federated index from at least a part of the first-administered content index and at least a part of the second-administered content index includes but is not limited to the operations of creating the federated index from at least a part of one or more multi-mote content indexes of the first set of motes; creating the federated index from at least a part of at least one of a mote-addressed sensing index, a mote-addressed control index, or a mote-addressed routing index/spatial index of the first set of motes; creating the federated index from at least a part of one or more multi-mote content indexes of the second set of motes; and/or creating the federated index from at least a part of at least one of a mote-addressed sensing index, a mote-addressed control index, or a mote-addressed routing index/spatial index of the second set of motes. For example, federated index creation agent 914 creating at least a part of federated index 916 in response to portions of multi-mote content indexes (e.g., multi-mote indexes and/or aggregations of indexes) received from reporting entities associated with first administered set 800 of motes and/or second-administered set 802 of motes (e.g., such as shown and described in relation to FIGS. 7, 8, 9, 10 and/or 11).

With reference now again to FIG. 7, FIG. 8, FIG. 9, FIG. 10, and/or FIG. 11, the depicted views may yet again serve as a context for introducing one or more processes and/or devices described herein. Some specific exemplary processes include the operations of creating one or more first-administered content indexes for a first set of motes; obtaining at least a part of the one or more first administered content indexes of the first set of motes; creating one or more second administered content indexes for a second set of motes; obtaining at least a part of the second-administered content indexes of the second set of motes; and creating a federated index from at least a part of the one or more first-administered content indexes and at least a part of the one or more second-administered content indexes.

In some specific exemplary processes, the operations of creating one or more first-administered content indexes for a first set of motes and creating one or more second-administered content indexes for a second set of motes function substantially analogously as the processes described in creating mote-addressed content indexes, mote-addressed indexes, and aggregations of indexes as set forth elsewhere herein (e.g., such as shown and/or described under Roman Numeral headings I ("MOTE-ASSOCIATED INDEX CREATION"), III ("AGGREGATING MOTE-ASSOCIATED INDEX DATA"), and V ("FEDERATING MOTE-ASSOCIATED INDEX DATA"), above, as well as in the as-filed claims). Accordingly, the specific exemplary processes of the operations of creating one or more first-administered content indexes for a first set of motes and creating one or more second-administered content indexes for a second set of motes are not explicitly redescribed here for sake of clarity, in that such specific exemplary processes will be apparent to one of skill in the art in light of the disclosure herein (e.g., as shown and described under Roman Numeral headings I, III, and V, above, as well as in the as-filed claims).

In some specific exemplary processes, the operations of obtaining at least a part of the one or more first-administered content indexes of the first set of motes; obtaining at least a part of the second-administered content indexes of the second set of motes; and creating a federated index from at least a part of the one or more first-administered content indexes and at least a part of the one or more second-administered content indexes function substantially analogously as to like processes described elsewhere herein (e.g., as shown and described under Roman Numeral heading V ("FEDERATING MOTE-ASSOCIATED INDEX DATA"), above, as well as in the as-filed claims). Accordingly, the specific exemplary processes of the operations of obtaining at least a part of the one or more first-administered content indexes of the first set of motes; obtaining at least a part of the second-administered content indexes of the second set of motes; and creating a federated index from at least a part of the one or more first-administered content indexes and at least a part of the one or more second-administered content indexes are not explicitly redescribed here for sake of clarity, in that such specific exemplary processes will be apparent to one of skill in the art in light of the disclosure herein (e.g., as shown and described under Roman Numeral heading V, above, as well as in the as-filed claims).

VI. Using Mote-Associated Indexes

Figure 12:
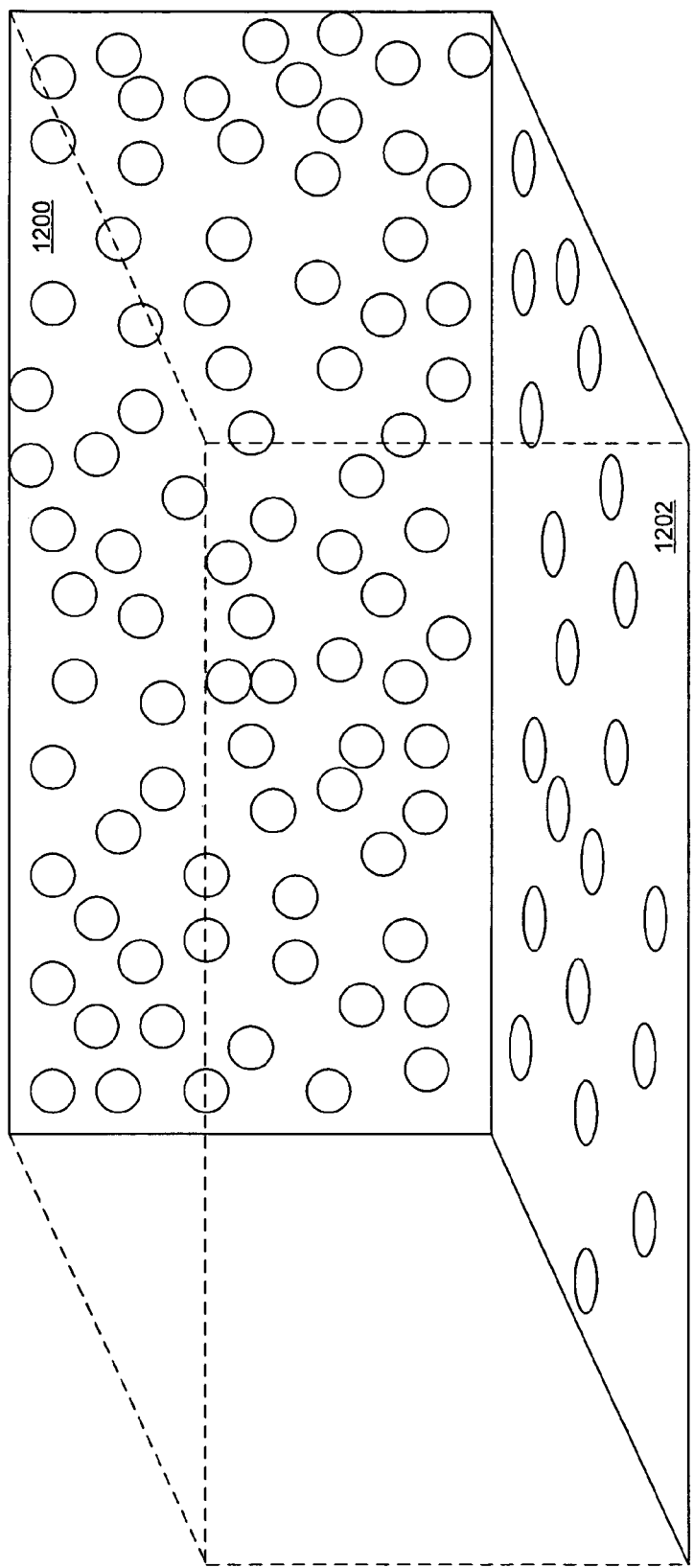
FIG. 12 depicts a perspective cut-away view of a hallway that may form an environment of processes and/or devices described herein.

Referring now to FIG. 12, depicted is a perspective cut-away view of a hallway that may form an environment of processes and/or devices described herein. Wall 1200 and floor 1202 are illustrated as having motes (depicted as circles and/or ovals). Typically, the motes may be as described elsewhere herein (e.g., mote 200, 300, 500, and/or 600, etc.). In some instances, the motes are applied to wall 1200 and/or floor 1202 with an adhesive. In other instances, the motes are formed into 1200 and/or floor 1202 during fabrication. In other instances, a covering for the wall (e.g., wallpaper and/or paint) contains motes that are applied to 1200 and/or floor 1202.

Figure 13:
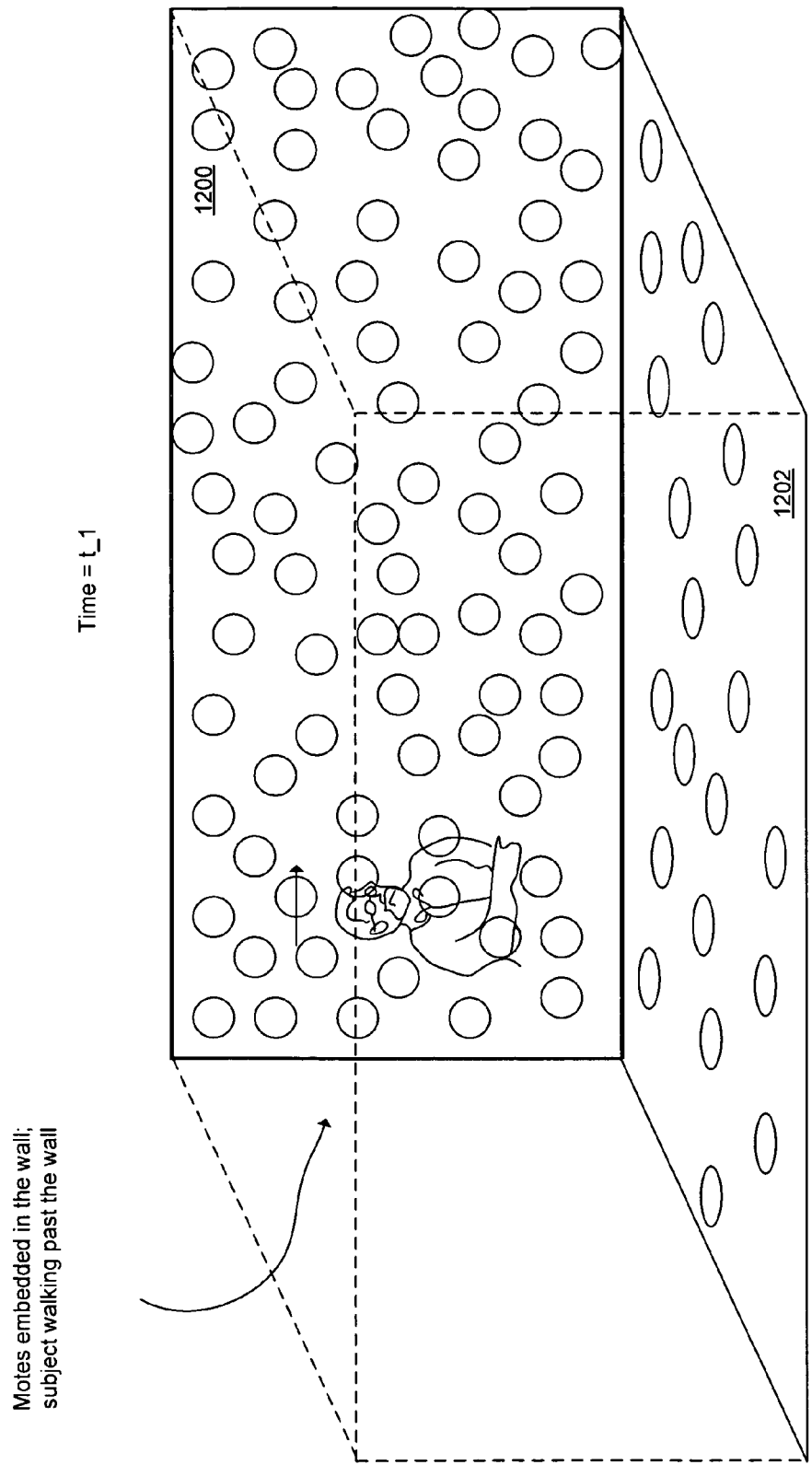
FIGS. 13, 14 and 15 show three-timed sequenced views of a person transiting wall 1200 and floor 1202 of the hallway of FIG. 12.
Figure 14:
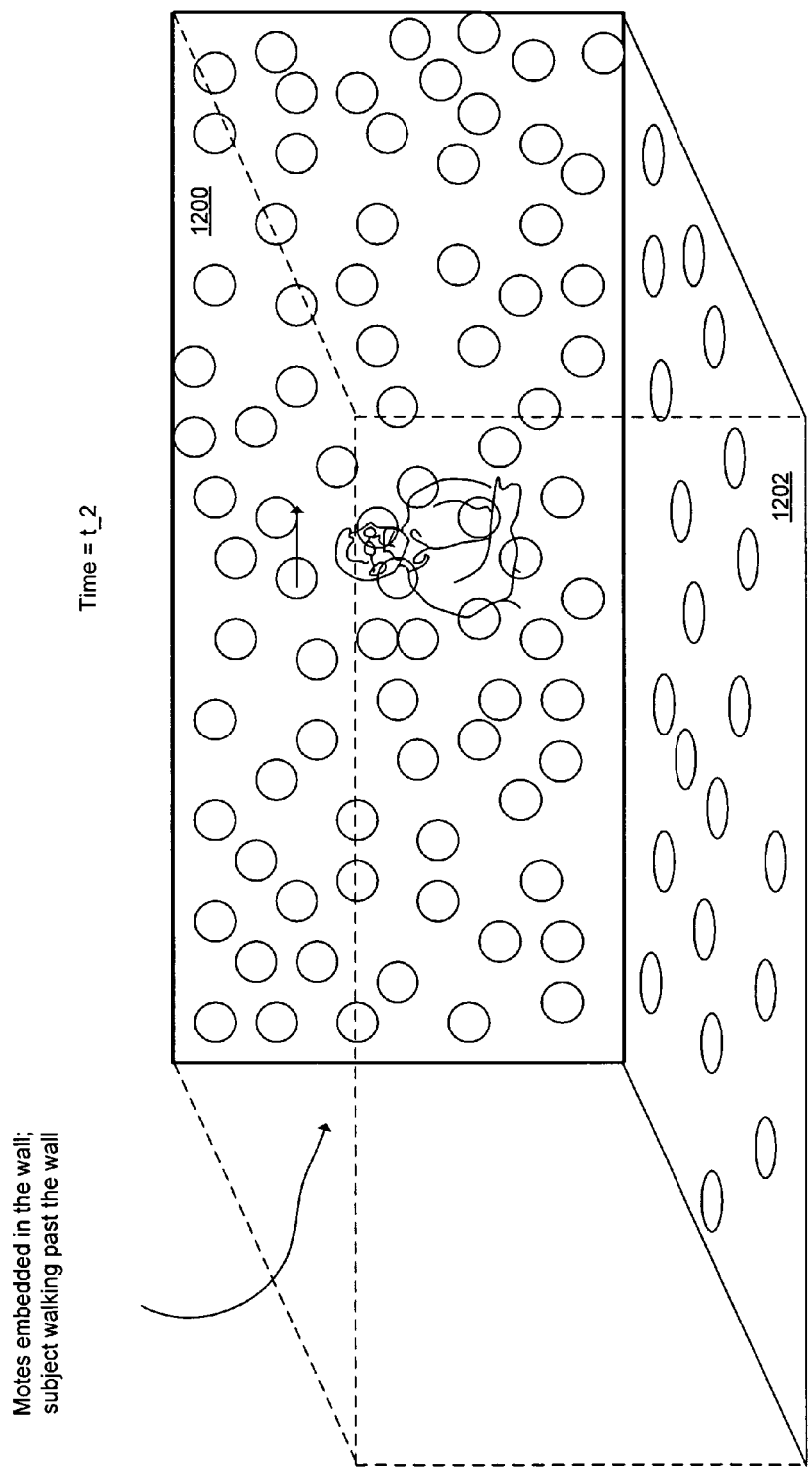
Figure 15:
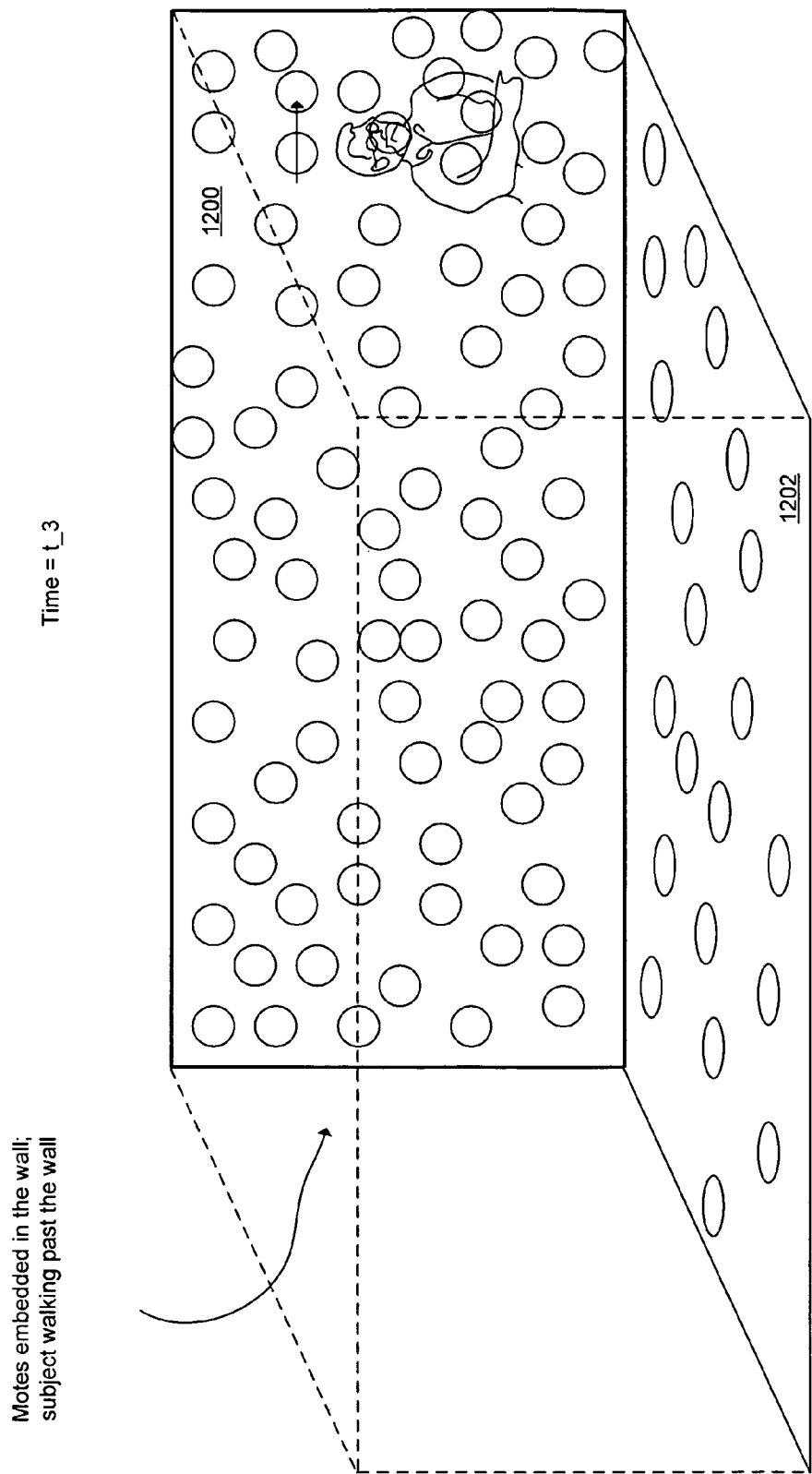

With reference now to FIGS. 13, 14, and 15, shown are three time-sequenced views of a person transiting wall 1200 and floor 1202 of the hallway of FIG. 12. FIG. 13 shows the position of the person at time=t_1. FIG. 14 shows the position of the person at time=t_2. FIG. 15 shows the position of the person at time=t_3.

Figure 16:
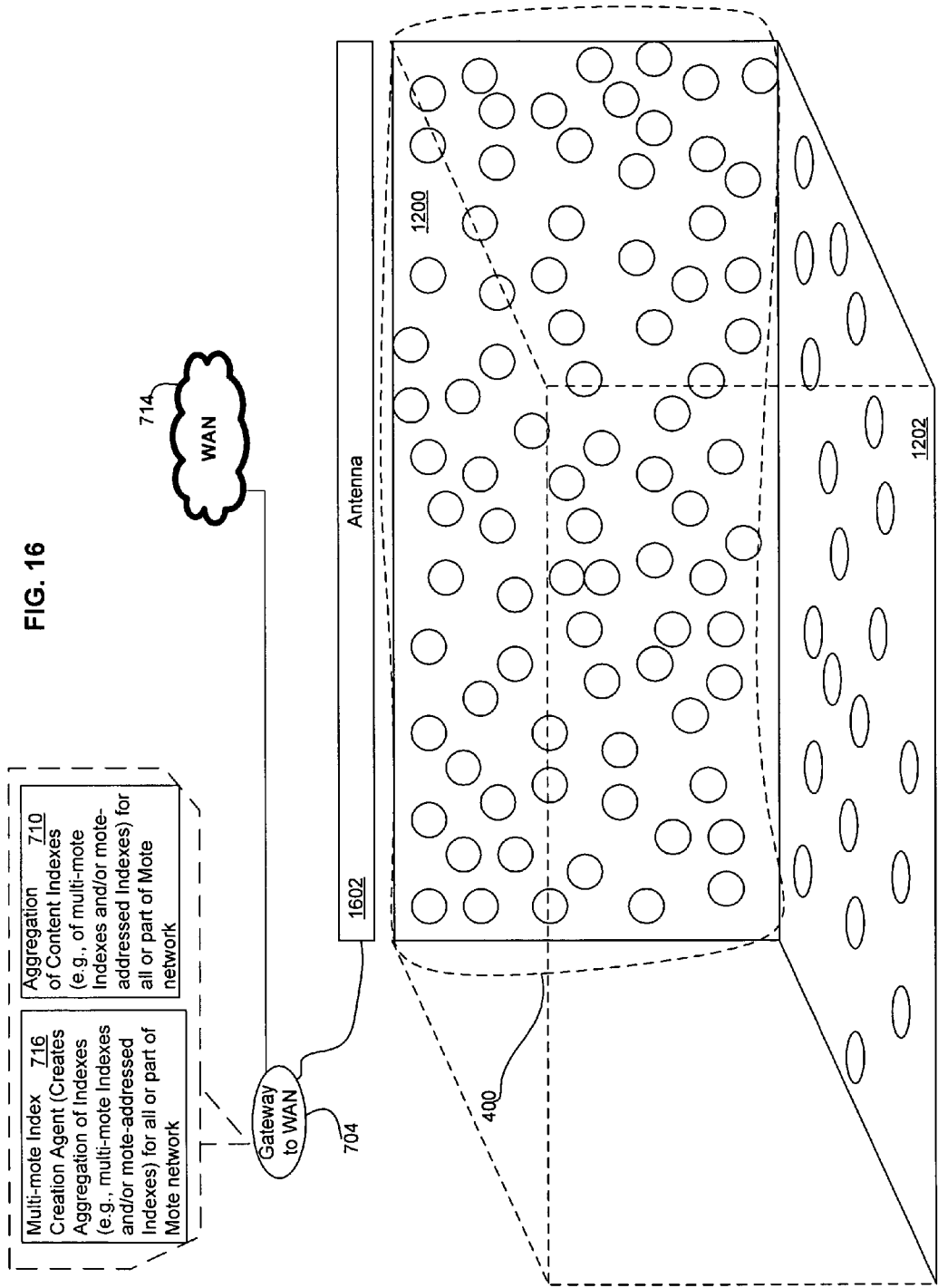
FIG. 16 depicts a perspective view of the hallway of FIG. 12, modified in accord with aspects of the subject matter described herein.

Referring now to FIG. 16, depicted is a perspective view of the hallway of FIG. 12, modified in accord with aspects of the subject matter described herein. Illustrated is that the motes of wall 1200 may be treated as a first set 400 of motes that function and/or are structured in fashions analogous to first set 400 of motes shown/described elsewhere herein (e.g., in relation to FIGS. 4-7) and/or as shown/described here. Accordingly, antenna 1602 is shown proximate to wall 1200 and feeding gateway 704 onto WAN 714. Multi-mote index creation agent 716 is depicted as executing on the more powerful computational systems of gateway 704 (e.g., a mini and/or mainframe computer system) to create aggregation 710 of content indexes. Gateway 704, multi-mote index creation agent 716, and aggregation 710 of content indexes function and/or are structured analogously as described elsewhere herein, and are not expressly re-described here for sake of clarity.

Figure 17:
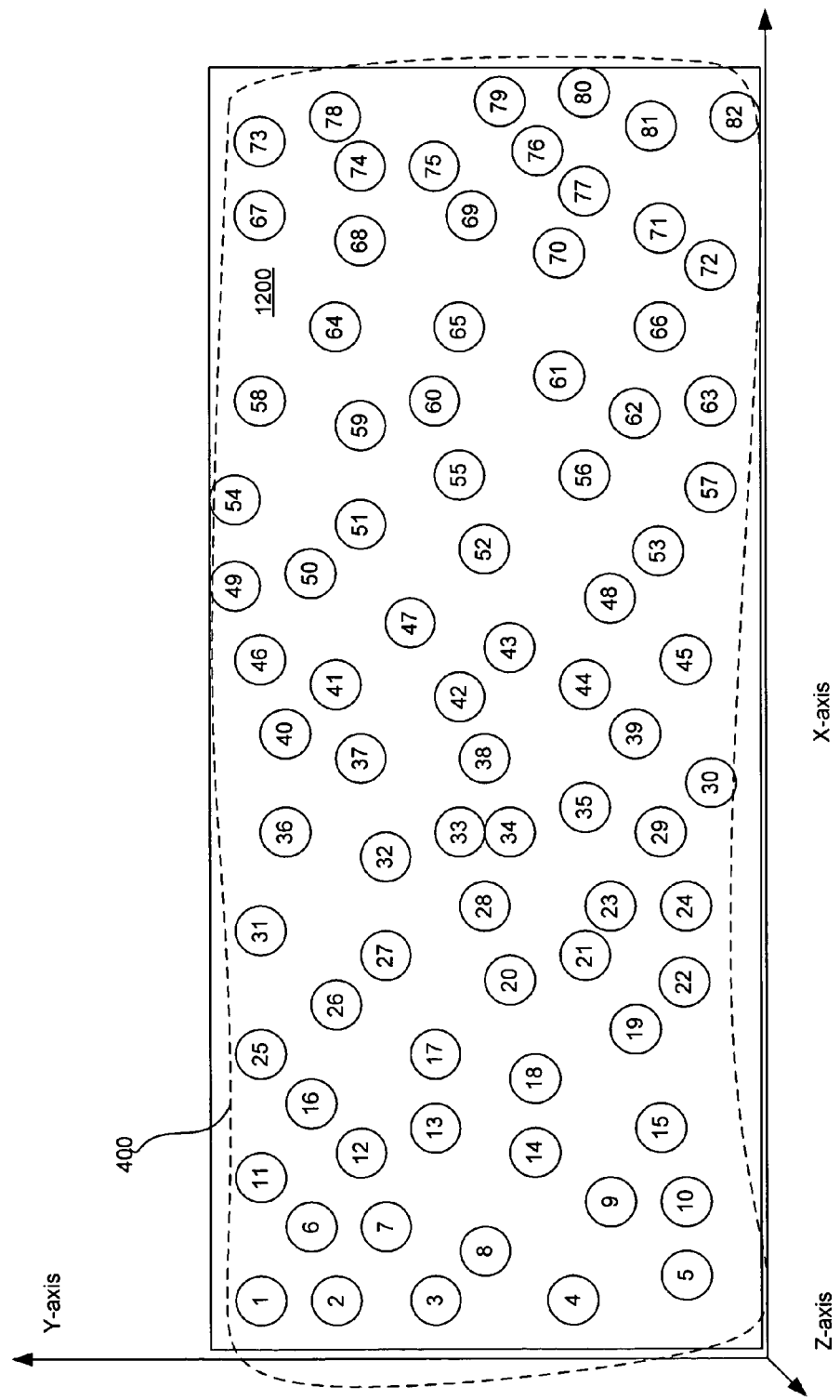
FIG. 17 illustrates that a first set 400 of the physical motes of wall 1200 may be treated as mapped into a conceptual x-y coordinate system.

With reference now to FIG. 17, illustrated is that first set 400 of the physical motes of wall 1200 may be treated as mapped into a conceptual x-y coordinate system. The mapping into the conceptual x-y coordinate system may be used to illustrate how a multi-mote content index or aggregation of content indexes can be used to advantage. Those having skill in the art will appreciate that in some instances, the mapping will typically be into a three-space coordinate system (e.g., x-y-z), but that a two-space (e.g., x-y) example is described herein for sake of clarity. In addition, although rectilinear coordinate systems are described herein, those having skill in the art will appreciate that other coordinate systems (e.g., spherical, cylindrical, circular, etc.) may be substituted consistent with the teachers herein.

Figure 18:
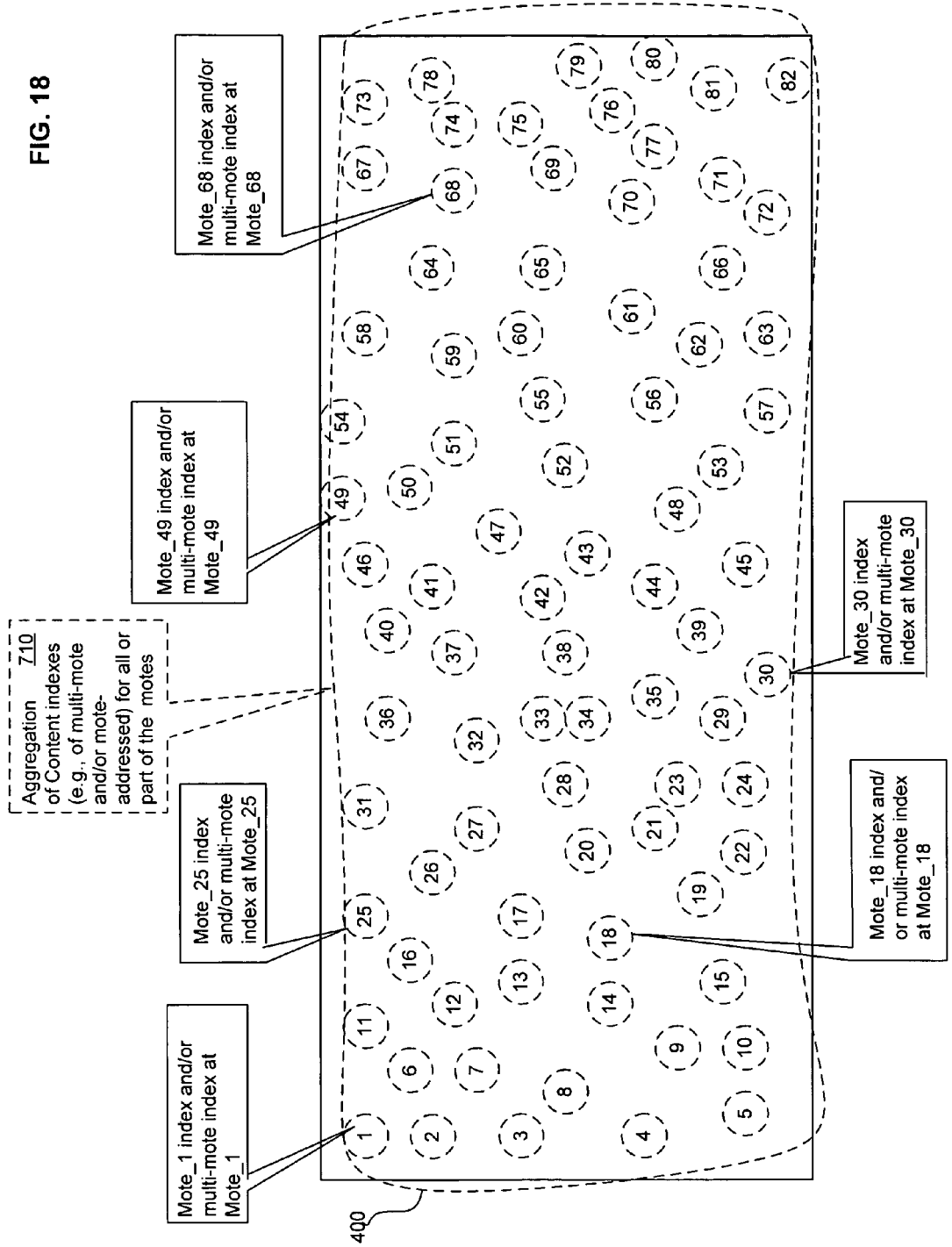
FIG. 18 shows a partially schematic diagram that pictographically illustrates the coordinating of the conceptual mapping of the motes of wall 1200 with the indexes of first set 400 of the motes of wall 1200.

Referring now to FIG. 18, shown is a partially schematic diagram that pictographically illustrates the coordinating of the conceptual mapping of the motes of wall 1200 with the indexes of first set 400 of the motes of wall 1200. Specifically, depicted in FIG. 18 is that the mapping of the physical motes as shown in FIG. 17 can be abstracted into mote content indexes. (This abstraction is illustrated in FIG. 18 by the dashed lines indicating the motes.) The mote content indexes can be used to "stand in" for or "represent" capabilities of various motes within the first set 400 of motes, and can be managed and/or searched using high speed computer systems.

Those skilled in the art will appreciate that there are many techniques suitable for managing/searching mote content indexes of first set 400 of motes. Examples of such techniques are database techniques such as those associated with Structured Query Language (SQL) systems.

Figure 19:
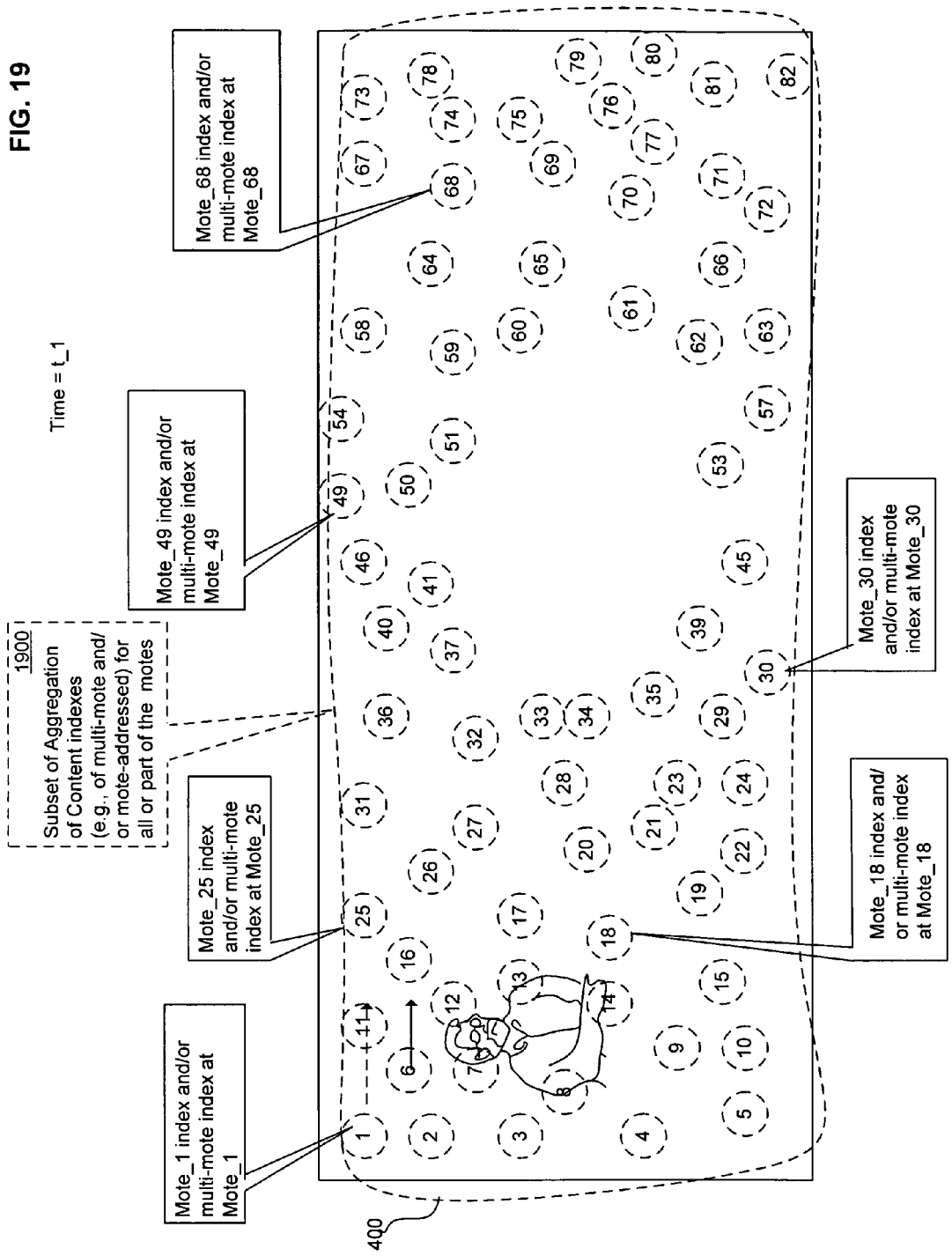
FIGS. 19, 20 and 21 show time-stamped versions of subset 1900 of aggregation 710 associated with the state of first set 400 of motes.
Figure 20:
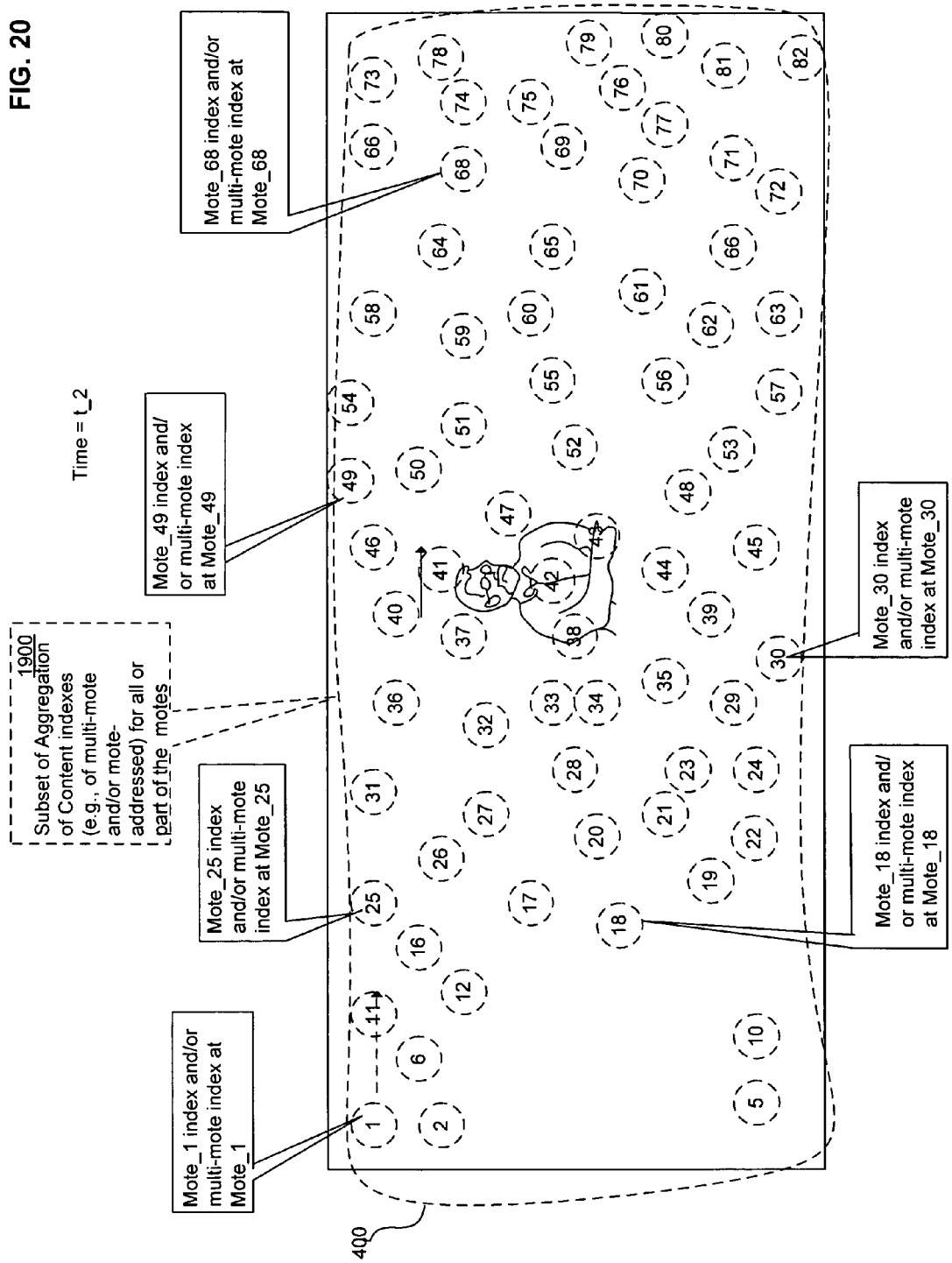
Figure 21:
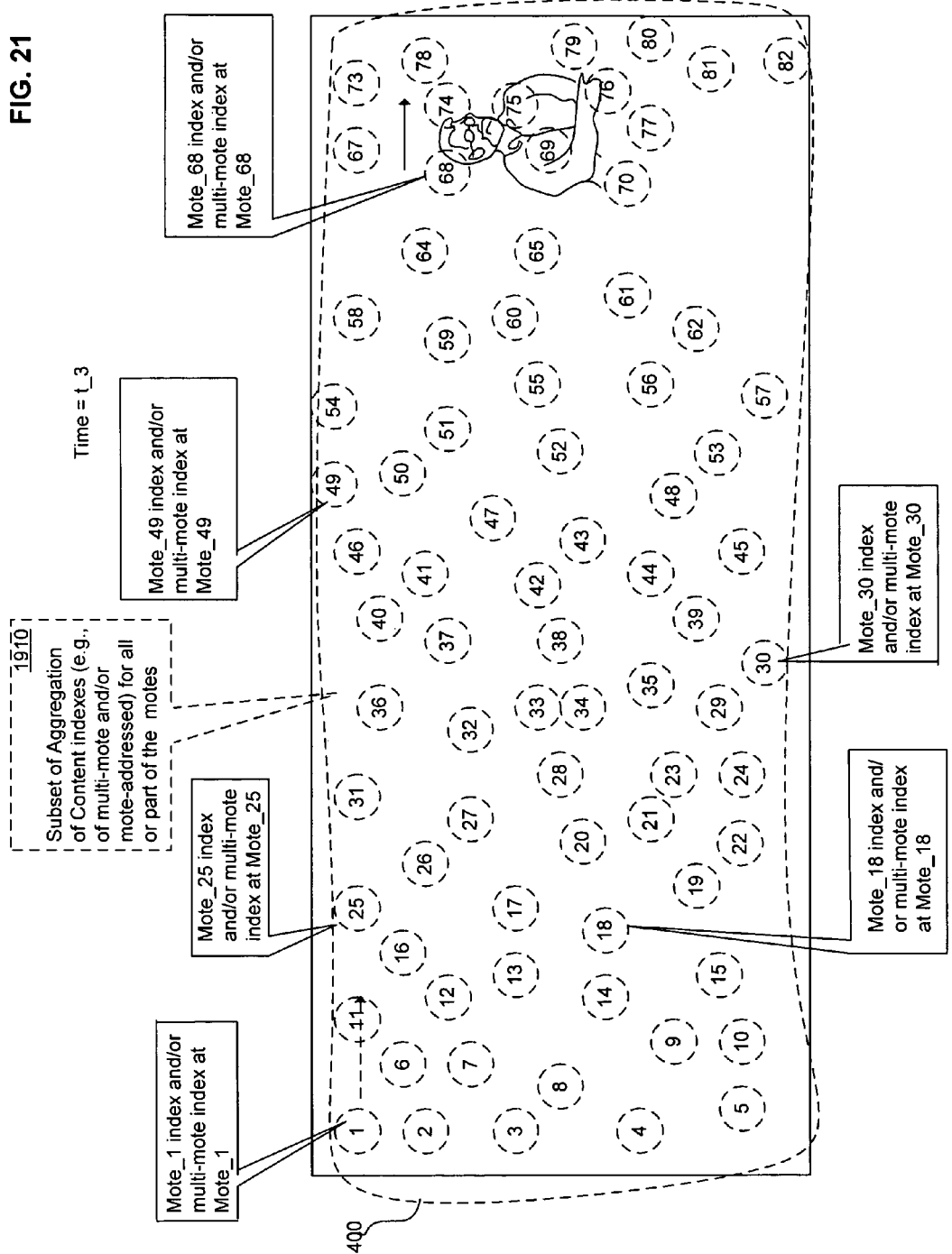

With reference now to FIGS. 19, 20, and 21 shown are time-stamped versions of subset 1900 of aggregation 710 associated with the state of first set 400 of motes. With reference now to FIG. 19, and assuming for sake of illustration that the input-defined mote-appropriate task is infrared image detection, depicted is subset 1900 of aggregation 710 at time=t_1 that shows those motes whose indexes indicate that they are capable of detecting a visible light image of the person transiting wall 1200 at time=t_1. Referring now to FIG. 20, illustrated is subset 1900 of aggregation 710 at time=t_2 that shows those motes whose indexes indicate that they are capable of detecting a visible light image of the person transiting wall 1200 at time=t_2. With reference now to FIG. 21, shown is subset 1900 of aggregation 710 at time=t_3 that shows those motes whose indexes indicate that they are capable of detecting a visible light image of the person transiting wall 1200 at time=t_3. As can be seen, subset 1900 contains indications of different motes at the different times; those skilled in the art will also recognize that in some implementations the number/location of motes will remain relatively constant over time. Those having skill in the art will appreciate that in practice subset 1900 of aggregation 710 will generally be in the form of nested data structures and that the pictographic representations of how the person would "appear" in FIGS. 19, 20, and 21 are used herein for sake of clarity.

As described elsewhere herein (e.g., in relation to FIGS. 1 and 2), motes can include any number of devices whose information capabilities can be captured in aggregates of content indexes (e.g., aggregation 710 of content indexes). Accordingly, aggregation 710 allows flexible and powerful searching techniques, a few of which will now be described.

Following are a series of flowcharts depicting embodiments of processes. For ease of understanding, the flowcharts are organized such that the initial flowcharts present embodiments via an overall "big picture" viewpoint and thereafter the following flowcharts present alternate embodiments and/or expansions of the "big picture" flowcharts as either substeps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and efficient understanding of the various process instances.

Figure 22:
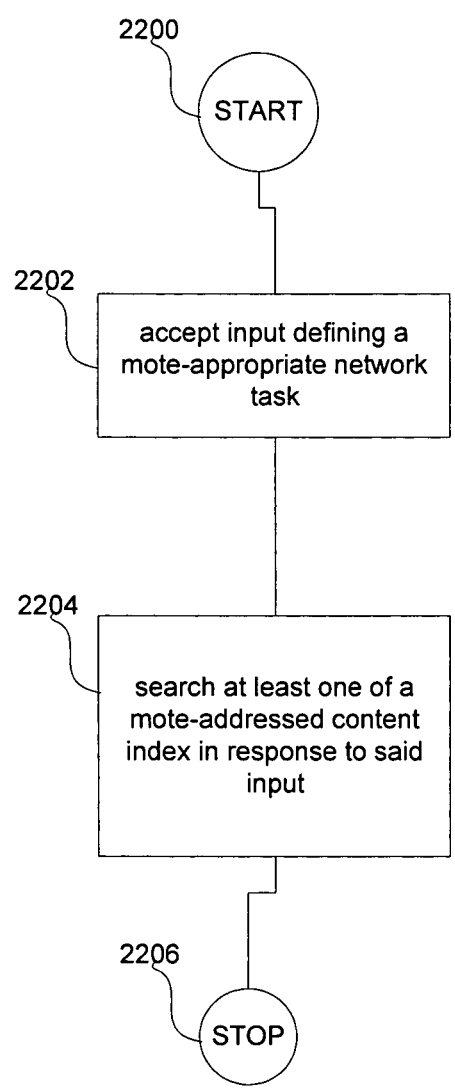
FIG. 22 depicts a high-level logic flowchart of a process.

Referring now to FIG. 22, depicted is a high-level logic flowchart of a process. Method step 2200 shows the start of the process. Method step 2202 depicts accepting input defining a mote-appropriate network task. Method step 2204 depicts searching at least one mote-addressed content index in response to said input. Method step 2206 shows the end of the process.

Figure 23:
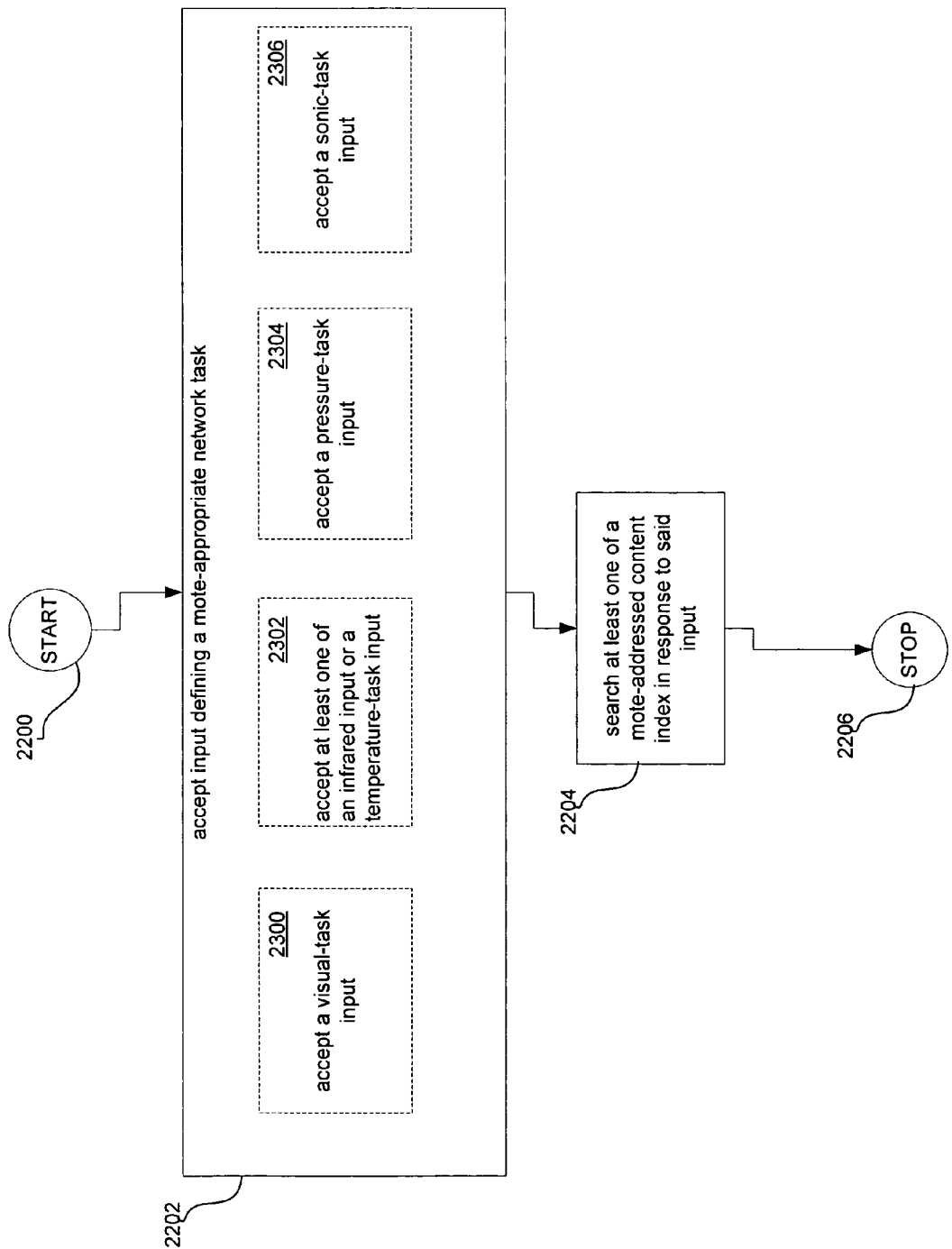
FIG. 23 illustrates a high-level logic flowchart depicting several alternate implementations of the high-level logic flowchart of FIG. 22.

With reference now to FIG. 23, illustrated is a high-level logic flowchart depicting several alternate implementations of the high-level logic flowchart of FIG. 22. Depicted is that in one alternate implementation, method step 2202 includes method step 2300. Method step 2300 shows accepting a visual-task input. Specific example implementations of method step 2300 are as shown/described in relation to substantially analogous method step 3600 of FIG. 36, and are not expressly described here for sake of clarity.

Continuing to refer to FIG. 23, illustrated is a high-level logic flowchart depicting several alternate implementations of the high-level logic flowchart of FIG. 22. Depicted is that in one alternate implementation, method step 2202 includes method step 2302. Method step 2302 shows accepting at least one of an infrared-task input or a temperature-task input. Specific example implementations of method step 2302 are as shown/described in relation to substantially analogous method step 3602 of FIG. 36.

With reference now again to FIG. 23, illustrated is a high-level logic flowchart depicting several alternate implementations of the high-level logic flowchart of FIG. 22. Depicted is that in one alternate implementation, method step 2202 includes method step 2304. Method step 2304 shows accepting a pressure-task input. Specific example implementations of method step 2304 are as shown/described in relation to substantially analogous method step 3604 of FIG. 36, and are not expressly described here for sake of clarity.

With reference now again to FIG. 23, illustrated is a high-level logic flowchart depicting several alternate implementations of the high-level logic flowchart of FIG. 22. Depicted is that in one alternate implementation, method step 2202 includes method step 2306. Method step 2306 shows accepting a sonic-task input. Specific example implementations of method step 2306 are as shown/described in relation to substantially analogous method step 3606 of FIG. 36, and are not expressly described here for sake of clarity.

Figure 24:
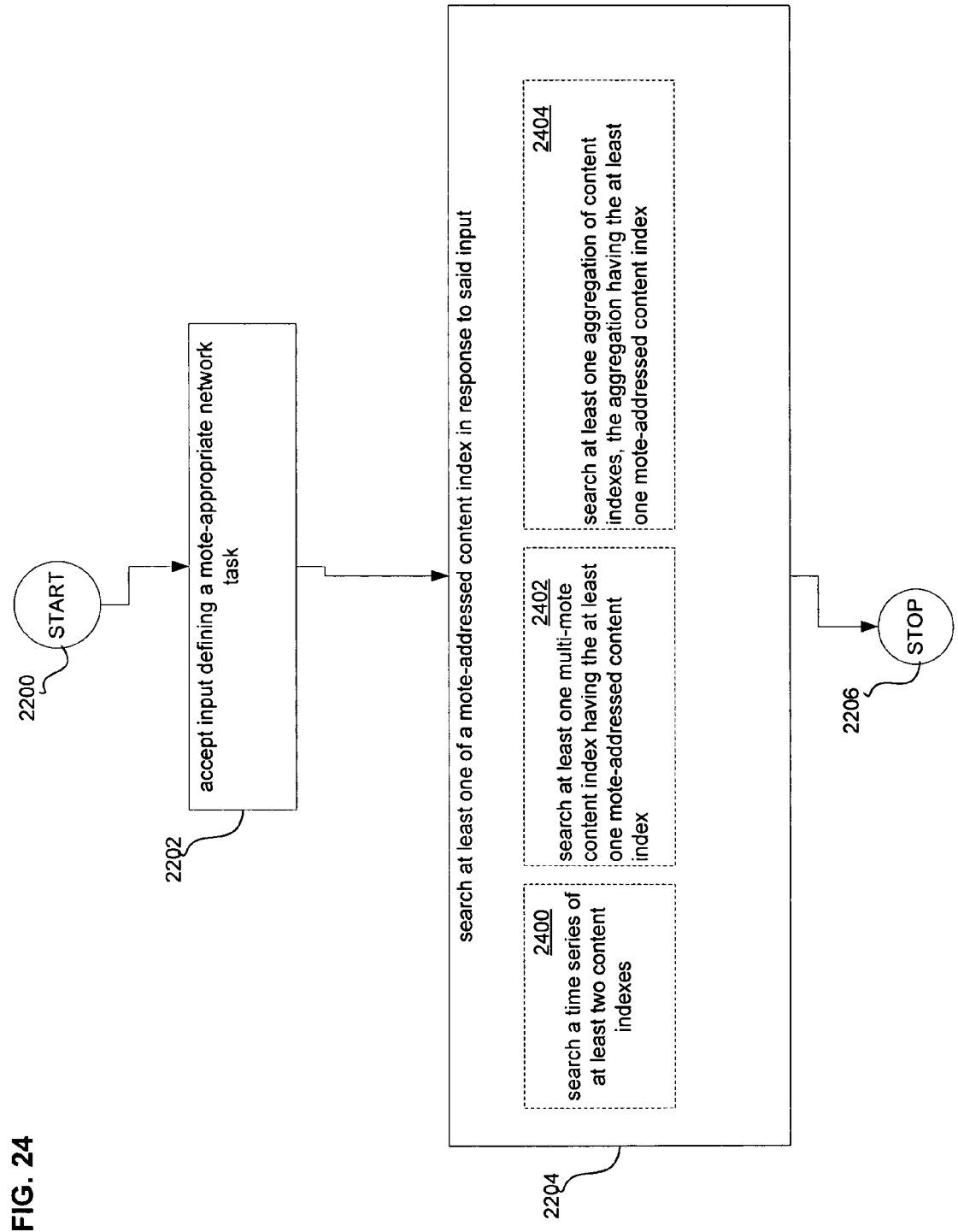
FIG. 24 illustrates a high-level logic flowchart depicting several alternate implementations of the high-level logic flowchart of FIG. 22.

Referring now to FIG. 24, illustrated is a high-level logic flowchart depicting several alternate implementations of the high-level logic flowchart of FIG. 22. Depicted is that in one alternate implementation, method step 2204 includes method step 2400. Method step 2400 shows searching a time series of at least two content indexes. In various exemplary implementations, electrical circuitry successively searches a time series of content indexes for motes capable of gathering various defined types of information related to various specified mote-appropriate network tasks. In some specific implementations such as those used in security, electrical circuitry (e.g., electrical circuitry forming a processor configured by a program to perform various tasks) searches a time series of content indexes for motes capable of capturing information related to a specified mote-appropriate network task (e.g., searching one or more content indexes of subset 1900 of aggregation 710 at time=t_1 (FIG. 19), at time=t_2 (FIG. 20), and at time=t_3 (FIG. 21) for one or more motes capable of tracking a person's progress through the hallway such as shown and/or described in relation to FIGS. 13, 14, and 15). In some implementations such as those used in criminal investigations, electrical circuitry searches a time series of federated indexes for motes having a capability(ies) to detect particular pattern of sound over time (e.g., searching the time series for motes capable of detecting a pattern of sound a gunshot would make in subset 1900 of aggregation 710 at time=t_1 (FIG. 19), at time=t_2 (FIG. 20), and at time=t_3 (FIG. 21) if a gun were to be fired in the hallway of FIG. 12). Those skilled in the art will appreciate that many other searches may be performed, dependent upon the accepted input defining the mote-appropriate search of method step 2202.

Continuing to refer to FIG. 24, depicted is that in one alternate implementation method step 2204 includes method step 2402. Method step 2402 shows searching at least one multi-mote content index having the at least one mote-addressed content index. In various exemplary implementations, electrical circuitry searches at least one multi-mote content index having the at least one mote-addressed content index. In some specific implementations such as those used in security, electrical circuitry searches one or more multi-mote content indexes, over time, in response to the defined mote-appropriate network task (e.g., electrical circuitry searching one or more multi-mote content indexes for indications of motes having capabilities to monitor a patient's heart for sounds indicative of arrhythmia). In some implementations such as those used in aviation maintenance, electrical circuitry searches one or more multi-mote content indexes, over time, in response to a defined mote-appropriate network task (e.g., electrical circuitry searching one or more multi-mote content indexes for indications of motes having capabilities monitor a defined area of aviation equipment, such as a jet engine, for sounds indicative of motor failure, in response to a search requesting that the indexes be so searched). Those skilled in the art will appreciate that many other searches may be performed, dependent upon the accepted input defining the mote-appropriate network task of method step 2202.

Figure 25:
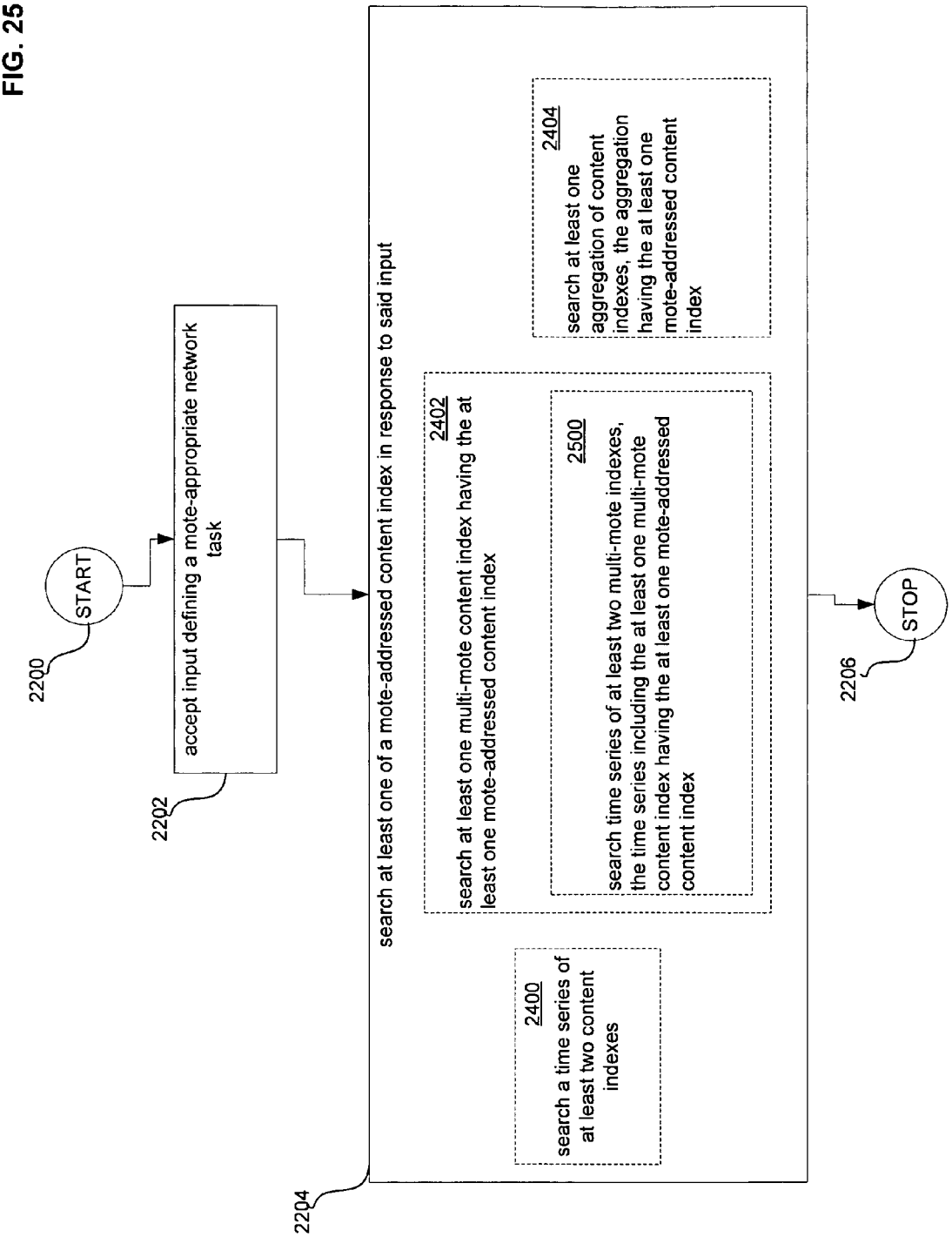
FIG. 25 shows a high-level logic flowchart depicting several alternate implementations of the high-level logic flowchart of FIG. 24.

With reference now to FIG. 25, shown is a high-level logic flowchart depicting several alternate implementations of the high-level logic flowchart of FIG. 24. Depicted is that in one alternate implementation, method step 2402 includes method step 2500. Method step 2500 shows searching a time series of at least two multi-mote indexes, the time series including the at least one multi-mote content index having the at least one mote-addressed content index. In various exemplary implementations, electrical circuitry successively searches a time series of at least two multi-mote indexes, the time series including the at least one multi-mote content index having the at least one mote-addressed content index for motes capable of gathering various defined types of information appropriate to the mote-appropriate network task. In some specific implementations such as those used in security, electrical circuitry (e.g., electrical circuitry forming a processor configured by a program to perform various tasks) searches time series of at least two multi-mote indexes, the time series including the at least one multi-mote content index having the at least one mote-addressed content index for motes capable of capturing an image in visible light (e.g., searching one or more content indexes of subset 1900 of aggregation 710 at time=t_1 (FIG. 19), at time=t_2 (FIG. 20), and at time=t_3 (FIG. 21) in order to identify motes that have visible light capabilities appropriate to track a person's progress through the hallway such as shown and/or described in relation to FIGS. 13, 14, and 15). In some implementations such as those used in criminal investigations, electrical circuitry searches a time series of one or more multi-mote content indexes of federated content index 916 for motes capable of identifying a particular pattern or characteristic of sound over time (e.g., the pattern of sound or acoustic signature a gunshot would make in subset 1900 of aggregation 710 at time=t_1 (FIG. 19), at time=t_2 (FIG. 20), and at time=t_3 (FIG. 21) if a gun were to be fired in the hallway of FIG. 12). Those skilled in the art will appreciate that many other searches may be performed, dependent upon the accepted input defining the mote-appropriate network task of method step 2202.

Referring now again to FIG. 24, depicted is that in one alternate implementation method step 2204 includes method step 2404. Method step 2404 shows searching at least one aggregation of content indexes, the aggregation having the at least one mote-addressed content index. In various exemplary implementations, electrical circuitry searches the at least one aggregation of content indexes, the aggregation having the at least one mote-addressed content index. In some specific implementations such as those used in security, electrical circuitry (e.g., electrical circuitry forming a processor configured by a program to perform various tasks) searches the at least one aggregation of content indexes, the aggregation having the at least one mote-addressed content index, for motes capable of capturing an image in the visible light spectrum (e.g., searching subset 1900 of aggregation 710 of content indexes at time=t_1 (FIG. 19)) for one or more motes capable of determining if a person was in front of wall 1200 at some time=t_1 as shown and/or described in relation to FIG. 13). In some implementations such as those used in criminal investigations, electrical circuitry searches the at least one aggregation of content indexes, the aggregation having the at least one mote-addressed content index, for motes having capability(ies) to detect a particular sound at a particular time (e.g., a certain sound present in subset 1900 of aggregation 710 at time=t_1 (FIG. 19)). Those skilled in the art will appreciate that many other searches may be performed, dependent upon the accepted input defining the mote-appropriate search of method step 2202.

Figure 26:
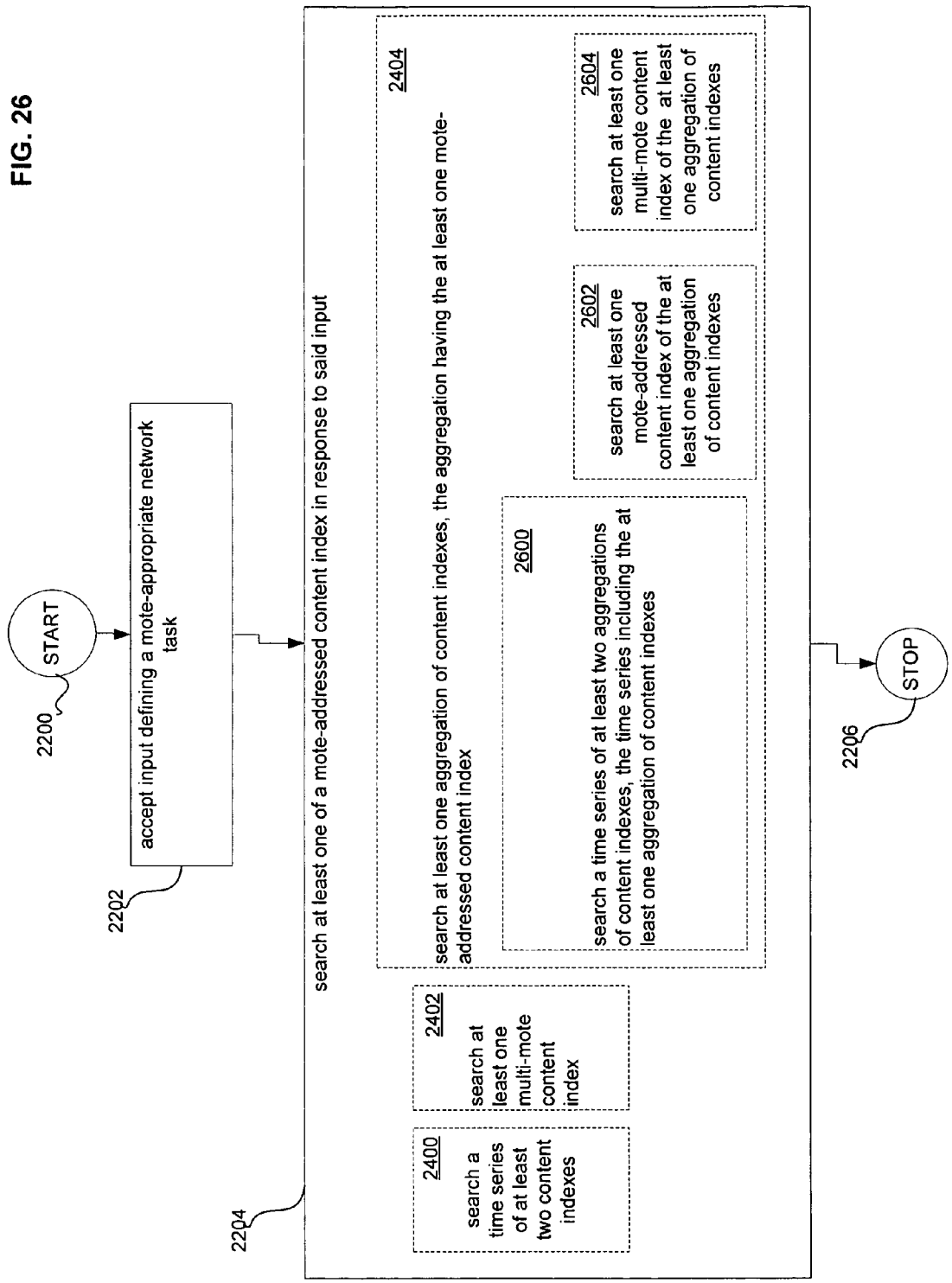
FIG. 26 shows a high-level logic flowchart depicting several alternate implementations of the high-level logic flowchart of FIG. 25.

With reference now to FIG. 26, shown is a high-level logic flowchart depicting several alternate implementations of the high-level logic flowchart of FIG. 25. Depicted is that in one alternate implementation, method step 2404 includes method step 2600. Method step 2600 illustrates searching a time series of at least two aggregations of content indexes, the time series including the at least one aggregation of content indexes. In various exemplary implementations, electrical circuitry searches a time series of at least two aggregations of content indexes, the time series including the at least one aggregation of content indexes. In some specific implementations such as those used in security, electrical circuitry (e.g., electrical circuitry forming a processor configured by a program to perform various tasks) searches the time series of at least two aggregations of content indexes, the time series including the at least one aggregation of content indexes, for motes capable of capturing an image in the visible light spectrum (e.g., searching one or more content indexes of subset 1900 of aggregation 710 at time=t_1 (FIG. 19), at time=t_2 (FIG. 20), and at time=t_3 (FIG. 21) for one or more motes capable of tracking a person's progress through the hallway such as shown and/or described in relation to FIGS. 13, 14, and 15). In some implementations such as those used in criminal investigations, electrical circuitry searches the time series of at least two aggregations of content indexes, the time series including the at least one aggregation of content indexes, for motes having capability(ies) to detect a particular sound at a particular time (e.g., searching subset 1900 of aggregation 710 at time=t_1 (FIG. 19), at time=t_2 (FIG. 20), and at time=t_3 (FIG. 21) for indications of motes capable of detecting the sound a gun would make if a gun were to be fired in the hallway of FIG. 12). Those skilled in the art will appreciate that many other searches may be performed, dependent upon the accepted input defining the mote-appropriate search of method step 2202.

Continuing to refer to FIG. 26, depicted is that in one alternate implementation, method step 2404 includes method step 2602. Method step 2602 illustrates searching at least one mote-addressed content index of the at least one aggregation of content indexes. In various exemplary implementations, electrical circuitry is used to effect the searching at least one mote-addressed content index of the at least one aggregation of content indexes. Those skilled in the art will appreciate that many other searches may be performed, dependent upon the accepted input defining the mote-appropriate search of method step 2202.

Continuing to refer to FIG. 26, depicted is that in one alternate implementation, method step 2404 includes method step 2604. Method step 2604 illustrates searching at least one multi-mote content index of the at least one aggregation of content indexes. In various exemplary implementations, electrical circuitry is used to effect the searching at least one multi-mote content index of the at least one aggregation of content indexes. Those skilled in the art will appreciate that many other searches may be performed, dependent upon the accepted input defining the mote-appropriate search of method step 2202.

Those skilled in the art will appreciate that in some implementations, the searching described in relation to various processes herein (e.g., such as those shown/described in relation to FIGS. 22-26) is performed on mote-addressed content indexes, multi-mote content indexes, and/or aggregations of content indexes loaded to computer systems external to a mote-appropriate network. For example, searching using computer systems such as shown/described in relation to gateway 704, which can include, for example, one or more of a notebook computer system, minicomputer system, server computer system, and/or a mainframe computer system. Those skilled in the art will also appreciate that in other implementations the searching described in relation to various processes herein (e.g., such as those shown/described in relation to FIGS. 22-26) is performed in whole or in part on motes of a mote-appropriate network. Those skilled in the art will also recognize that the approaches described herein are not limited to accepting an input of a single kind and that the searching may be refined using a combination of inputs, such as a visual definition input combined with a sonic definition input. When combined, the searching logic may correlate the processes temporally or the searches may be combined independently of relative time references. Those skilled in the art will also appreciate that in other implementations the searching described in relation to various processes herein (e.g., such as those shown/described in relation to FIGS. 22-26) is performed in other computer systems consistent with the teachings herein.

VII. Using Federated Mote-Associated Indexes

Figure 27:
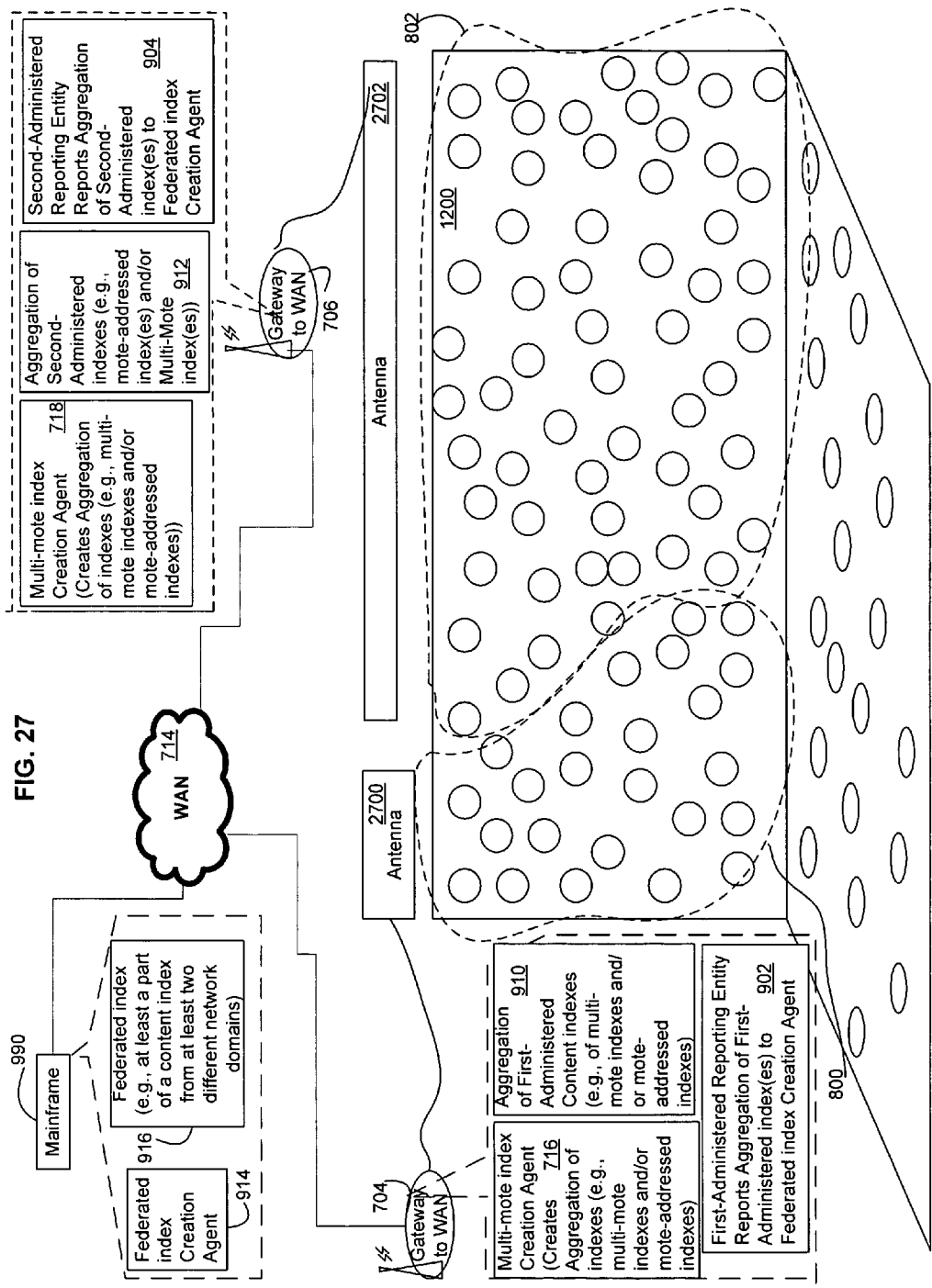
FIG. 27 illustrates the perspective cut-away view of the hallway of FIG. 12 modified in accord with aspects of the subject matter described herein.

With reference now to FIG. 27, illustrated is the perspective cut-away view of the hallway of FIG. 12 modified in accord with aspects of the subject matter described herein. Illustrated is that the motes of wall 1200 may be partitioned into first-administered set 800 of motes and second-administered set 802 of motes analogous to the first-administered set 800 of motes and second-administered set 802 of motes shown/described elsewhere herein (e.g., in relation to FIGS. 10-13). Antenna 2700 is shown proximate to first-administered set 800 of motes and shown feeding gateway 704 onto WAN 714. Multi-mote index creation agent 716 is depicted as executing on the more powerful computational system(s) of gateway 704 (e.g., a mini and/or a mainframe computer system) to create aggregation 910 of first-administered content indexes. First-administered reporting entity 902 is illustrated as executing on gateway 704. Gateway 704, multi-mote index creation agent 716, aggregation 910 of first-administered content indexes, and first-administered reporting entity 902 function and/or are structured in fashions analogous to those described here and/or elsewhere herein.

Antenna 2702 is shown proximate to second-administered set 802 of motes and feeding gateway 706 onto WAN 714. Multi-mote index creation agent 718 is depicted as executing on the more powerful computational system(s) of gateway 706 (e.g., a mini and/or a mainframe computer system) to create aggregation 912 of second-administered content indexes. Second-administered reporting entity 904 is illustrated as executing on gateway 706. Gateway 706, multi-mote index creation agent 718, aggregation 912 of second-administered content indexes, and second-administered reporting entity 904 function and/or are structured in fashions analogous to those described here and/or elsewhere herein.

In some implementations, frequency re-use techniques are utilized across first-administered set 800 of motes and second-administered set 802 of motes. For instance, first-administered set 800 of motes operating on or around a first carrier frequency and second-administered set 802 of motes operating on or around a second carrier frequency. Accordingly, in some implementations antenna 2700 is tuned to a carrier frequency of first-administered set 800 of motes and antenna 2702 is tuned to a carrier frequency of second-administered set 802 of motes. In other implementations, frequency re-use techniques are not used across first-administered set 800 of motes and second-administered set 802 of motes (e.g., the differently administered networks use different addressing spaces and/or proximities to provide for the separate network administrations).

Further shown in FIG. 27 are federated index creation agent 914 and federated content index 916 resident within mainframe computer system 990. Federated index creation agent 914, federated content index 916, and mainframe computer system 990 function and/or are structured in fashions analogous to those described here and/or elsewhere herein.

Figure 28:
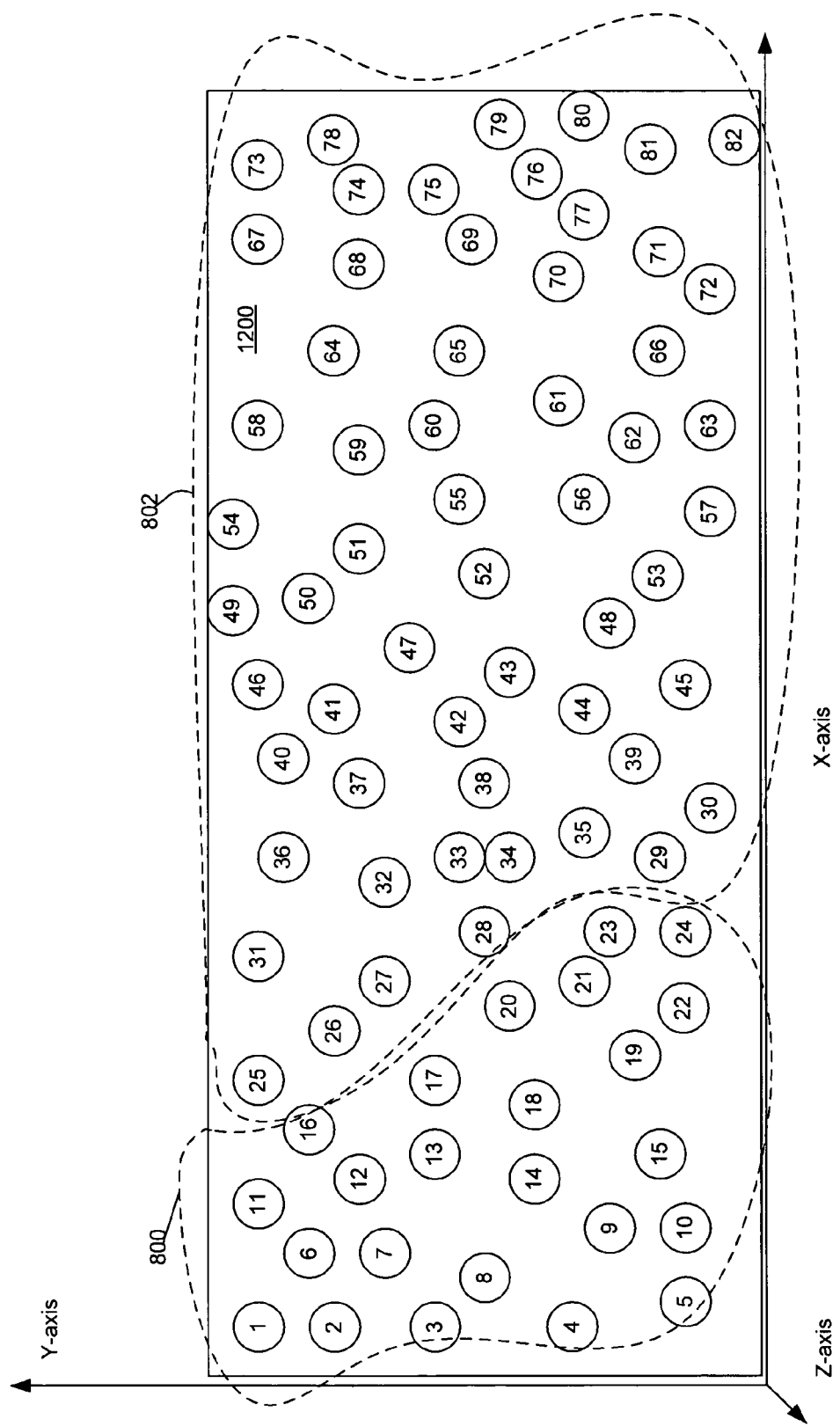
FIG. 28 shows that first-administered set 800 and second-administered set 802 of the physical motes of wall 1200 may be treated as mapped into a conceptual x-y coordinate system.

Referring now to FIG. 28, shown is that first-administered set 800 and second-administered set 802 of the physical motes of wall 1200 may be treated as mapped into a conceptual x-y coordinate system. The mapping into the conceptual x-y coordinate system may be used to illustrate how a multi-mote content index or aggregation of content indexes (e.g., such as those forming at least a part of federated content index 916) can be used to advantage. Those having skill in the art will appreciate that in some instances, the mapping will typically be into a three-space coordinate system (e.g., x-y-z), but that a two-space (e.g., x-y) example is described herein for sake of clarity. In addition, although rectilinear coordinate systems are described herein, those having skill in the art will appreciate that other coordinate systems (e.g., spherical, cylindrical, circular, etc.) may be substituted consistent with the teachings herein.

Figure 29:
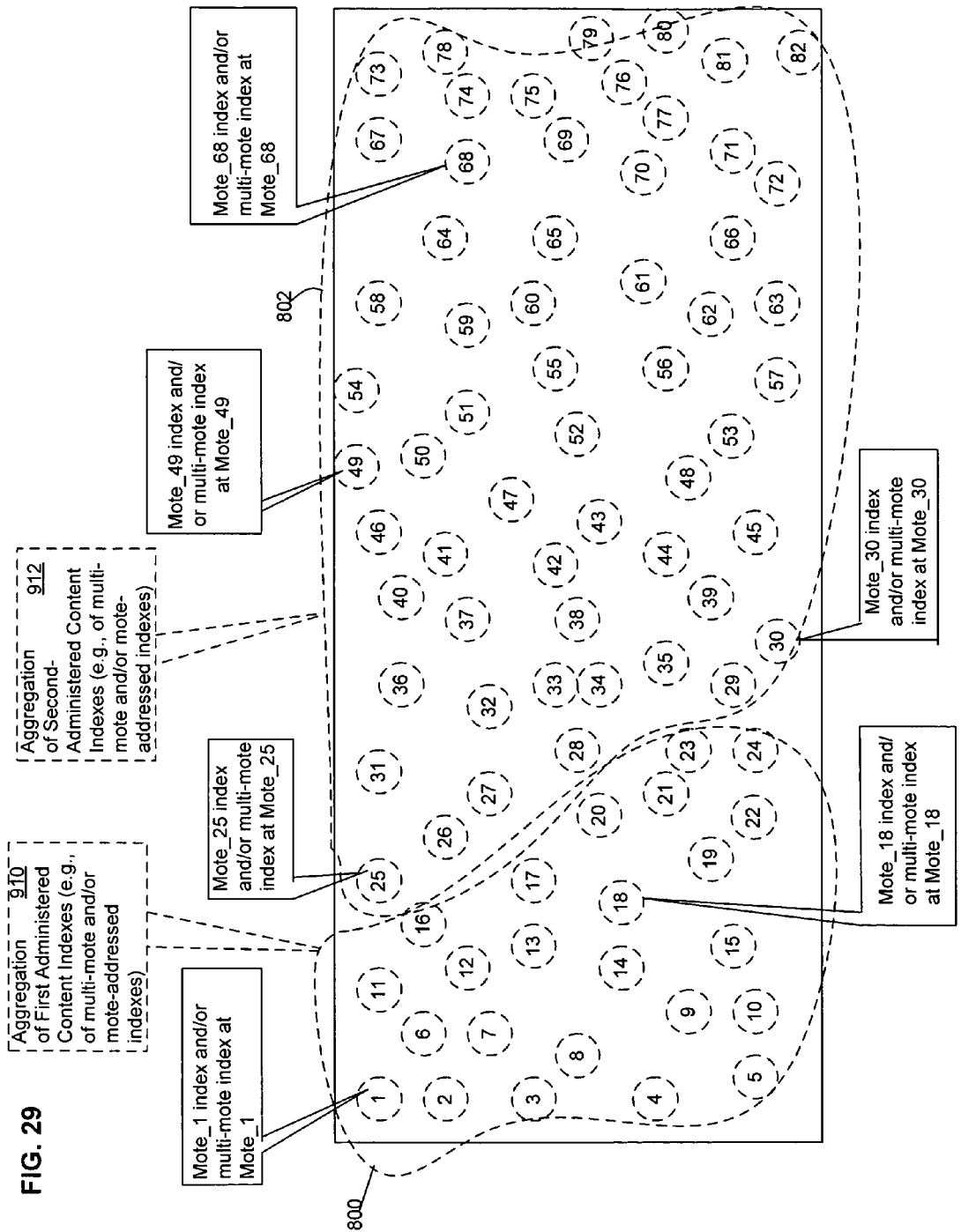
FIG. 29 shows a partially schematic diagram that pictographically illustrates the coordinating of the conceptual mapping of the motes of wall 1200 with indexes of first-administered set 800 and second-administered set 802 of the physical motes of wall 1200.

With reference now to FIG. 29, shown is a partially schematic diagram that pictographically illustrates the coordinating of the conceptual mapping of the motes of wall 1200 with indexes of first-administered set 800 and second-administered set 802 of the physical motes of wall 1200. (This abstraction is illustrated in FIG. 29 by the dashed lines indicating the motes.) Specifically, depicted in FIG. 29 is that the mapping of the physical motes shown in FIG. 28 can be abstracted into aggregation 910 of first-administered content indexes and create aggregation 912 of second-administered content indexes. So abstracted, the mote content indexes can be used to "stand in" for or "represent" first-administered set 800 and/or second-administered set 802 of the physical motes of wall 1200, and can be independently and/or jointly managed and/or searched using high speed computer systems.

Those skilled in the art will appreciate that there are many techniques suitable for managing/searching mote content indexes of first-administered set 800 and/or second-administered set 802 of the physical motes of wall 1200. Examples of such techniques are database techniques such as those associated with relational database and/or SQL systems.

As described following in relation to FIGS. 35-47, some process implementations include but are not limited to accepting input defining a mote-appropriate network task; searching at least one federated index in response to said accepted input; and presenting an indication of motes appropriate to the mote-appropriate network task. (Several specific implementations are shown/described below in relation to FIG. 35-47.) One advantage of such process implementations is that in instances where an entity defining the mote-appropriate task has relatively scant knowledge of motes in one or more mote-appropriate networks, such process implementations will allow the entity to discover network resources applicable to defined mote-appropriate tasks. For example, in an implementation where the mote-appropriate task is information capture using light, some process implementations would indicate which motes have visible-light capabilities (e.g., having light device 140 as described herein). In an implementation where the mote-appropriate task is information capture using electrical/magnetic quantities, some process implementations would indicate which motes have electrical/magnetic capabilities (e.g., electrical/magnetic device 140 as described herein). In an implementation where the mote-appropriate task is information capture using pressure, some process implementations would indicate which motes have pressure capabilities (e.g., pressure device 144 as described herein). In an implementation where the mote-appropriate task is information capture using temperature, some process implementations would indicate which motes have temperature capabilities (e.g., temperature device 156 as described herein). In an implementation where the mote-appropriate task is information capture using volume, some process implementations would indicate which motes have temperature capabilities (e.g., volume device 158 as described herein). In an implementation where the mote-appropriate task is information capture using inertial measures, some process implementations would indicate which motes have inertial capabilities (e.g., inertial device 160 as described herein). Those skilled in the art will appreciate that similar results would hold true for other types of information capture consonant with the teachings set forth herein.

Figure 30:
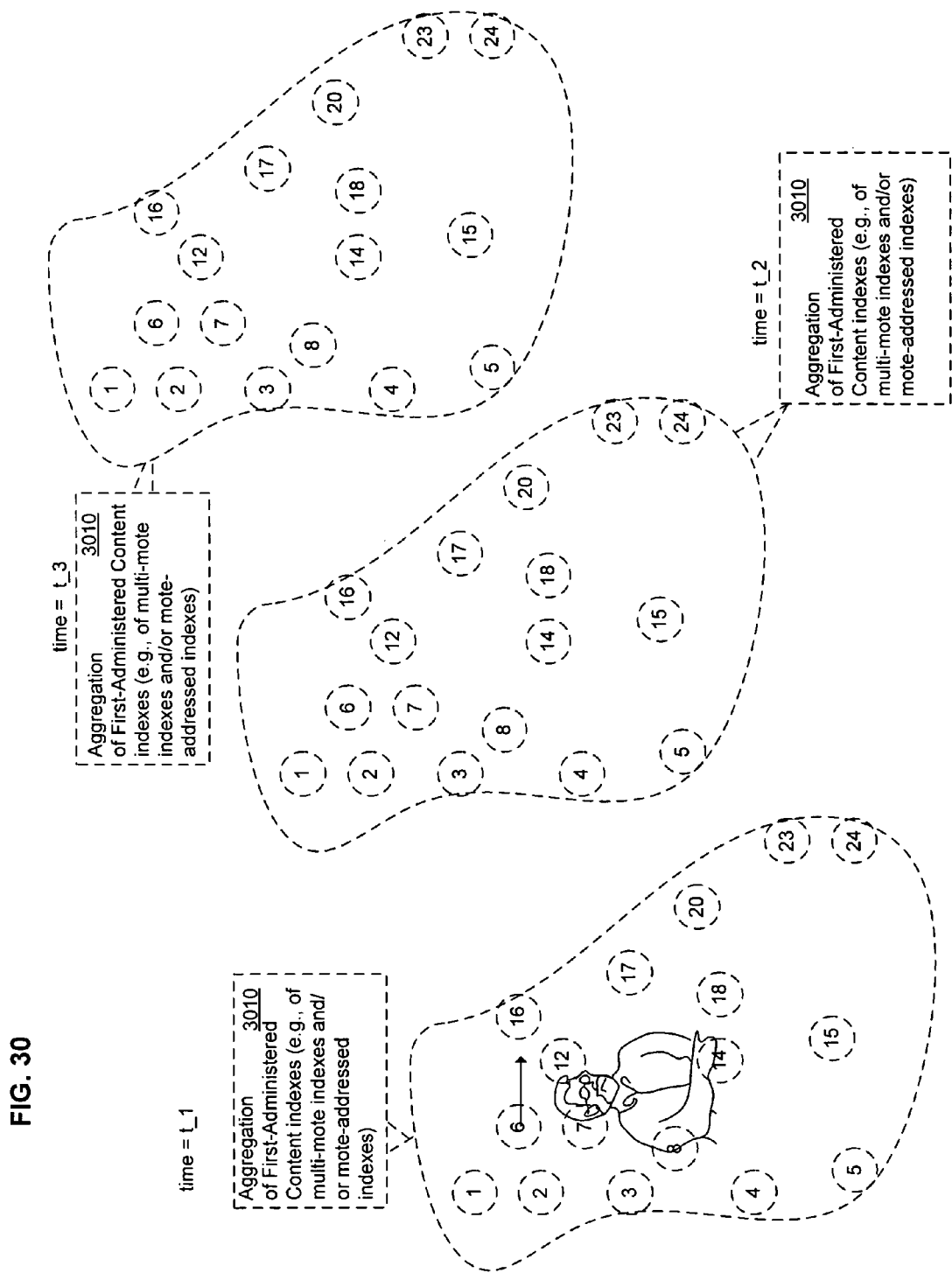
FIG. 30 shows time-stamped versions of subset 3010 of aggregation 910 of first-administered content indexes associated with the state of first-administered set 800 of motes, where subset 3010 represents motes indicated as appropriate to the input defining the mote-appropriate network task (e.g., image capture in infrared).

Referring now to FIG. 30 shown are time-stamped versions of subset 3010 of aggregation 910 of first-administered content indexes associated with the state of first-administered set 800 of motes, where subset 3010 represents motes indicated as appropriate to the input defining the mote-appropriate network task (e.g., image capture in infrared). Those skilled in the art will appreciate that subset 3010 is shown containing less than all the motes of aggregation 910, as will often be the case, since typically not all motes will have capabilities appropriate to the defined mote-appropriate network task; however, in some instances subset 3010 will contain all motes of aggregation 910. The left-lower portion of FIG. 30 depicts subset 3010 of aggregation 910 of first-administered content indexes at time=t_1 and indicates those motes that have capabilities appropriate to the defined mote-appropriate network task (e.g., are capable of detecting an infrared image of the person transiting wall 1200 at time=t_1). The middle-most portion of FIG. 30 illustrates subset 3010 of aggregation 910 of first-administered content indexes at time=t_2 and indicates those motes that have capabilities appropriate to the defined mote-appropriate network task (e.g., are capable of detecting an infrared image of the person transiting wall 1200 at time=t_2). The upper right portion of FIG. 30 shows subset 3010 of aggregation 910 of first-administered content indexes at time=t_3 and indicates those motes that have capabilities appropriate to the defined mote-appropriate network task (e.g., are capable of detecting an infrared image of the person transiting wall 1200 at time=t_3). Those having skill in the art will appreciate that in practice subset 3010 of aggregation 910 of first-administered content logs will generally be in the form of nested data structures and that the pictographic representations of how the person would be detected in FIG. 30 are used herein for sake of clarity. Those skilled in the art will also recognize that, in many instances, the number and/or locations of motes in subset 3010 will vary over time (e.g., not all infrared sensors might be available/active at all times), even though subset 3010 is shown as containing the same motes at times t_1, t_2, and t_3 for sake of clarity.

Figure 31:
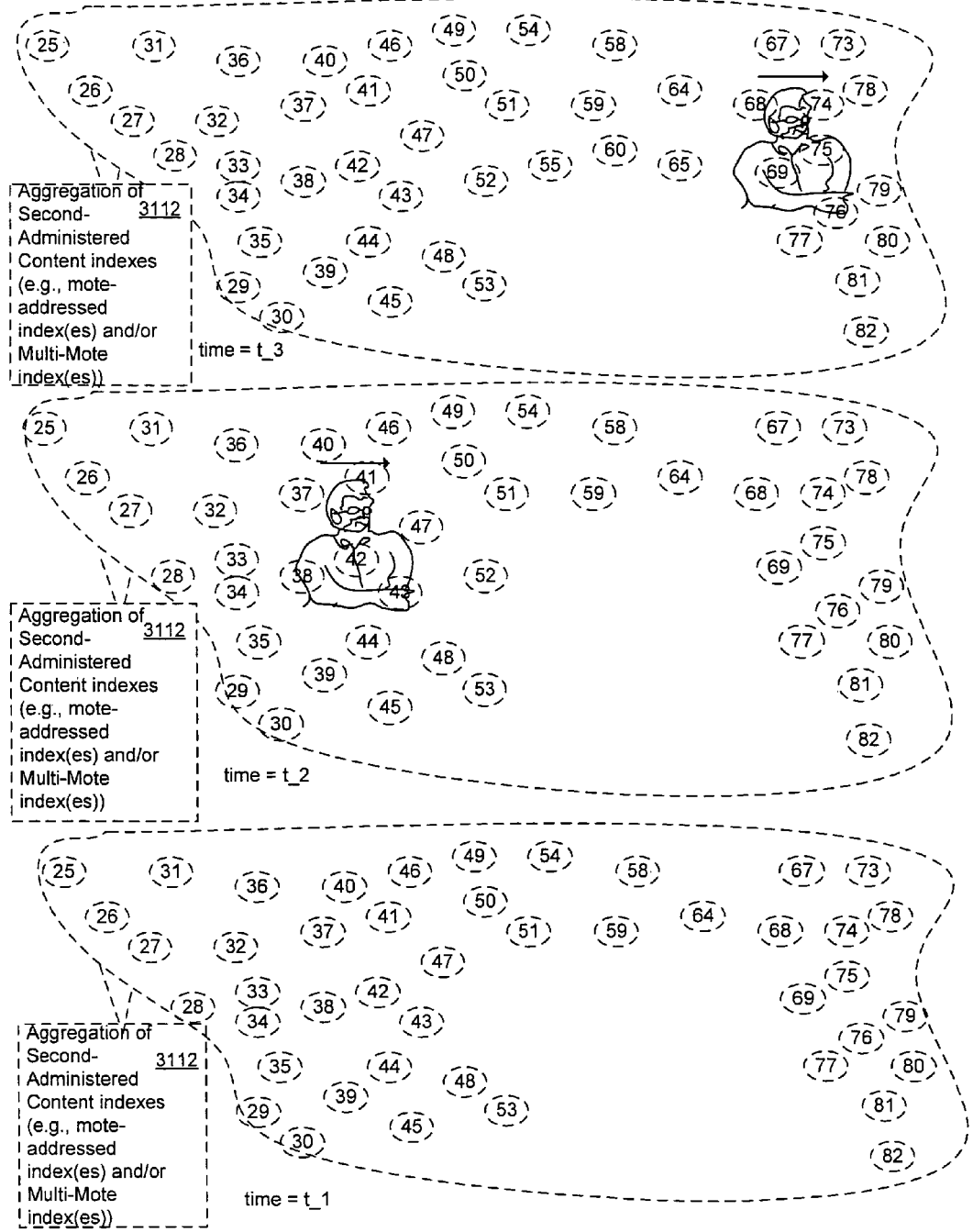
FIG. 31 depicts time-stamped versions of subset 3112 of aggregation 912 of second-administered content logs associated with the state of second-administered set 802 of motes, where subset 3112 represents motes indicated as appropriate to the input defining the mote-appropriate network task (e.g., image capture in infrared).

With reference now to FIG. 31, depicted are time-stamped versions of subset 3112 of aggregation 912 of second-administered content logs associated with the state of second-administered set 802 of motes, where subset 3112 represents motes indicated as appropriate to the input defining the mote-appropriate network task (e.g., image capture in infrared). Those skilled in the art will appreciate that subset 3112 is shown containing less than all the motes of aggregation 912, as will often be the case, since typically not all motes will have capabilities appropriate to the input-defined mote-appropriate network task; however, in some instances subset 3112 will contain all motes of aggregation 912. The left portion of FIG. 31 depicts subset 3112 of aggregation 912 of second-administered content indexes at time=t_1 and indicates those motes that have capabilities appropriate to the defined mote-appropriate network task (e.g., are capable of detecting an infrared image of the person transiting wall 1200 at time=t_1. The middle portion of FIG. 31 illustrates subset 3112 of aggregation 912 of second-administered content indexes at time=t_2 and indicates those motes that have capabilities appropriate to the defined mote-appropriate network task (e.g., are capable of detecting an infrared image of the person transiting wall 1200 at time=t_2. The upper portion of FIG. 31 shows subset 3112 aggregation 912 of second-administered content indexes at time=t_3 and indicates those motes that have capabilities appropriate to the defined mote-appropriate network task (e.g., are capable of detecting an infrared image of the person transiting wall 1200 at time=t_3. Those having skill in the art will appreciate that in practice subset 3112 aggregation 912 of second-administered content indexes will generally be in the form of nested data structures and that the pictographic representations of how the person would be detected in FIG. 31 are used herein for sake of clarity.

Referring now to FIG. 30 and FIG. 31, note that when the person is within the bounds of first-administered set 800 of motes—at time=t_1—the person does not "appear" in the content indexes representing subset 3112 of second-administered set 802 of motes (e.g., indexes of aggregation 912 of second-administered content indexes). Note also that when the person is within the bounds of second-administered set 802 of motes at times t_2 and t_3, the person does not "appear" in the content indexes representing subset 3010 of first-administered set 800 of motes (e.g., indexes of aggregation 910 of first-administered content indexes). Those having skill in the art will appreciate that this is indicative of reduced power and/or other reduced resource consumption. More specifically, in some implementations such as those described, since process allows knowledge of capabilities at various times, index searching and/or mote activation routines can avoid searching and/or communicating with those indexes and/or motes that are not available at times in question. Thus, one advantage of the techniques described herein is that they allow use of mote networks to track large and/or dense subject matter domains with less resource utilization (e.g., less power consumption such as that associated with less transmission, less reception, and/or less searching).

Figure 32:
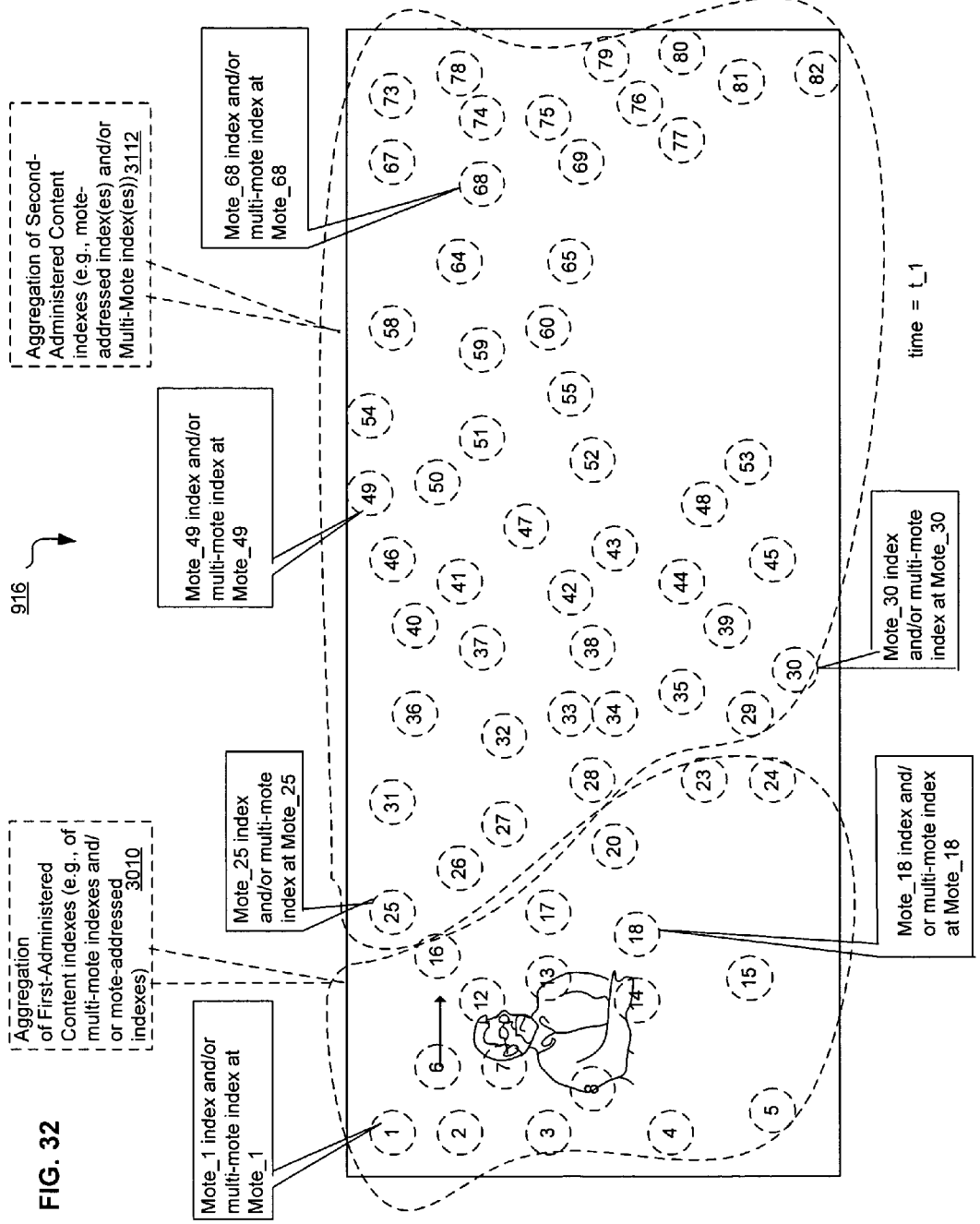
FIGS. 32, 33, and 34, illustrate different versions of federated content index 916 drawn on subset 3010 of first-administered set 800 of motes and subset 3112 of second-administered set 802 of motes.
Figure 33:
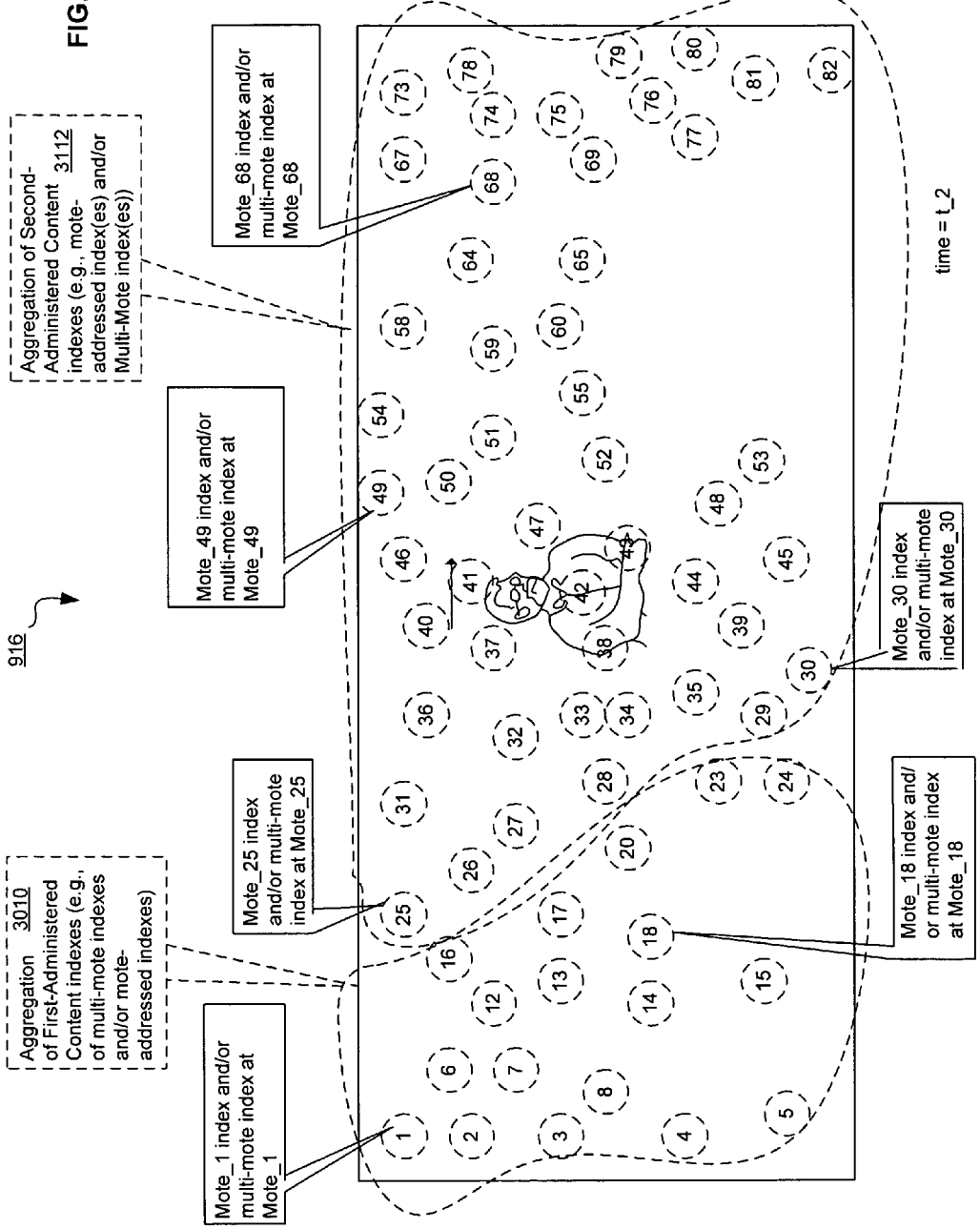
Figure 34:
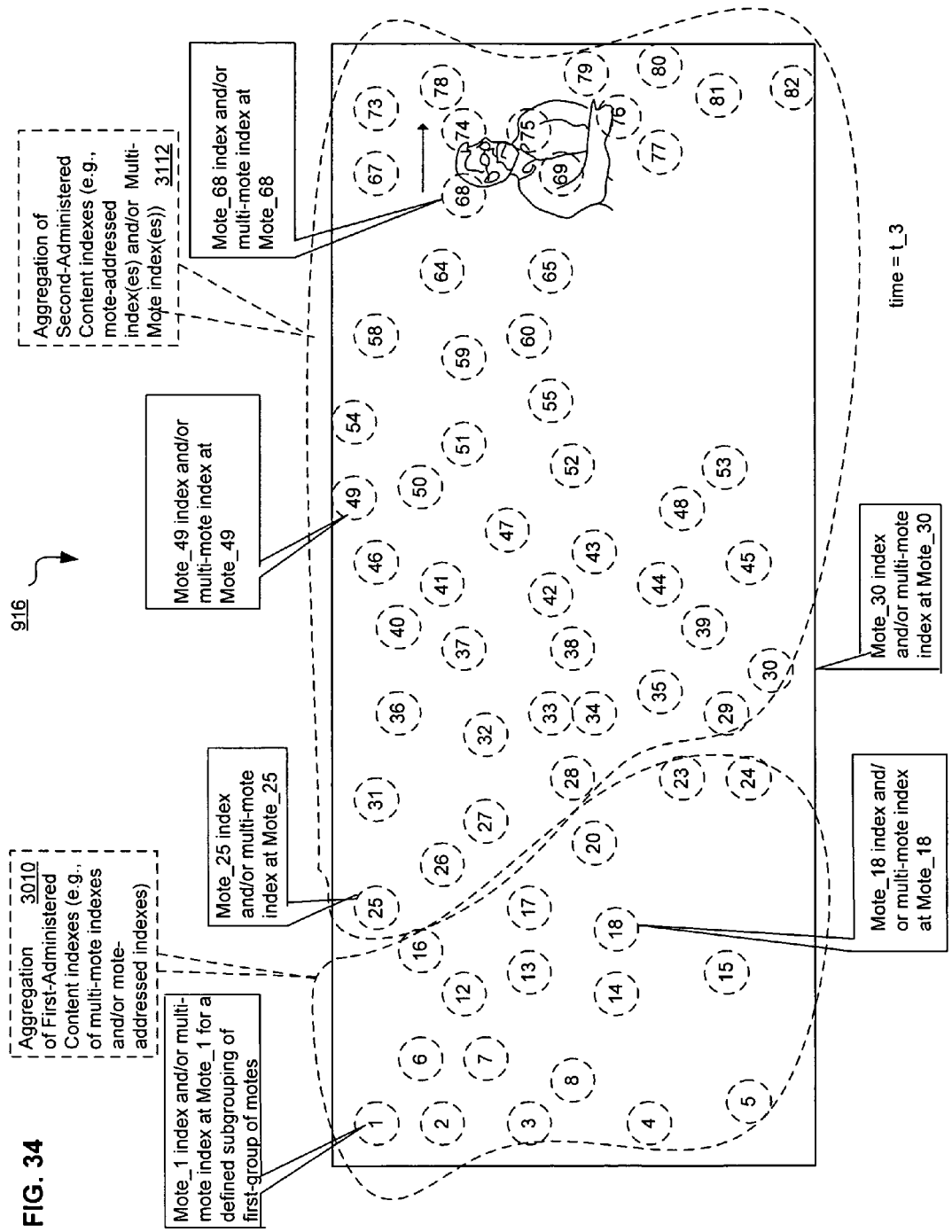

With reference now to FIGS. 32, 33, and 34, illustrated are different versions of federated content index 916 drawn on subset 3010 of first-administered set 800 of motes and subset 3112 of second-administered set 802 of motes. With reference now to FIG. 32, and assuming for sake of illustration that the input-defined mote-appropriate task is infrared image detection, depicted is federated content index 916 at time=t_1 that shows those motes that are capable of detecting an infrared image of the person transiting wall 1200 at time=t_1. Federated content index 916 at time=t_1 is shown composed of subset 3010 of aggregation 910 of first-administered content indexes at time=t_1 (FIG. 30) and subset 3112 of aggregation 912 of second-administered content indexes at time=t_1 (FIG. 31). Referring now to FIG. 33, depicted is federated content index 916 at time=t_2 that shows those motes that are capable of detecting an infrared image of the person transiting wall 1200 at time=t_2. Federated content index 916 at time=t_2 is shown composed of subset 3010 of aggregation 910 of first-administered content indexes at time=t_2 (FIG. 30) and subset 3112 of aggregation 912 of second-administered content indexes at time=t_2 (FIG. 31). Referring now to FIG. 33, depicted is federated content index 916 at time at time=t_3 that shows those motes that are capable of detecting an infrared image of the person transiting wall 1200 at time=t_3. Federated content index 916 at time=t_3 is shown composed of subset 3010 of aggregation 910 of first-administered content indexes at time=t_3 (FIG. 30) and subset 3112 of aggregation 912 of second-administered content indexes at time_t3 (FIG. 31). Those having skill in the art will appreciate that in practice federated content index 916 will generally be in the form of nested data structures and that the pictographic representations of how the person would "appear" in FIGS. 32, 33, and 34 are used herein for sake of clarity.

As described elsewhere herein, motes can include any number of devices whose capabilities can be captured in content indexes (e.g., federated content index 916). Accordingly, federated content index 916 allows flexible and powerful searching techniques, a few of which will now be described.

Following are a series of flowcharts depicting embodiments of processes. For ease of understanding, the flowcharts are organized such that the initial flowcharts present embodiments via an overall "big picture" viewpoint and thereafter the following flowcharts present alternate embodiments and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and efficient understanding of the various process instances.

Figure 35:
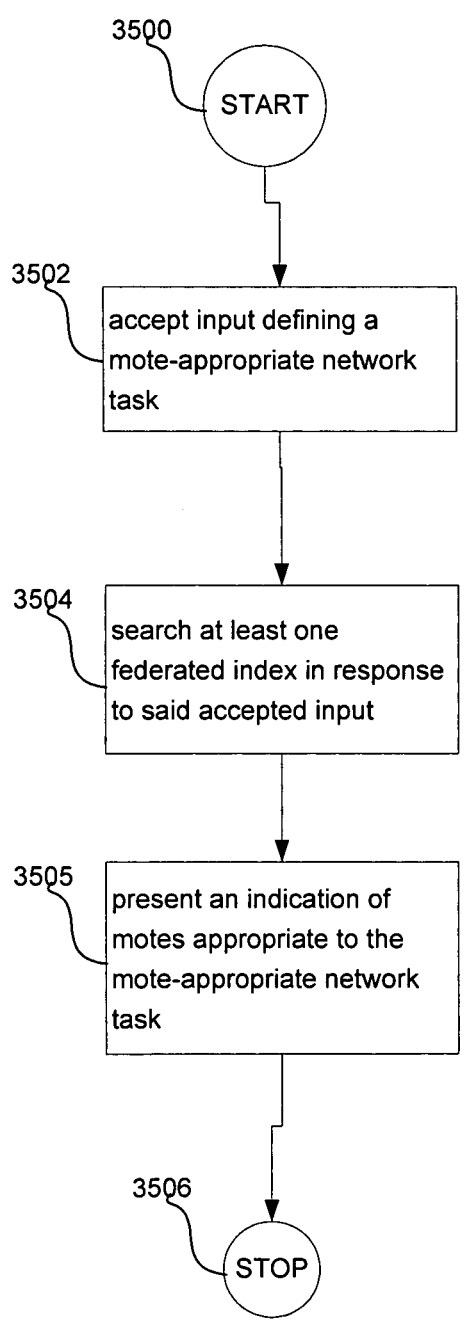
FIG. 35 depicts a high-level logic flowchart of a process.

Referring now to FIG. 35, depicted is a high-level logic flowchart of a process. Method step 3500 shows the start of the process. Method step 3502 depicts accepting input defining a mote-appropriate network task. Method step 3504 depicts searching at least one federated index in response to said accepted input. Method step 3505 illustrates presenting an indication of motes appropriate to the mote-appropriate network task. Method step 3506 shows the end of the process.

With reference now to FIG. 36, illustrated is a high-level logic flowchart depicting several alternate implementations of the high-level logic flowchart of FIG. 35. Depicted is that in one alternate implementation, method step 3502 includes method step 3600. Method step 3600 shows accepting a visual-task input. In various exemplary implementations, electrical circuitry accepts the visual-task input. In some specific implementations such as those used in security, electrical circuitry (e.g., electrical circuitry configured to provide a graphical user interface (GUI)) accepts a task of searching for a visible-light image (e.g., a task of viewing at least a part of hallway 1200 in visible light). In some implementations such as those used in nursing homes, electrical circuitry (e.g., electrical circuitry configured to provide a graphical user interface (GUI)) accepts a task of searching for a particular shape (e.g., a line drawing of a prone person, such as might appear if a person were to fall onto the motes of floor 1202 of FIG. 12). In other implementations, the visual-task input may be more abstract, such as, for example, a request may be in the form of spatial frequency content, spectral components, or other aspects of a searched for object, event or set of objects.

Continuing to refer to FIG. 36, illustrated is a high-level logic flowchart depicting several alternate implementations of the high-level logic flowchart of FIG. 35. Depicted is that in one alternate implementation, method step 3502 includes method step 3602. Method step 3602 shows accepting at least one of an infrared-task input or a temperature-task input. In various exemplary implementations, electrical circuitry accepts the at least one of an infrared-task input or a temperature-task input. In some specific implementations such as those used in fire detection, electrical circuitry (e.g., electrical circuitry configured to provide a graphical user interface (GUI)) accepts a task of searching for an infrared signature or temperature (e.g., a task of tracking an infrared signature or temperature in a closet of a building indicative of a potential spontaneous combustion). In some implementations such as those used in agriculture, electrical circuitry (e.g., a touch screen of a computer system showing motes superimposed over particular plants or plant groupings) accepts a task of monitoring various plants or groups of plants for either or both an infrared signature or a temperature profile (e.g., such as might be controlled in a greenhouse environment).

With reference now again to FIG. 36, illustrated is a high-level logic flowchart depicting several alternate implementations of the high-level logic flowchart of FIG. 35. Depicted is that in one alternate implementation, method step 3502 includes method step 3604. Method step 3604 shows accepting a pressure-task input. In various exemplary implementations, electrical circuitry accepts the pressure-task input. In some specific implementations such as those used in medicine, electrical circuitry (e.g., electrical circuitry configured to provide a graphical user interface (GUI)) accepts a task of monitoring pressure at any one or more motes proximate to and/or in a patient's body (e.g., task of tracking pressure sensed by one or more motes interior to a cast on a limb of a patient). In some implementations such as those used in fluid systems management, electrical circuitry (e.g., an input panel exterior to a piping system) accepts a task of monitoring pressure (e.g., such as might be a task in applications where a system is to give an alert when motes interior to a piping system indicates that the pressure(s) either exceed or fall below one or more defined pressures (e.g., a lowest acceptable pressure in hydraulic lifting system in industrial equipment)).

With reference now again to FIG. 36, illustrated is a high-level logic flowchart depicting several alternate implementations of the high-level logic flowchart of FIG. 35. Depicted is that in one alternate implementation, method step 3502 includes method step 3606. Method step 3606 shows accepting a sonic-task input. In various exemplary implementations, electrical circuitry accepts the sonic-task input. In some specific implementations such as those used in administration, electrical circuitry (e.g., electrical circuitry configured to convert microphone input to a digital audio file and/or configured to accept digital audio directly) accepts a task of monitoring sonic data (e.g., such as might be the case in an implementation where it might be desired that a system determine whether a particular voice has been heard in hallway 1200 during some defined interval of time). In some implementations such as those used in data processing, electrical circuitry (e.g., electrical circuitry configured to accept digital audio directly) accepts a task of monitoring sonic information (e.g., such as might be a task in applications where a system is to perform an action when a certain sound pattern over time is detected (e.g., where a system is to order installation of new hard drives when a time series of audio indicates that a hard disk failure might be imminent).

Referring now to FIG. 37, illustrated is a high-level logic flowchart depicting several alternate implementations of the high-level logic flowchart of FIG. 35. Depicted is that in one alternate implementation, method step 3504 includes method step 3706. Method step 3706 shows searching a federated index having at least one first-administered content index and at least one second-administered content index. In various exemplary implementations, electrical circuitry successively searches the at least one first-administered content index and at least one second-administered content index for motes having capabilities to provide various defined types of information necessary to fulfill the mote-appropriate network task of method step 3502. In some specific implementations such as those used in security, electrical circuitry (e.g., electrical circuitry forming a processor configured by a program to perform various tasks) searches for those motes having image and/or pixel capture capabilities (e.g., searching one or more content indexes of federated content index 916 at time=t_1 (FIG. 32), at time=t_2 (FIG. 33), and at time=t_3 (FIG. 34) for motes capable of tracking a person's progress—in visible light—through the hallway such as shown and/or described in relation to FIGS. 13, 14, and 15). In some implementations such as those used in criminal investigations, electrical circuitry searches for motes having capability(ies) to detect a particular pattern of sound over time (e.g., searching one or more content indexes of federated content index 916 for motes capable of detecting a pattern of sound a gunshot would make at time=t_1 (FIG. 32), at time=t_2 (FIG. 33), and at time=t_3 (FIG. 34) if a gun were to be fired in the hallway of FIG. 12). Those skilled in the art will appreciate that many other searches may be performed, dependent upon the accepted input defining the mote-appropriate network task of method step 3502.

With reference now to FIG. 38, shown is a high-level logic flowchart depicting several alternate implementations of the high-level logic flowchart of FIG. 37. Depicted is that in one alternate implementation, method step 3706 includes method step 3800. Method step 3800 illustrates searching at least one of a first-administered mote-addressed content index, a first-administered multi-mote content index, or a first-administered aggregation of content indexes and searching at least one of a second-administered mote-addressed content index, a second-administered multi-mote content index, or a second-administered aggregation of content indexes. In various exemplary implementations, electrical circuitry searches the at least one of a first-administered mote-addressed content index, a first-administered multi-mote content index, or a first-administered aggregation of content indexes and at least one of a second-administered mote-addressed content index, a second-administered multi-mote content index, or a second-administered aggregation of content indexes for various defined types of information. Those skilled in the art will appreciate that many other searches may be performed, dependent upon the accepted input defining the mote-appropriate search of method step 3502.

Continuing to refer to FIG. 37, depicted is a high-level logic flowchart illustrating several alternate implementations of the high-level logic flowchart of FIG. 35. Depicted is that in one alternate implementation, method step 3504 includes method step 3700. Method step 3700 shows searching a time series of at least two federated indexes. In various exemplary implementations, electrical circuitry successively searches a time series of federated indexes for motes capable of gathering various defined types of information related to various specified mote-appropriate network tasks. In some specific implementations such as those used in security, electrical circuitry (e.g., electrical circuitry forming a processor configured by a program to perform various tasks) searches a time series of federated indexes for motes capable of capturing image information in the visible light spectrum (e.g., searching one or more content indexes of federated index 916 at time=t_1 (FIG. 32), federated index 916 at time=t_2 (FIG. 33), and federated index 916 at time=t_3 (FIG. 34) for one or more motes capable of tracking a person's progress through the hallway such as shown and/or described in relation to FIGS. 13, 14, and 15). In some implementations such as those used in criminal investigations, electrical circuitry searches a time series of federated indexes for motes having capability (ies) to detect a particular pattern or characteristic of sound over time (e.g., searching the time series for motes capable of detecting a pattern of sound or an acoustic signature a gunshot might make at time=t_1 (FIG. 32), at time=t_2 (FIG. 33), and at time=t_3 (FIG. 34) if a gun were to be fired in the hallway of FIG. 12). Those skilled in the art will appreciate that many other searches may be performed, dependent upon the accepted input defining the mote-appropriate task of method step 3502.

Continuing to refer to FIG. 37, illustrated is that in one alternate implementation method step 3504 includes method step 3702. Method step 3702 shows searching at least one multi-mote content index of the at least one federated index. In various exemplary implementations, electrical circuitry searches at least one multi-mote content index of the at least one federated index. In some specific implementations such as those used in security, electrical circuitry searches one or more multi-mote content indexes, over time, in response to the defined mote-appropriate network task (e.g., electrical circuitry searching one or more multi-mote content indexes for indications of motes having capabilities to monitor a patient's heart for sounds indicative of arrhythmia). In some implementations such as those used in aviation maintenance, electrical circuitry searches one or more multi-mote content indexes, over time, in response to a defined mote-appropriate network task (e.g., electrical circuitry searching one or more multi-mote content indexes for motes having capabilities to monitor a defined area of aviation equipment, such as a jet engine, for sounds indicative of motor failure). Those skilled in the art will appreciate that many other searches may be performed, dependent upon the accepted input defining the mote-appropriate network task of method step 3502.

With reference now to FIG. 39, shown is a high-level logic flowchart depicting several alternate implementations of the high-level logic flowchart of FIG. 37. Depicted is that in one alternate implementation, method step 3702 includes method step 3900. Method step 3900 shows searching a time series of at least two multi-mote indexes, the time series including the at least one multi-mote content index of the at least one federated index. In various exemplary implementations, electrical circuitry successively searches a time series of at least two multi-mote content indexes for motes capable of gathering various defined types of information appropriate to the mote-appropriate network task. In some specific implementations such as those used in security, electrical circuitry (e.g., electrical circuitry forming a processor configured by a program to perform various tasks) searches a time series including at least one multi-mote content index of the at least one federated index for motes capable of capturing an image in visible light (e.g., searching one or more multi-mote indexes of federated index 916 at time=t_1 (FIG. 32), federated index 916 at time=t_2 (FIG. 33), and federated index 916 at time=t_3 (FIG. 34) in order to identify motes have visible light capabilities appropriate to track a person's progress through the hallway such as shown and/or described in relation to FIGS. 13, 14, and 15). In some implementations such as those used in criminal investigations, electrical circuitry searches a time series of one or more multi-mote content indexes of federated content index 916 for motes capable of identifying a particular pattern or characteristic of sound over time (e.g., searching one or more content indexes of federated content index 916 for motes capable of detecting a pattern of sound or an acoustic signature a gunshot might make at time=t_1 (FIG. 32), at time=t_2 (FIG. 33), and at time=t_3 (FIG. 34) if a gun were to be fired in the hallway of FIG. 12). Those skilled in the art will appreciate that many other searches may be performed, dependent upon the accepted input defining the mote-appropriate task of method step 3502.

Referring now again to FIG. 37, depicted is that in one alternate implementation method step 3504 includes method step 3704. Method step 3704 shows searching at least one aggregation of content indexes, wherein the at least one aggregation of content indexes forms a part of the at least one federated index. In various exemplary implementations, electrical circuitry searches the at least one aggregation of content indexes, wherein the at least one aggregation of content indexes forms a part of the at least one federated index. In some specific implementations such as those used in security, electrical circuitry (e.g., electrical circuitry forming a processor configured by a program to perform various tasks) searches at least one aggregation of content indexes forming a part of the at least one federated index for motes capable of capturing an image in the visible light spectrum (e.g., searching one or more aggregations of content indexes forming a part of federated index 916 of content indexes at time=t_1 (FIG. 32) for one or more motes capable of determining if a person was in front of wall 1200 at some time=t_1 as shown and/or described in relation to FIG. 13). In some implementations such as those used in criminal investigations, electrical circuitry searches at least one aggregation of content indexes forming a part of the at least one federated index for motes having capability(ies) to detect a particular sound at a particular time (e.g., having capabilities to detect a certain sound frequency at time=t_1 (FIG. 32)). Those skilled in the art will appreciate that many other searches may be performed, dependent upon the accepted input defining the mote-appropriate task of method step 3502.

With reference now to FIG. 40, shown is a high-level logic flowchart depicting several alternate implementations of the high-level logic flowchart of FIG. 37. Depicted is that in one alternate implementation, method step 3704 includes method step 4000. Method step 4000 illustrates searching a time series of at least two aggregations of content indexes, the time series including the at least one aggregation of content indexes, wherein the at least one aggregation of content indexes forms a part of the at least one federated index. In various exemplary implementations, electrical circuitry searches the at least two aggregations of content indexes, the time series including the at least one aggregation of content indexes, wherein the at least one aggregation of content indexes forms a part of the at least one federated index. In some specific implementations such as those used in security, electrical circuitry (e.g., electrical circuitry forming a processor configured by a program to perform various tasks) searches for motes capable of capturing an image in the visible light spectrum (e.g., searching aggregations of indexes of federated index 916 at time=t_1 (FIG. 32), federated index 916 at time=t_2 (FIG. 33), and federated index 916 at time=t_3 (FIG. 34) for motes capable of tracking a person's progress through the hallway such as shown and/or described in relation to FIGS. 13, 14, and 15). In some implementations such as those used in criminal investigations, electrical circuitry searches the aggregations for motes having capability(ies) to detect a particular pattern of sound over time (e.g., capable of detecting the sound a gunshot would make at time=t_1 (FIG. 32), at time=t_2 (FIG. 33), and at time=t_3 (FIG. 34) if a gun were to be fired in the hallway of FIG. 12). Those skilled in the art will appreciate that many other searches may be performed, dependent upon the accepted input defining the mote-appropriate task of method step 3502.

Continuing to refer to FIG. 40, depicted is that in one alternate implementation, method step 3704 includes method step 4002. Method step 4002 illustrates searching at least one mote-addressed content index of the at least one aggregation of content indexes, wherein the at least one aggregation of content indexes forms a part of the at least one federated index. In various exemplary implementations, electrical circuitry is used to effect the searching of at least one mote-addressed content index of the at least one aggregation of content indexes, wherein the at least one aggregation of content indexes forms a part of the at least one federated index. Those skilled in the art will appreciate that many other searches may be performed, dependent upon the accepted input defining the mote-appropriate task of method step 3502.

Continuing to refer to FIG. 40, depicted is that in one alternate implementation, method step 3704 includes method step 4004. Method step 4004 illustrates searching at least one multi-mote content index of the at least one aggregation of content indexes, wherein the at least one aggregation of content indexes forms a part of the at least one federated index. In various exemplary implementations, electrical circuitry is used to effect the searching at least one multi-mote content index of the at least one aggregation of content indexes. Those skilled in the art will appreciate that many other searches may be performed, dependent upon the accepted input defining the mote-appropriate search of method step 3502.

With reference now again to FIG. 41, illustrated is a high-level logic flowchart depicting several alternate implementations of the high-level logic flowchart of FIG. 35. Depicted is that in one alternate implementation, method step 3505 includes method step 4100. Method step 4100 shows transmitting the indication of motes appropriate to the mote-appropriate network task to electrical circuitry configurable to utilize the indication of motes appropriate to the mote-appropriate network task. In various exemplary implementations, the electrical circuitry is configured as incorporated by reference herein to use the accepted mote-appropriate network task input. In some specific implementations such as those used in administration, electrical circuitry (e.g., electrical circuitry configured by a computer program) uses the indication of motes appropriate to the mote-appropriate network task to determine from what motes various content logs (e.g., mote addressed mote logs, aggregations of mote logs, and or federations of mote logs) are to be constructed; that is, in some implementations, since the motes appropriate to the task are known, logging of the actual information produced by those known capabilities can be scheduled (e.g., as in prospective applications), performed (e.g., as in real-time applications), or searched (e.g. as in retrospective applications). For example, when a visual light image search is specified, the circuitry logs data from the motes listed in the indication of motes appropriate to the mote-appropriate network task (e.g., as appropriate to the visual light image search). In one specific implementation, the electrical circuitry is a processor configurable by a computer program to utilize the indication of motes appropriate to the mote-appropriate network task. Those skilled in the art will understand, though, that in many implementations the electrical circuitry constitutes various combinations of hardware, firmware, and/or software as described elsewhere herein.

Continuing to refer to FIG. 41, illustrated is a high-level logic flowchart depicting several alternate implementations of the high-level logic flowchart of FIG. 35. Depicted is that in one alternate implementation, method step 3505 includes method step 4102. Method step 4102 shows transmitting the indication of motes appropriate to the mote-appropriate network task to electrical circuitry configurable to utilize the indication of motes appropriate to the mote-appropriate network task. In various exemplary implementations, the indication of motes appropriate to the mote-appropriate network task is presented through a graphical user interface of a data processing system. For example, as might be the case in an implementation where a user has queried the data processing system to show the geographic locations of motes having certain task-appropriate capabilities to determine from what motes various content logs (e.g., mote addressed mote logs, aggregations of mote logs, and or federations of mote logs) are to be constructed. For example, when a visual light image search is specified, the circuitry logs data from the motes listed in the indication of motes appropriate to the mote-appropriate network task as having capabilities appropriate to a visual image search. In one specific implementation, the electrical circuitry is a processor configurable by a computer program to utilize the indication of motes appropriate to the mote-appropriate network task. Those skilled in the art will understand, though, that in many implementations the electrical circuitry constitute various combinations of hardware, firmware, and/or software as described elsewhere herein.

Those skilled in the art will appreciate that in some implementations, the searching described in relation to various processes herein (e.g., such as those shown/described in relation to FIGS. 35-41) is performed on mote-addressed content indexes, multi-mote content indexes, and/or aggregations of content indexes loaded to computer systems external to a mote-appropriate network. For example, as shown/described in relation to gateway 704, which can include, for example, one or more of a notebook computer system, minicomputer system, server computer system, and/or a mainframe computer system. Those skilled in the art will also appreciate that in other implementations the searching described in relation to various processes herein (e.g., such as those shown/described in relation to FIGS. 35-41) is performed in whole or in part at motes of a mote-appropriate network. Those skilled in the art will also recognize that the approaches described herein are not limited to accepting an input of a single kind and that the searching may be refined using a combination of inputs, such as a visual definition input combined with a sonic definition input. When combined, the searching logic may correlate the processes temporally or the searches may be combined independently of relative time references. Those skilled in the art will also appreciate that in other implementations the searching described in relation to various processes herein (e.g., such as those shown/described in relation to FIGS. 35-41) is performed in other computer systems consistent with the teachings herein.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. In one embodiment, several portions of the subject matter subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into mote processing systems. That is, at least a portion of the devices and/or processes described herein can be integrated into a mote processing system via a reasonable amount of experimentation. Those having skill in the art will recognize that a typical mote processing system generally includes one or more of a memory such as volatile and non-volatile memory, processors such as microprocessors and digital signal processors, computational entities such as operating systems, user interfaces, drivers, sensors, actuators, applications programs, one or more interaction devices, such as USB ports, control systems including feedback loops and control motors (e.g., feedback for sensing position and/or velocity; control motors for moving and/or adjusting components and/or quantities). A typical mote processing system may be implemented utilizing any suitable available components, such as those typically found in mote-appropriate computing/communication systems, combined with standard engineering practices. Specific examples of such components include commercially described components such as Intel Corporation's mote components and supporting hardware, software, and firmware.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular aspects of the present subject matter described herein have been shown and described, it will be obvious to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should NOT be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" and/or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense of one having skill in the art would understand the convention (e.g., "a system having at least one of A, B, and C" would include but not be limited to systems that have A alone, B alone, C alone, A and B together, A and C together, B and C together, and/or A, B, and C together). In those instances where a convention analogous to "at least one of A, B, or C, etc." is used, in general such a construction is intended in the sense of one having skill in the art would understand the convention (e.g., "a system having at least one of A, B, or C" would include but not be limited to systems that have A alone, B alone, C alone, A and B together, A and C together, B and C together, and/or A, B, and C together).

The invention claimed is:

1. A method comprising:
   accepting input defining a mote-appropriate network task, wherein the mote-appropriate network task is related to a task executed with at least one mote of a mote network;
   creating with the at least one mote of the mote network at least one mote-addressed content index by aggregating a content index of the at least one mote of the mote network and a content index received from at least one other mote of the mote network, the content index of the at least one mote indicating a status of one or more sensors available at the at least one mote, and the content index received from the at least one other mote indicating a status of one or more sensors available at the at least one other mote;
   in response to accepting input, searching the at least one mote-addressed content index to identify one or more motes; and
   presenting an indication of one or more motes appropriate to the mote-appropriate network task, including at least:
      searching the at least one mote-addressed content index in response to accepting input; and
      displaying the one or more motes identified by searching the at least one mote-addressed content index.

2. The method of claim 1, wherein said searching the at least one mote-addressed content index created by the at least one mote of the mote network in response to said accepted input comprises:
   searching at least one mote-addressed content index created by at least one mote of the mote network in response to said accepted input, said at least one mote-addressed content index being stored within the at least one mote of the mote network, said at least one mote being configured to sense at least one input relevant to the accepted input.

3. The method of claim 1, wherein said searching the at least one mote-addressed content index created by the at least one mote of the mote network in response to said accepted input comprises:
   searching at least one mote-addressed content index created by at least one mote of the mote network in response to said accepted input, said at least one mote-addressed content index including information sensed by one or more motes of the mote network, said sensed information being relevant to the accepted input.

4. The method of claim 1, wherein said accepting input defining a mote-appropriate network task further comprises:
   accepting at least one of a visual-definition input, an infrared-definition input, a temperature-definition input, a pressure-definition input, or a sonic-definition input.

5. The method of claim 1, wherein searching the at least one mote-addressed content index created by the at least one mote of the mote network in response to said accepted input comprises:
   searching at least one mote-addressed content index created by at least one mote of the mote network in response to said accepted input, the at least one mote-addressed content index being created by the at least one mote using content from one or more other motes of the mote network directly accessible by the at least one mote.

6. The method of claim 1, wherein said searching the at least one mote-addressed content index in response to said accepted input further comprises:
   searching at least one multi-mote content index having the at least one mote-addressed content index.

7. The method of claim 6, wherein said searching the at least one multi-mote content index having the at least one mote-addressed content index further comprises:
   searching a time series of at least two multi-mote indexes, the time series including the at least one multi-mote content index having the at least one mote-addressed content index.

8. The method of claim 1, wherein said searching the at least one mote-addressed content index in response to said accepted input further comprises:
    searching at least one aggregation of content indexes, the at least one aggregation having the at least one mote-addressed content index.

9. The method of claim 8, wherein said searching the at least one aggregation of content indexes, the at least one aggregation having the at least one mote-addressed content index further comprises:
    searching a time series of at least two aggregations of content indexes, the time series including the at least one aggregation of content indexes.

10. The method of claim 8, wherein said searching the at least one aggregation of content indexes, the at least one aggregation having the at least one mote-addressed content index further comprises:
    searching at least one mote-addressed content index of the at least one aggregation of content indexes.

11. The method of claim 8, wherein said searching the at least one aggregation of content indexes, the at least one aggregation having the at least one mote-addressed content index further comprises:
    searching at least one multi-mote content index of the at least one aggregation of content indexes.

12. The method of claim 1, wherein said presenting an indication of motes appropriate to the mote-appropriate network task further comprises:
    transmitting the indication of motes appropriate to the mote-appropriate network task to electrical circuitry configurable to utilize the indication of motes appropriate to the mote-appropriate network task.

13. The method of claim 12, wherein said transmitting the indication of motes appropriate to the mote-appropriate network task to electrical circuitry configurable to utilize the indication of motes appropriate to the mote-appropriate network task further comprises:
    transmitting the indication of motes appropriate to the mote-appropriate network task to a processor configurable by a computer program to utilize the indication of motes appropriate to the mote-appropriate network task.

14. The method of claim 1, wherein said presenting an indication of motes appropriate to the mote-appropriate network task further comprises:
    presenting the indication of motes appropriate to the mote-appropriate network task through a graphical user interface.

15. The method of claim 1, wherein searching the at least one mote-addressed content index to identify one or more motes includes:
    searching on a mote of the mote network the at least one mote-addressed content index to identify the one or more motes.

16. A system comprising:
    at least one processor; and
    one or more non-transitory computer readable media storing instructions, which when executed by the at least one processor perform the method comprising:
        accepting input defining a mote-appropriate network task, wherein the mote-appropriate network task is related to a task executed with one or more motes of a mote network;
        creating with at least one mote of the mote network at least one mote-addressed content index by aggregating a content index of the at least one mote of the mote network and a content index received from at least one other mote of the mote network, the content index of the at least one mote indicating a status of one or more sensors available at the at least one mote, and the content index received from the at least one other mote indicating a status of one or more sensors available at the at least one other mote;
        searching at least one mote-addressed content index created by at least one mote of a mote network responsive to accepting input, including at least searching the at least one mote-addressed content index in response to said accepted input to identify one or more motes; and
        indicating one or more motes appropriate to the mote-appropriate network task, including at least displaying the one or more motes identified by searching the at least one mote-addressed content index.

17. The system of claim 16, wherein searching at least one mote-addressed content index created by at least one mote of the mote network in response to said accepted input comprises:
    searching at least one mote-addressed content index created by at least one mote of the mote network in response to said accepted input, said at least one mote-addressed content index being stored within the at least one mote of the mote network, said at least one mote being configured to sense at least one input relevant to the accepted input.

18. The system of claim 16, wherein for searching at least one mote-addressed content index created by at least one mote of the mote network in response to said accepted input comprises:
    searching at least one mote-addressed content index created by at least one mote of the mote network in response to said accepted input, said at least one mote-addressed content index including information sensed by one or more motes of the mote network, said sensed information being relevant to the accepted input.

19. The system of claim 16, wherein accepting input defining a mote-appropriate network task further comprises:
    accepting at least one of a visual-definition input, an infrared-definition input, a temperature-definition input, or a pressure-definition input.

20. The system of claim 16, wherein accepting input defining a mote-appropriate network task further comprises:
    accepting a sonic-definition input.

21. The system of claim 16, wherein searching at least one mote-addressed content index created by at least one mote of the mote network responsive to accepting input further comprises:
    searching a time series of at least two mote-addressed content indexes.

22. The system of claim 16, wherein searching at least one mote-addressed content index created by at least one mote of the mote network responsive to accepting input further comprises:
    searching at least one multi-mote content index created by at least one mote of the mote network having the at least one mote-addressed content index.

23. The system of claim 22, wherein searching the at least one multi-mote content index created by the at least one mote of the mote network having the at least one mote-addressed content index further comprises:
    searching a time series of at least two multi-mote indexes, the time series including the at least one multi-mote content index having the at least one mote-addressed content index.

24. The system of claim 16, wherein searching at least one mote-addressed content index created by at least one mote of the mote network responsive to accepting input further comprises:
searching at least one aggregation of content indexes, the at least one aggregation having the at least one mote-addressed content index created by the at least one mote of the mote network.

25. The system of claim 24, wherein searching the at least one aggregation of content indexes, the at least one aggregation having the at least one mote-addressed content index created by the at least one mote of the mote network further comprises:
searching a time series of at least two aggregations of content indexes, the time series including the at least one aggregation of content indexes.

26. The system of claim 24, wherein searching the at least one aggregation of content indexes, the at least one aggregation having the at least one mote-addressed content index created by the at least one mote of the mote network further comprises:
searching at least one mote-addressed content index of the at least one aggregation of content indexes.

27. The system of claim 16, further comprising:
logic configured to accept input defining the mote-appropriate network task.

28. The system of claim 16, further comprising:
software resident within a medium, said software including instructions configured to effect acceptance of the input defining the mote-appropriate network task.

29. The system of claim 16, further comprising:
a transmitter to transmit the indication of one or more motes appropriate to the mote-appropriate network task to electrical circuitry configurable to utilize the indication of motes appropriate to the mote-appropriate network task.

30. The system of claim 29, further comprising:
a transmitter to transmit the indication of one or more motes appropriate to the mote-appropriate network task to a processor configurable by a computer program to utilize the indication of one or more motes appropriate to the mote-appropriate network task.

31. The system of claim 16, further comprising:
a graphical user interface to present the indication of one or more motes appropriate to the mote-appropriate network task.

32. A method comprising:
creating with at least one mote of a mote network at least one mote-addressed content index by aggregating a content index of the at least one mote of the mote network and a content index received from at least one other mote of the mote network, the content index of the at least one mote indicating a status of one or more sensors available at the at least one mote, and the content index received from the at least one other mote indicating a status of one or more sensors available at the at least one other mote;
loading the at least one mote-addressed content index created by the at least one mote of the mote network to a computer system external to the mote network;
accepting input defining a task of the mote network, wherein the task of the mote network is related to a task executed with a mote of the mote network; and
searching the loaded at least one mote-addressed content index in response to said input, including at least searching the at least one mote-addressed content index in response to said accepting input and displaying one or more motes identified by searching the at least one mote-addressed content index.

33. The method of claim 32, wherein said loading the at least one mote-addressed content index created by the at least one mote of the mote network to the computer system external to the mote network further comprises:
loading the at least one mote-addressed content index created by the at least one mote of the mote network to at least one of a notebook computer system, a minicomputer system, a server computer system, or a mainframe computer system.

34. The method of claim 32, wherein said searching the loaded at least one mote-addressed content index in response to said input further comprises:
searching the loaded at least one mote-addressed content index via at least one of a notebook computer system, a minicomputer system, a server computer system, or a mainframe computer system.

35. A system comprising:
at least one processor; and
one or more non-transitory computer readable media storing instructions, which when executed by the at least one processor perform the method comprising:
loading at least one mote-addressed content index created by at least one mote of a mote network to a computer system external to the mote network, the at least one mote-addressed content index created with the at least one mote of the mote network by aggregating a content index of the at least one mote of the mote network and a content index received from at least one other mote of the mote network, the content index of the at least one mote indicating a status of one or more sensors available at the at least one mote, and the content index received from the at least one other mote indicating a status of one or more sensors available at the at least one other mote;
accepting input defining a task of the mote network, wherein the task of the mote network is related to a task executed with a mote; and
searching the loaded at least one mote-addressed content index responsive to accepting input, including searching the at least one mote-addressed content index in response to accepting input and displaying one or more motes identified by searching the at least one mote-addressed content index.

36. The system of claim 35, wherein loading the at least one mote-addressed content index created by the at least one mote of the mote network to the computer system external to the mote network comprises:
loading the at least one mote-addressed content index created by the at least one mote of the mote network to at least one of a notebook computer system, a minicomputer system, a server computer system, or a mainframe computer system.

37. The system of claim 35, wherein searching the loaded at least one mote-addressed content index responsive to accepting input further comprises:
searching the loaded at least one mote-addressed content index via at least one of a notebook computer system, a minicomputer system, a server computer system, or a mainframe computer system.

38. The system of claim 35, wherein searching the loaded at least one mote-addressed content index responsive to accepting input further comprises:
effecting the searching the loaded at least one mote-addressed content index in response to said input.

39. The system of claim 35, further comprising:
software resident within a medium, said software including instructions configured to effect the searching the loaded at least one mote-addressed content index in response to said input.

40. A method comprising:
loading at least one multi-mote content index created by at least one mote of a mote network to a computer system external to the mote network, the at least one multi mote content index created with the at least one mote of the mote network by aggregating a content index of the at least one mote of the mote network and a content index received from at least one other mote of the mote network, the content index of the at least one mote indicating a status of one or more sensors available at the at least one mote, and the content index received from the at least one other mote indicating a status of one or more sensors available at the at least one other mote;
accepting input defining a task of the mote network, wherein the task of the mote network is related to a task executed with a mote; and
searching the loaded at least one multi-mote content index in response to said input, including at least searching at least one mote-addressed content index in response to said accepting input and displaying one or more motes identified by searching the at least one mote-addressed content index.

41. The method of claim 40, wherein said loading the at least one multi-mote content index created by the at least one mote of the mote network to the computer system external to the mote network comprises:
loading the at least one multi-mote content index created by the at least one mote of the mote network to at least one of a notebook computer system, a minicomputer system, a server computer system, or a mainframe computer system.

42. The method of claim 40, wherein said searching the loaded at least one multi-mote content index further comprises:
searching the loaded at least one multi-mote content index via at least one of a notebook computer system, a minicomputer system, a server computer system, or a mainframe computer system.

43. A system comprising:
at least one processor; and
one or more non-transitory computer readable media storing instructions, which when executed by the at least one processor perform the method comprising:
loading at least one multi-mote content index created by at least one mote of a mote network to a computer system external to the mote network, the at least one multi mote content index created with the at least one mote of the mote network by aggregating a content index of the at least one mote of the mote network and a content index received from at least one other mote of the mote network, the content index of the at least one mote indicating a status of one or more sensors available at the at least one mote, and the content index received from the at least one other mote indicating a status of one or more sensors available at the at least one other mote;
accepting input defining a task of the mote network, wherein the task of the mote network is related to a task executed with a mote; and
searching the loaded at least one multi-mote content index responsive to accepting input, including at least searching on at least one mote of the mote network at least one mote-addressed content index in response to said accepting input and displaying one or more motes identified by searching the at least one mote-addressed content index that includes an aggregation of the content index of the at least one mote of the mote network and the content index received from at least one other mote of the mote network.

44. The system of claim 43, wherein loading the at least one multi-mote content index created by the at least one mote of the mote network to the computer system external to the mote network comprises:
loading the at least one multi-mote content index to at least one of a notebook computer system, a minicomputer system, a server computer system, or a mainframe computer system.

45. The system of claim 43, wherein searching the loaded at least one multi-mote content index further comprises:
searching the loaded at least one multi-mote content index via at least one of a notebook computer system, a minicomputer system, a server computer system, or a mainframe computer system.

46. The system of claim 43, wherein searching the loaded at least one multi-mote content index further comprises:
effecting the searching the loaded at least one multi-mote content index.

47. The system of claim 43, further comprising:
software resident within a medium, said software including instructions configured to effect the searching the loaded at least one multi-mote content index.

48. A method comprising:
loading at least one aggregation of content indexes created by at least one mote of a mote network to a computer system external to the mote network, the at least one aggregation of content indexes created with the at least one mote of the mote network by aggregating a content index of the at least one mote of the mote network and a content index received from at least one other mote of the mote network, the content index of the at least one mote indicating a status of one or more sensors available at the at least one mote, and the content index received from the at least one other mote indicating a status of one or more sensors available at the at least one other mote;
accepting input defining a task of the mote network, wherein the task of the mote network is related to a task executed with a mote; and
searching the loaded at least one aggregation of content indexes, in response to said input, including at least searching at least one mote-addressed content index in response to said accepting input and displaying one or more motes identified by searching the at least one mote-addressed content index.

49. The method of claim 48, wherein said loading the at least one aggregation of content indexes created by the at least one mote of the mote network to the computer system external to the mote network comprises:
loading the at least one aggregation of content indexes to at least one of a notebook computer system, a minicomputer system, a server computer system, or a mainframe computer system.

50. The method of claim 48, wherein said searching the loaded at least one aggregation of content indexes further comprises:
searching the loaded at least one aggregation of content indexes via at least one of a notebook computer system, a minicomputer system, a server computer system, or a mainframe computer system.

51. A system comprising:
at least one processor; and one or more non-transitory computer readable media storing instructions, which when executed by the at least one processor perform the method comprising:

loading at least one aggregation of content indexes created by at least one mote of a mote network to a computer system external to the mote network, the at least one aggregation of content indexes created with the at least one mote of the mote network by aggregating a content index of the at least one mote of the mote network and a content index received from at least one other mote of the mote network, the content index of the at least one mote indicating a status of one or more sensors available at the at least one mote, and the content index received from the at least one other mote indicating a status of one or more sensors available at the at least one other mote;

accepting input defining a task of the mote network, wherein the task of the mote network is related to a task executed with a mote; and searching the loaded at least one aggregation of content indexes responsive to accepting input, including at least searching at least one mote-addressed content index in response to said accepting input and displaying one or more motes identified by searching the at least one mote-addressed content index.

52. The system of claim 51, wherein loading the at least one aggregation of content indexes created by the at least one mote of the mote network to the computer system external to the mote network comprises:

loading the at least one aggregation of content indexes to at least one of a notebook computer system, a minicomputer system, a server computer system, or a mainframe computer system.

53. The system of claim 51, wherein searching the loaded at least one aggregation of content indexes further comprises:

searching the loaded at least one aggregation of content indexes via at least one of a notebook computer system, a minicomputer system, a server computer system, or a mainframe computer system.

54. The system of claim 51, further comprising:

logic configured to effect the searching the loaded at least one aggregation of content indexes.

55. The system of claim 51, further comprising:

software resident within a medium, said software including instructions configured to effect the searching the loaded at least one aggregation of content indexes.

* * * * *